US007760956B2

(12) United States Patent
Lin et al.

(10) Patent No.: US 7,760,956 B2
(45) Date of Patent: Jul. 20, 2010

(54) SYSTEM AND METHOD FOR PRODUCING A PAGE USING FRAMES OF A VIDEO STREAM

(75) Inventors: Xiaofan Lin, Sunnyvale, CA (US); Tong Zhang, San Jose, CA (US); C. Brian Atkins, Mountain View, CA (US); Gary L. Vondran, Jr., San Carlos, CA (US); Mei Chen, Mountain View, CA (US); Charles A. Untulis, Sunnyvale, CA (US); Stephen Philip Cheatle, Bristol (GB); Dominic Lee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1235 days.

(21) Appl. No.: 11/127,106

(22) Filed: May 12, 2005

(65) Prior Publication Data

US 2006/0257048 A1 Nov. 16, 2006

(51) Int. Cl.
*G06K 9/40* (2006.01)
*G06K 9/32* (2006.01)
(52) U.S. Cl. .................. 382/254; 382/300; 715/243
(58) Field of Classification Search ............ 382/254, 382/282, 148, 299, 300, 325; 345/951; 715/204, 715/243, 724
See application file for complete search history.

(56) References Cited

U.S. PATENT DOCUMENTS 3,956,758 A 5/1976 Numata

| 4,317,620 A | 3/1982 | Coppa |
| 4,384,336 A | 5/1983 | Frankle |
| 4,423,936 A | 1/1984 | Johnson |
| 4,541,704 A | 9/1985 | Freeman |
| 4,605,970 A | 8/1986 | Hawkins |
| 4,724,330 A | 2/1988 | Tuhro |

(Continued)

FOREIGN PATENT DOCUMENTS

EP 0456414 11/1991

(Continued)

OTHER PUBLICATIONS

Lin et al., Mining Home Video for Photos, Apr. 29, 2004, Hewlett-Packard Company, HPL-2004-80,pp. 1-20 plus cover page.*

(Continued)

*Primary Examiner*—Matthew C Bella
*Assistant Examiner*—Dennis Rosario

(57) ABSTRACT

A method and system for automatically producing a page using frames of a video stream. A plurality of video frames from a video stream or clip are read, and multiple frames are extracted from the video stream, based on the content of each frame. Frames which neighbor the extracted frames in the video stream are also extracted, with the number of neighboring frames to be extracted being controlled by parameters provided to the page production system. The resolution of the images in the extracted video frames is enhanced, based on the information in each extracted frame and each respective extracted neighboring frame. The enhanced images are automatically cropped to enhance the important features in each image, and the cropped images are composed into one or more pages that are representative of the content of the video stream.

24 Claims, 64 Drawing Sheets

U.S. PATENT DOCUMENTS

| | | | |
|---|---|---|---|
| 5,053,875 A | 10/1991 | Ishii et al. | |
| 5,091,654 A | 2/1992 | Coy | |
| 5,136,686 A | 8/1992 | Koza | |
| 5,227,889 A | 7/1993 | Yoneyama | |
| 5,345,284 A | 9/1994 | Tsuruta | |
| 5,384,615 A | 1/1995 | Hsieh | |
| 5,485,554 A * | 1/1996 | Lowitz et al. | 358/1.17 |
| 5,486,893 A | 1/1996 | Takagi | |
| 5,499,366 A | 3/1996 | Rosenberg et al. | |
| 5,500,711 A | 3/1996 | Sasagaki | |
| 5,511,148 A | 4/1996 | Wellner | |
| 5,517,242 A | 5/1996 | Yamada et al. | |
| 5,555,362 A | 9/1996 | Yamashita et al. | |
| 5,557,684 A | 9/1996 | Wang et al. | |
| 5,666,186 A | 9/1997 | Meyerhoefer | |
| 5,712,995 A | 1/1998 | Cohn | |
| 5,719,594 A | 2/1998 | Potu | |
| 5,729,254 A | 3/1998 | Marks et al. | |
| 5,760,786 A | 6/1998 | Marks et al. | |
| 5,900,909 A | 5/1999 | Parulski | |
| 5,920,315 A | 7/1999 | Santos-Gomez | |
| 5,956,738 A | 9/1999 | Shirakawa | |
| 5,973,733 A | 10/1999 | Gove | |
| 5,978,519 A | 11/1999 | Bollman | |
| 6,008,809 A | 12/1999 | Brooks | |
| 6,067,112 A | 5/2000 | Wellner | |
| 6,125,229 A | 9/2000 | Dimitrova et al. | |
| 6,137,544 A | 10/2000 | Dimitrova et al. | |
| 6,269,118 B1 | 7/2001 | Hanna et al. | |
| 6,289,110 B1 | 9/2001 | Kim et al. | |
| 6,298,145 B1 * | 10/2001 | Zhang et al. | 382/103 |
| 6,301,586 B1 | 10/2001 | Yang et al. | |
| 6,304,682 B1 | 10/2001 | Patti | |
| 6,307,560 B1 | 10/2001 | Kondo et al. | |
| 6,380,954 B1 | 4/2002 | Gunther | |
| 6,385,245 B1 | 5/2002 | De Haan et al. | |
| 6,393,163 B1 | 5/2002 | Burt et al. | |
| 6,415,306 B2 | 7/2002 | Seaman | |
| 6,448,956 B1 | 9/2002 | Berman et al. | |
| 6,466,618 B1 | 10/2002 | Messing et al. | |
| 6,476,873 B1 | 11/2002 | Maeng | |
| 6,535,639 B1 * | 3/2003 | Uchihachi et al. | 382/225 |
| 6,549,643 B1 | 4/2003 | Toklu et al. | |
| 6,556,721 B1 | 4/2003 | Wang | |
| 6,563,602 B1 | 5/2003 | Uratani et al. | |
| 6,570,612 B1 | 5/2003 | Saund et al. | |
| 6,587,599 B1 | 7/2003 | Huang | |
| 6,628,805 B1 | 9/2003 | Hansen et al. | |
| 6,636,648 B2 | 10/2003 | Loui et al. | |
| 6,636,650 B1 | 10/2003 | Long et al. | |
| 6,671,405 B1 | 12/2003 | Savakis | |
| 6,686,970 B1 | 2/2004 | Windle | |
| 6,701,306 B1 | 3/2004 | Kronmiller et al. | |
| 6,711,587 B1 | 3/2004 | Dufaux | |
| 6,727,909 B1 | 4/2004 | Matsumura et al. | |
| 6,728,407 B1 | 4/2004 | Horiuchi | |
| 6,249,613 B1 | 6/2004 | Xu | |
| 6,771,292 B2 | 8/2004 | Sharp | |
| 6,771,801 B1 | 8/2004 | Fisher et al. | |
| 6,798,834 B1 | 9/2004 | Murakami et al. | |
| 6,813,395 B1 | 11/2004 | Kinjo | |
| 6,983,080 B2 | 1/2006 | Wenstrand at al. | |
| 7,013,432 B2 | 3/2006 | Taylor et al. | |
| 7,016,540 B1 | 3/2006 | Gong et al. | |
| 7,043,058 B2 | 5/2006 | Cornog et al. | |
| 7,088,773 B2 | 8/2006 | Paniconi et al. | |
| 7,093,263 B1 | 8/2006 | Sexton et al. | |
| 7,096,445 B1 | 8/2006 | Pucci et al. | |
| 7,119,837 B2 | 10/2006 | Soupliotis | |
| 7,124,360 B1 | 10/2006 | Drenttel et al. | |
| 7,133,050 B2 * | 11/2006 | Schowtka | 345/620 |
| 7,142,600 B1 | 11/2006 | Schonfeld et al. | |
| 7,148,990 B2 | 12/2006 | Atkins et al. | |
| 7,149,968 B1 | 12/2006 | Ackerschewski et al. | |
| 7,149,974 B2 * | 12/2006 | Girgensohn et al. | 715/723 |
| 7,281,199 B1 | 10/2007 | Nicol et al. | |
| 7,290,950 B2 * | 11/2007 | Donahoe et al. | 400/76 |
| 7,298,930 B1 | 11/2007 | Erol et al. | |
| 2001/0033296 A1 | 10/2001 | Fullerton et al. | |
| 2001/0048763 A1 | 12/2001 | Takatsuka et al. | |
| 2002/0028071 A1 | 3/2002 | Molgaard | |
| 2002/0051208 A1 | 5/2002 | Venable | |
| 2002/0070982 A1 | 6/2002 | Hill et al. | |
| 2002/0089523 A1 * | 7/2002 | Hodgkinson | 345/660 |
| 2002/0114535 A1 | 8/2002 | Luo | |
| 2002/0118761 A1 | 8/2002 | Lee | |
| 2002/0122067 A1 | 9/2002 | Geigel et al. | |
| 2002/0152291 A1 | 10/2002 | Fernandez et al. | |
| 2002/0186235 A1 | 12/2002 | Dimitrova et al. | |
| 2002/0191860 A1 | 12/2002 | Cheatle | |
| 2002/0191861 A1 | 12/2002 | Cheatle | |
| 2003/0001879 A1 | 1/2003 | Lin et al. | |
| 2003/0012457 A1 | 1/2003 | Solecki | |
| 2003/0016884 A1 | 1/2003 | Altunbasak et al. | |
| 2003/0031382 A1 | 2/2003 | Broekaert | |
| 2003/0053692 A1 | 3/2003 | Hong et al. | |
| 2003/0068087 A1 | 4/2003 | Wu et al. | |
| 2003/0090593 A1 | 5/2003 | Xiong | |
| 2003/0108238 A1 | 6/2003 | Xu | |
| 2003/0117611 A1 | 6/2003 | Chon et al. | |
| 2003/0210886 A1 | 11/2003 | Li et al. | |
| 2004/0114799 A1 | 6/2004 | Xu | |
| 2004/0125877 A1 | 7/2004 | Chang et al. | |
| 2004/0128317 A1 * | 7/2004 | Sull et al. | 707/104.1 |
| 2004/0141001 A1 * | 7/2004 | Van Der Heyden | 345/723 |
| 2004/0151401 A1 | 8/2004 | Sawhney et al. | |
| 2005/0017985 A1 * | 1/2005 | Wrenholt et al. | 345/619 |
| 2005/0033758 A1 * | 2/2005 | Baxter | 707/100 |
| 2005/0071781 A1 | 3/2005 | Atkins | |
| 2005/0071783 A1 | 3/2005 | Atkins | |
| 2005/0138570 A1 | 6/2005 | Good et al. | |
| 2005/0228849 A1 | 10/2005 | Zhang | |
| 2005/0240865 A1 | 10/2005 | Atkins et al. | |
| 2006/0188013 A1 | 8/2006 | Coimbra et al. | |
| 2006/0200758 A1 | 9/2006 | Atkins | |
| 2006/0279566 A1 | 12/2006 | Atkins | |
| 2007/0168413 A1 * | 7/2007 | Barletta et al. | 709/203 |

FOREIGN PATENT DOCUMENTS

| | | |
|---|---|---|
| EP | 0959299 | 5/1994 |
| EP | 0690413 | 1/1996 |
| EP | 0824246 | 2/1998 |
| EP | 0912047 | 4/1999 |
| EP | 0924923 | 6/1999 |
| EP | 0949802 | 10/1999 |
| EP | 1117251 | 7/2001 |
| EP | 1132835 | 9/2001 |
| EP | 1158464 | 11/2001 |
| EP | 1182582 | 2/2002 |
| EP | 1186992 A2 | 3/2002 |
| EP | 1503336 A2 | 2/2005 |
| GB | 2124055 | 2/1984 |
| GB | 2350251 | 11/2000 |
| GB | 2378340 A | 2/2003 |
| JP | 01-191270 | 1/1989 |
| JP | 6-059430 | 3/1994 |
| JP | 09-185728 | 7/1997 |
| JP | 10-293838 | 11/1998 |
| JP | 2000-244800 | 8/2000 |
| JP | 2000227960 | 8/2000 |
| JP | 2001-148843 | 5/2001 |
| JP | 2002-288669 | 4/2002 |
| JP | 2002-142092 | 5/2002 |

| | | |
|---|---|---|
| JP | 2003-101749 | 4/2003 |
| JP | 2003-274139 | 9/2003 |
| WO | 95/32581 | 11/1995 |
| WO | WO 98/10356 A2 | 3/1998 |
| WO | WO 9844739 | 10/1998 |
| WO | 99/03264 | 1/1999 |
| WO | WO99/07156 | 2/1999 |
| WO | 99/09887 | 3/1999 |
| WO | 0013407 | 3/2000 |
| WO | 00/384417 | 6/2000 |
| WO | WO 01/39019 A2 | 5/2001 |
| WO | WO 0158129 | 8/2001 |
| WO | WO02/37939 A2 | 5/2002 |
| WO | 02/052835 | 7/2002 |
| WO | WO 02/084582 | 10/2002 |
| WO | 03/012678 | 2/2003 |
| WO | WO 03043348 | 5/2003 |

OTHER PUBLICATIONS

R. Tsai et al., "Multiframe image resolution and registration," Advances in Computer Vision and Image Processing, vol. 1, pp. 317-320, 1984.

S. Borman et al., "Spatial resolution enhancement of low-resolution image sequences a comprehensive review with directions for future research," Laboratory for Image and Signal Analysis, University of Notre Dame, Jul. 1998.

S. Park et al., "Super-resolution image reconstruction: a technical overview," IEEE Signal Processing Magazine, pp. 21-36, May 2003.

C. Segall et al., "High-resolution images from low-resolution compressed video," IEEE Signal Processing Magazine, pp. 37-48, May 2003.

A. Tekalp et al., "High-resolution image reconstruction from lower-resolution image sequences and space-varying image restoration," IEEE 1992.

R. Schultz et al., "Subpixel motion estimation for super-resolution image sequence enhancement," Journal of Visual Communication and Image Representation, vol. 9, No. 1, Mar. 1998.

P. Eren et al., "Robust, object-based high-resolution image reconstruction from low-resolution video," IEEE Trans on Image Processing, vol. 6 No. 10, Oct. 1997.

Y. Rubner, "Empirical evaluation of dissimiliarity measures for color and texture," Computer Vision and Image Understanding, vol. 84, issue 1 2001.

Musmann et al., "Advances in picture coding," Processings of the IEEE 73(4), 1985, 523-548.

Hongjiang Zhang et al., "Automatic partioning of full-motion video," Mulitmedia Systems, vol. 1 No. 1, Jan. 1993.

C. Ordonex et al., "Discovering association rules based on image content," IEEE, May 19, 1999, pp. 38-49.

K. Hachimura et al., "Image retrieval based on compositional features and interactive query specification," IEEE, Sep. 3, 2000, pp. 262-266.

Bernd Heisele, "Motion-Based Object Detection and Tracking in Color Image Sequences," Proceedings IEEE 4th International Conference on Image Processing (ICIP-97), vol. III, Oct. 1997.

Hansen, M., et al.: "Real-Time scene stabilization and Mosaic Construction"; Image Understanding WorkShop; NDv. 1994; pp. 457-465; XPOOO852887.

Kang-Sun Choi, et al., "An Efficient Digital Images Stabilizing Technique for Mobile Video Communications"; IEEE, Piscataway. NJ.: Jun. 15, 2000, pp. 246-247; XP002326257.

J.-R Ohm, P. Ma : "Feature-based cluster segmentation of im~e sequences," Aroceedings IEEE 4th Inte{national Conference on Image Processing (ICIP-97), va. 111, pp. 178-181, Oct. 1997.

J. Y. A. Wang and E H. Adelson. Layered Representation for Motion Analysis. Proceedings of the IEEE Computer Society Conference on Computer Vision and Pattern Recognition 1993. pp. 361-366, New York, Jun. 1993.

David Tweed and Andrew Calway. Moving Object Graphs and Layer Extraction from Image sequences. In Tim Cootes and Chris Taylor, editors, Proceedings of the British Machine Vision Conference, pp. 133-142. BMVA, Sep. 2001.

Qiard G. Medioni, Isaac Cohen, Franc;ios Brenond, Somboon Hongeng, Ramakant Nevatia: Event Detection and Analysis from Video Streams: IEEE Transactions on Pattern Analysis and Machine Intelligence 23(8): 873-889 (2001).

Remi Megret, Daniel DeMenthon. A Survey of Spatio-Temporal Grouping Techniques. Research report CD-TR-4403, LAMP, University of Maryland, Aug. 2002.

Zhu ZhiGang, Xu GuangYou, Yang YuOong, Jin J S. Camera stabilization based on 2.50 motion estimation and Inertial motion filtering [A]. IEEE International Conference on Intelligent Vehicles[C]. Stuttgart, Germany: IEEE, 1998.

J. Y. A. Wang and E. H. Adelson. Spatio-Temporal Segmentation of Video Data. Proceedings of SPIEon Image and Video Processing II, vol. 2182, pp. 120-131, San Jose, Feb. 1994.

M. J. Black and P. Ananden. The robust estimation of mUltiple motions: Parametric and piecewise-smooth flow fields. Computer Vision and Image Understanding, 63(1):7.5-104, Jan. 1996.

Joe Geigel et al., "Automatic page layout using genetic algorithms for electronic albuming,"Proceedings of Electronic Imaging 2001 (Jan. 2001).

Eldan Goldenberg, "Automatic layout of variable-content print data," MCs Dissertation, School of Cognitive & Computing Sciences, University of Sussex, Brighton, UK (2002).

D.F. Wong et al., "A new algorithm for floorplan design," Proc. Design Automation Conference, pp. 101-107, 1986.

Irani et al - "Improving Resolution by Image Registration"- CVGIP: Graphical Models and Image Processing - vol. 53 No. 3 - pp. 231-239 - May 1991.

Adelson et al - Pyramid Methods in Image Processing: - TCA Engineer, 29-6 - pp. 33-41 - Nov./Dec. 1984.

Teruo - "Foreground Picture Extracting Method, Picture Processor, Automatic Trimming Device, Recording Medium and Portrait Picture Device" - Patent Abstracts of Japan - vol. 2000 No. 5 - Sep. 14, 2000, JP2000036032 - Feb. 2, 2000, Abstract.

* cited by examiner

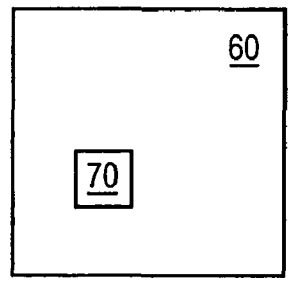 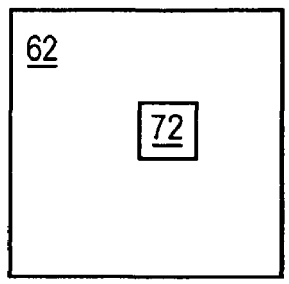 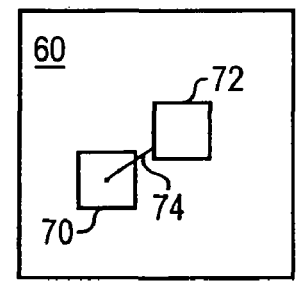
FIG. 5A    FIG. 5B    FIG. 5C
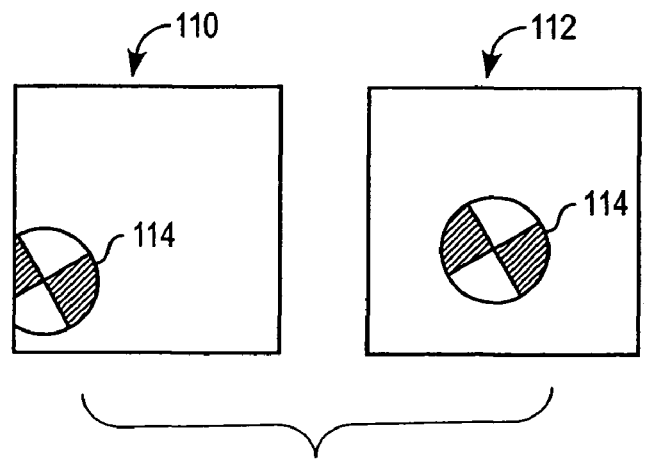
FIG. 6

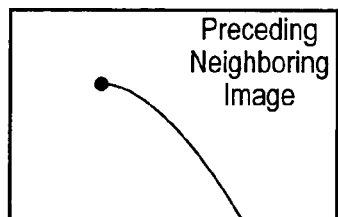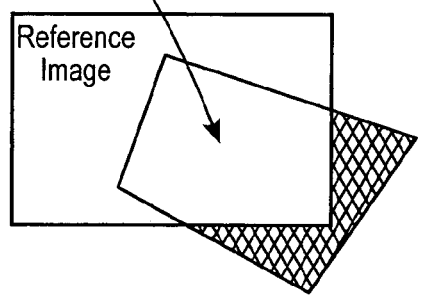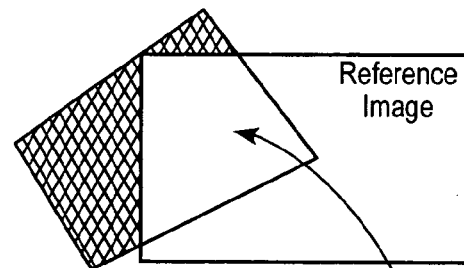
FIG. 17A  FIG. 17B
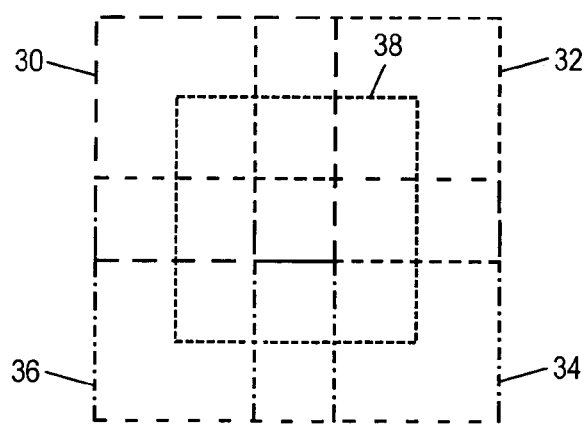
FIG. 18

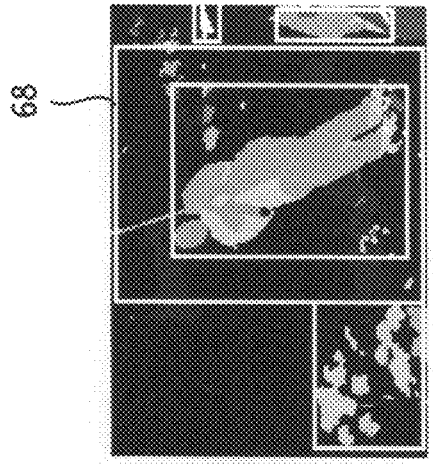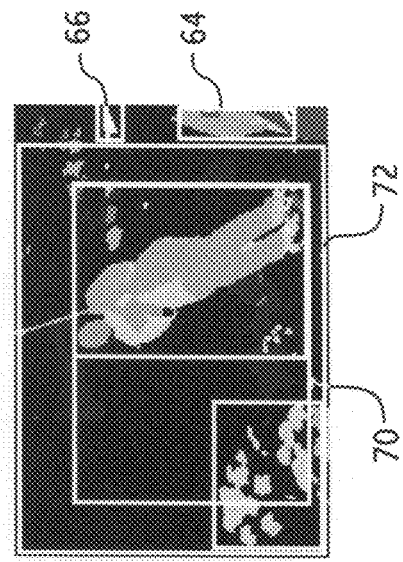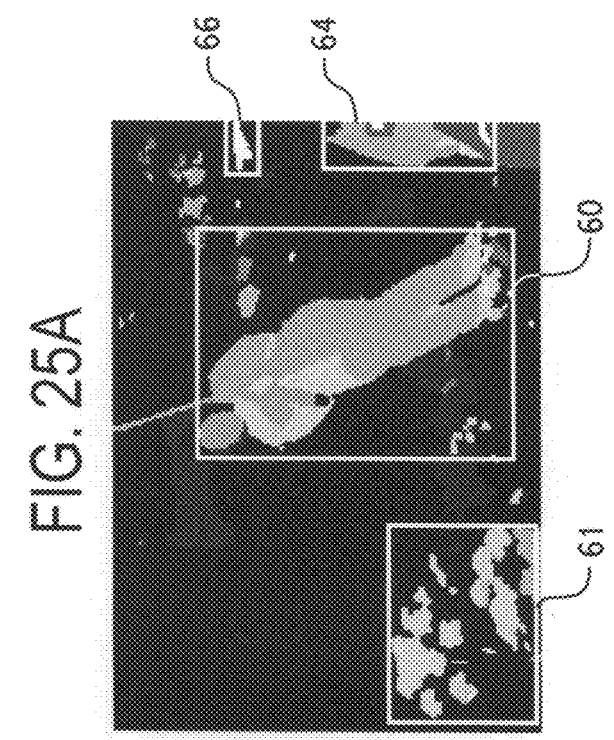
FIG. 25A
FIG. 25B
FIG. 25C

Extracted frame:

After black margin removal:

After automatic cropping:

SYSTEM AND METHOD FOR PRODUCING A PAGE USING FRAMES OF A VIDEO STREAM

CROSS-REFERENCE TO RELATED APPLICATIONS

This application is related to copending U.S. patent application Ser. No. 10/807,949, filed Mar. 24, 2884, having a common assignee with the present application and entitled "Intelligent Key frame Extraction From a Video)."

This application is related to copending U.S. patent application Ser. No. 10/169,841, filed Dec. 20, 2001, having a common assignee with the present application, and entitled "Automated Cropping of Electronic Images."

This application is related to copending U.S. patent application Ser. No. 10/824,692, filed Apr. 15, 2004, and having a common assignee with the present application, entitled "Enhancing Image Resolution."

This application is related to copending U.S. patent application Ser. No. 11/127,326, filed May 12, 2005, having a common assignee With the present application, and entitled "Method for Arranging Graphic Assemblies."

BACKGROUND

A video stream, including both audio and video content, contains a large number of video frames, many of which, as single frames or video clips, are not significant to convey the content of the video stream. Even those content-significant video frames that may convey an image representative of the content of the video stream can contain additional views and images which detract from the representative image of the video stream. Further, content-significant video frames are not always in a form that would be useful as pages for conveying the content of the video stream.

SUMMARY

Exemplary embodiments are directed to a computer-implemented method and system for producing a page using frames of a video stream, including automatically extracting multiple frames from a video stream, based on frame content; enhancing resolution of images contained within each of the extracted frames, using information from neighboring frames; automatically cropping the enhanced images within each of the extracted frames to produce cropped images; and composing a page having a layout of the cropped images.

Alternative embodiments provide a computer-based system for producing a page using frames of a video stream, including a processor for executing computer instructions that automatically extract one or more key frames from a video stream comprising a plurality of frames; automatically extract one or more pairs of neighboring frames adjacent to the extracted key frames in the video stream; enhance resolution of the images contained within each of the extracted key frames based on the content of the extracted neighboring frames; automatically crop the enhanced key frame images to produce cropped images; and compose one or more pages comprising the cropped images.

An additional embodiment is also directed to a computer readable medium encoded with computer-executable instructions, which, when executed by a computer, provide for the automatic production of one or more pages using frames of a video stream, wherein the instructions are provided for inputting a video stream comprising a plurality of frames; automatically extracting key frames from the video stream; automatically enhancing resolution of images contained within the extracted key frames; automatically cropping the enhanced images to produce cropped images; and composing one or more pages from the cropped images, wherein the composed pages are representative of the video stream.

BRIEF DESCRIPTION OF THE DRAWINGS

The accompanying drawings provide visual representations which will be used to more fully describe the representative embodiments disclosed herein and can be used by those skilled in the art to better understand them and their inherent advantages.

FIGS. 5A-5C illustrate one method for determining a relative motion among a pair of adjacent video frames.

FIG. 6 shows a pair of adjacent video frames in a video stream that capture a moving object.

FIG. 17A is a diagrammatic view of a neighboring image re-mapped to a coordinate frame of a subsequent reference image in accordance with a computed motion map.

FIG. 17B is a diagrammatic view of a neighboring image re-mapped to a coordinate frame of a preceding reference image in accordance with a computed motion map.

FIG. 18 shows an example of five windows that are used to compute motion maps in accordance with an implementation of the method of FIG. 14B.

FIGS. 25A to 25C illustrate possible crop boundaries.

DETAILED DESCRIPTION OF THE EMBODIMENTS

Exemplary embodiments are described herein with respect to graphic images, assemblies, elements. A graphic element is a single image, such as a single photo, a single block of text, a piece of clip-art, a key frame from a video stream, etc. A graphic assembly is a cohesive group or collection of one or more graphic elements. Graphic assemblies can comprise arbitrary subsets of graphic elements, or can comprise sequences of graphic elements. An example of a graphic assembly comprising a sequence of graphic elements is a collection of key frames from a video stream, where each key frame comprises a graphic element. A graphic assembly having more than one graphic element can be presented or arranged in more than one way. However, usually the number of meaningful possible presentations is limited. Sequences of graphic elements are typically arranged in rows and columns to preserve the sequence of the graphic elements. For example, a graphic assembly that includes a sequence of 6 key frames has 4 possible presentations: a 2×3 array, a 3×2 array, a 1×6 array, and a 6×1 array. A graphic assembly having only one graphic element (such as a single photograph) is a "degenerate" graphic assembly with only one presentation.

Figure 10:
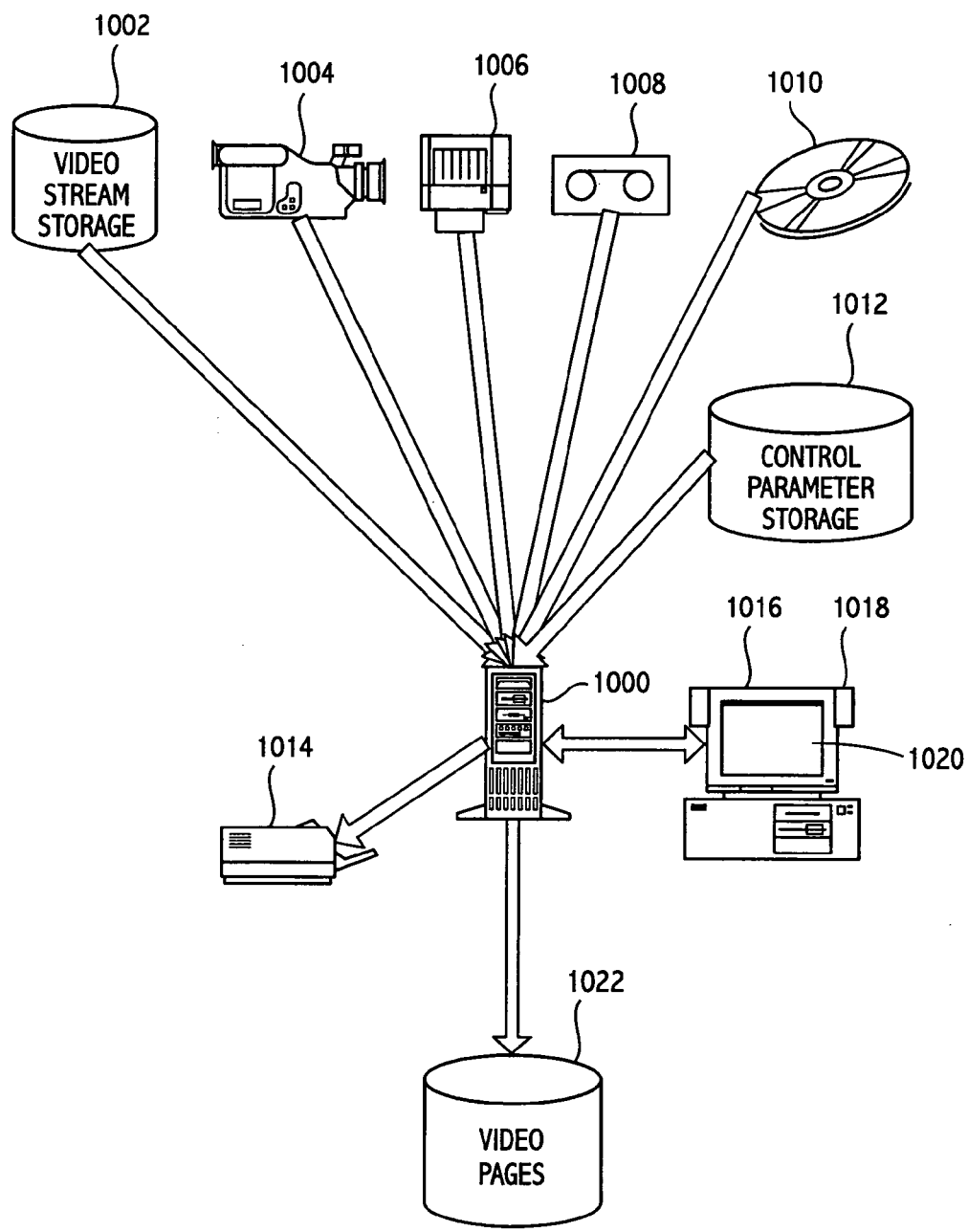
FIG. 10 shows a component diagram of a computer-based system for producing a page using frames of a video stream.

Referring initially to FIG. 10, there is illustrated a computer-based system for producing a page using a plurality of frames from a video stream. The computer 1000 accepts as input a video stream from one or more video stream sources, including video stream storage sites and devices 1002, camcorders 1004, digital cameras 1006, VHS tapes 1008, and CD's and DVD's 1010. As is known in the art, multimedia can be transported across a plurality of means, including USB cables, video cables, wireless transmissions, and the like. Accordingly, exemplary embodiments are provided with a plurality of input ports for accepting the video stream to the computer 1000, whether the input stream is integrated audio and video images or, alternately, the input is separate audio frames and video scene frames. The term, "frames," is intended to represent the smallest linear element of the video stream that represents an audio sound or a video image, much like the individual frames of a celluloid movie film. The input video stream can be any video stream format, whether analog or digital, and whether through S-Video, Composite-Video, or IEEE 1394 ports, the video can be stored on VHS, Hi-8, or mini-DV tape, or on CD, VCD, DVD, etc Exemplary embodiments provide for user control through the use of parameters and commands, whether input from control parameter storage 1012 or by means of a computer or work station 1016, including a personal computer, a wireless device, a Bluetooth device, a personal digital assistant, and the like. A menu of operations and information associated with the processing of the video stream can be displayed to the user on a screen or through a graphical user interface, as represented by screen 1020. Speakers 1018 are available for the user to hear any audio portions of the video stream being processed.

Figure 11:
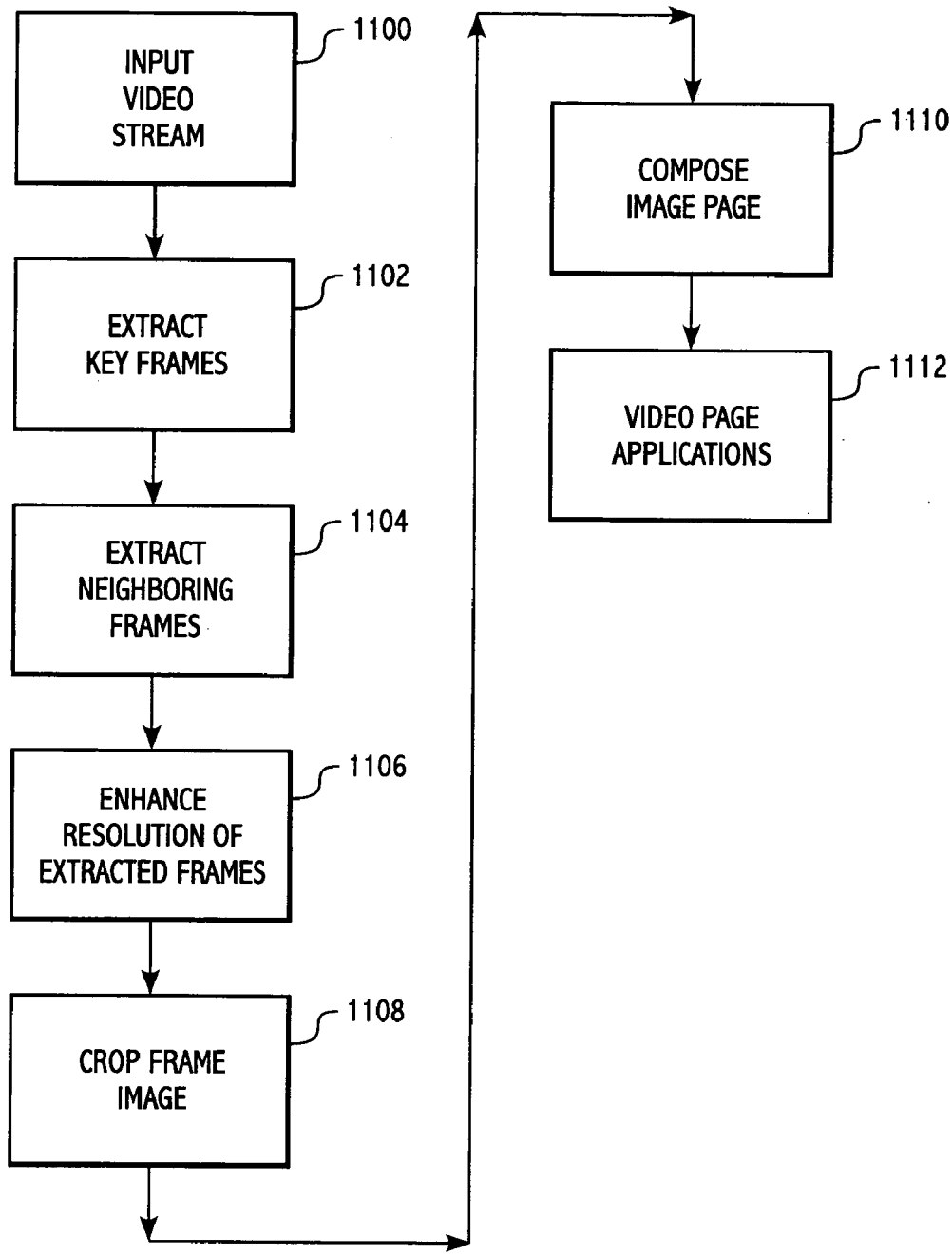
FIG. 11 shows a block flow chart of an exemplary method for producing a page using frames of a video stream.
Figure 12:
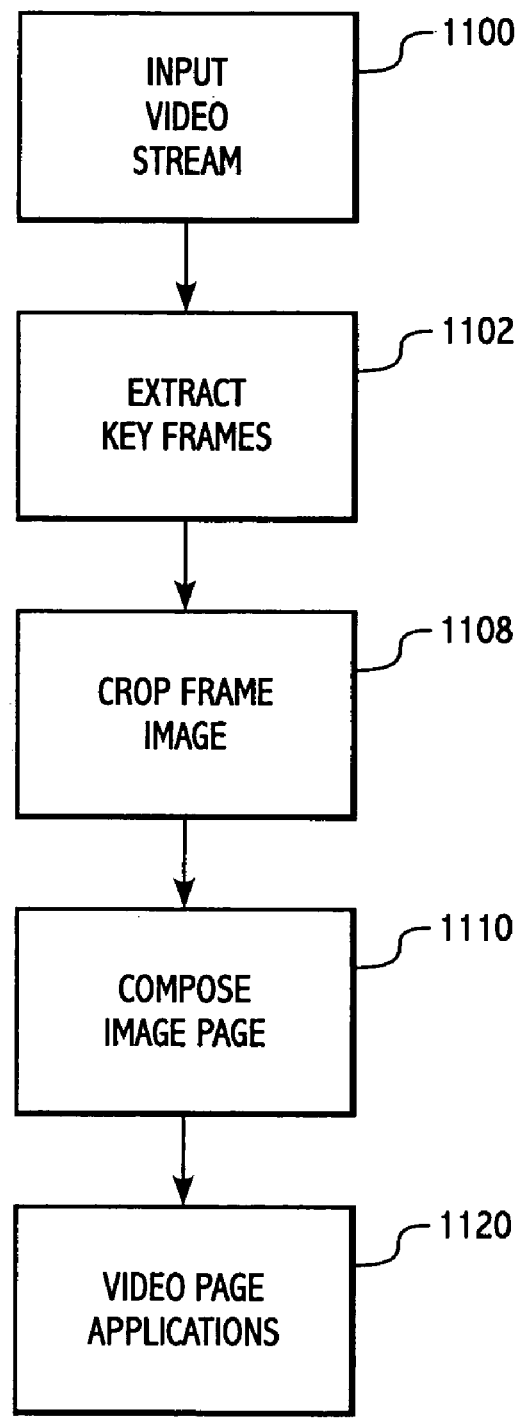
FIG. 12 shows a block flow chart of an alternative embodiment for producing a page using frames of a video stream.

Computer-executable instructions, or software, are provided for directing the processing of the computer 1000, including processing the steps of exemplary embodiments of the video stream page production system. Referring also to FIG. 11, the software can include instructions and modules for extracting key frames from the video stream 1100, extracting key frames from the video streams 1102, extracting frames adjacent to the extracted key frames 1104, enhancing the resolution of the extracted frames 1106, cropping the enhanced frames 1108, and composing image pages from the cropped frames 1110 for use in one or more video page applications 1112. In an alternative embodiment, as shown in FIG. 12, the neighboring frames extraction and the resolution enhancement steps are omitted in those applications where computer processing is to be minimized or where the quality of the image is high enough in the video stream to satisfy the requirements of the user or the video page application.

The computer-executable instructions, when executed by the computer 1000 and/or the processor(s) of the computer 1000, provide for the automatic composition or production of video pages that are representative of the content of the video stream. The software can be stored on a disk drive, can be loaded into the memory of the computer 1000, or can be stored onto separate storage means within the computer 1000. Further, the software can comprise separate programs and sets of instructions or can be combined into a single program, set of instructions, or program module. Means for supporting a computer-based system for automatic production of pages using frames of a video stream include the computer 1000 and its processor, along with the software, or computer instructions, for directing the computer 1000 and/or processor to analyze an input video stream and for producing one or more pages representative of the content of the video stream. Further, the page production software can be within the video stream creation device, such as the video camera 1004 or the digital camera 1006.

These and other aspects of the page production system and method will now be described in greater detail in connection with a number of exemplary embodiments. To facilitate an understanding of the embodiments, many aspects are described in terms of sequences of actions to be performed by elements of a computer system 1000 or apparatus. It will be recognized that in each of the embodiments, the various actions could be performed by specialized circuits, by computer program instructions being executed by one or more processors, or by a combination of both. Moreover, embodiments can additionally be considered to be embodied entirely within any form of computer readable storage medium having stored therein an appropriate set of computer instructions that would cause a processor to carry out the techniques described herein.

Exemplary embodiments can commence with step 1102 for extracting key frames, using multimedia understanding techniques to locate a set of representative frames in the input video stream. In contrast to extraction schemes relying on time stamps, exemplary embodiments automatically extract representative key frames that summarize the video stream or clip with low frame redundancy. The input to this step is a video stream or clip, and the user can specify control parameters such as the number of key frames to be extracted and the type of video being input. The output of this step is a set of key frames in common image formats such as JPG and BMP. In one embodiment, one or more neighboring, or adjacent, frames around each extracted key frame are also extracted at step 1104.

Video streams often have a resolution that is good enough for screen display, such as 72 dots per inch. High quality printed page resolution, however, generally falls within the range of 600-1200 dots per inch. Therefore, in one embodiment, the resolution of the extracted key and neighboring frames are enhanced at step 1106 to improve the appearance of the page produced by exemplary embodiments.

While the output from steps 1102 or 1106 are representative of the content of the video stream, the images can contain extraneous information that detracts from the actual content of the video stream and can be comprised of a single, possibly boring aspect ratio—that of the camera which produced the video stream. Accordingly, at step 1108, the key frames are automatically cropped to enhance the appearance of the images that are representative of the content of the video stream. The user can also specify various parameters, such as the aggressiveness of the cropping process, to control this step.

Once the key images are extracted, optionally enhanced, and cropped, they can be composed into aesthetically pleasing pages to best present the content of the video stream. This processing is performed in step 1110 and also permits the input of parameters to provide for user control of the process. While the various steps provide for user input of control parameters, the process can be viewed as fully automatic from the input of the video stream at step 1100 to the application of the composed video pages into various downstream processes at step 1112 in that the user can designate control parameters input at the beginning of the page production process, which then proceeds without further user input or intervention.

Figure 1:
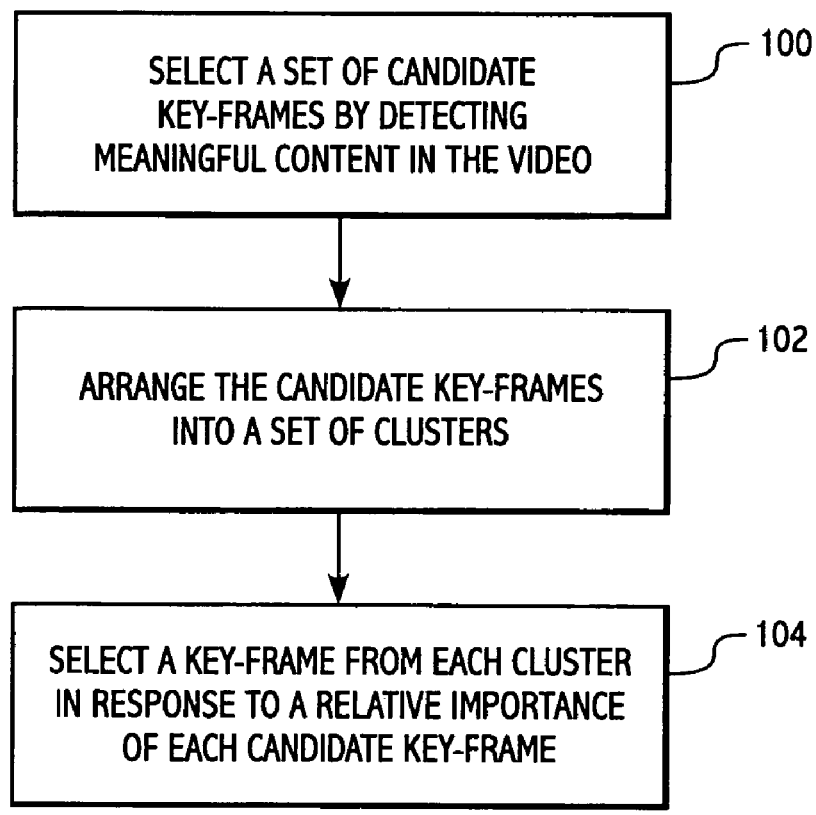
FIG. 1 shows an embodiment of a method for extracting a set of key frames from a video according to exemplary embodiments.

FIG. 1 shows an embodiment of a method for extracting a set of key frames from a video stream according to exemplary embodiments. At step 100, a set of candidate key frames is selected from among a series of video frames in the video stream. The candidate key frames are selected by performing a set of analyses on each video frame. Each analysis is selected to detect a meaningful content in the video. The meaningful content can be detected by analyzing camera motion in the video, object motion in the video, human face content in the video, and/or audio events in the video to name a few examples.

At step 102, the candidate key frames from step 100 are arranged into a set of clusters. The number of clusters can be fixed or can vary in response to the complexity of the content of the video. At step 104, one of the candidate key frames from each cluster is selected as a key frame for the video stream. The candidate key frames can be selected in response to a relative importance of each candidate key frame. A relative importance of a candidate key frame can be based on an overall level of meaningful content in the candidate key frame.

Figure 2:
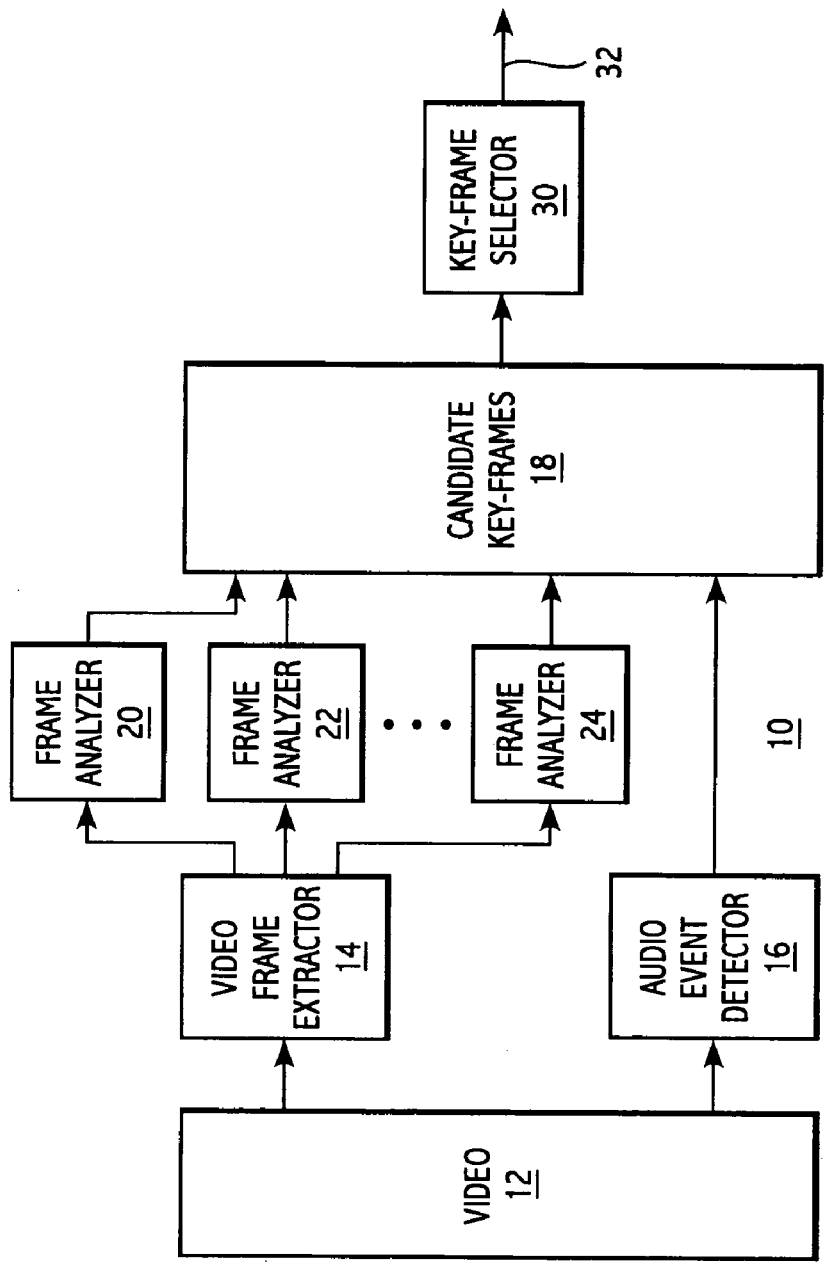
FIG. 2 shows an embodiment of the present key frame extraction system.

FIG. 2 shows an embodiment of a key frame extraction system 10 according to the present techniques. The key frame extraction system 10 extracts a set of key frames 32 from a video stream 12. The key frame extraction system 10 includes a video frame extractor 14 that extracts each video frame of a series of video frames in the video stream 12 and feeds the extracted video frames to a set of frame analyzers 20-24. Each frame analyzer 20-24 performs a corresponding analysis the video frames fed from the video frame extractor 14. Each analysis is selected to detect meaningful content in the video stream 12. Each frame analyzer 20-24 selects candidate key frames from the video frames of the video stream 12. The candidate key frames selected by the frame analyzers 20-24 are accumulated as a set of candidate key frames 18.

The key frame extraction system 10 includes an audio event detector 16 that detects audio events in the video stream 12. The video frames of the video stream 12 that correspond to the detected audio events are selected for inclusion in the candidate key frames 18. The key frame extraction system 10 includes a key frame selector 30 that selects the key frames 32 from among the candidate key frames 18 based on the relative importance of each candidate key frame 18. In addition, the key frame selector 30 selects the key frames 32 from among the candidate key frames 18 based on the relative image quality of each candidate key frame 18.

The frame analyzers 20-24 include a color histogram analyzer. The color histogram analyzer determines a color histogram for each video frame of the video stream 12. The difference in the color histograms of the video frames in the video stream 12 can be used to differentiate the content of the video frames. For example, the difference in the color histograms can be used to detect significant changes of the scene in the video stream 12. The color histogram analyzer selects a video frame in the video stream 12 as a candidate key frame if a relatively large change in its color histogram in comparison to previous video frames is detected. The color histogram analyzer normalizes the color histograms for the video frames in order to minimize the influence of lighting changes in the video stream 12.

Initially, the color histogram analyzer selects the first video frame in the video stream 12 as a candidate key frame and as a reference frame. The color histogram analyzer then compares a color histogram for the reference frame with a color histogram for each subsequent video frame in the video stream 12 until the difference in the color histograms is higher than a predetermined threshold. The color histogram analyzer then selects the video frame that exceeds the predetermined threshold as a candidate key frame and as the new reference frame and then repeats the process for the remaining video frames in the video stream 12.

A color histogram difference can be computed as follows. A color histogram for a video frame can be computed by combining values of the red, green, and blue components of each pixel in the video frame into one color code. The bit depth of the color code can be arbitrary. For example, a color code of 8 bits has a range of 0-255 and can include the four most significant bits of green and the two most significant bits of red and the two most significant bits of blue. As a consequence, the value of a color histogram H(k) for the video frame equals to the total number of pixels in the video frame having a color code equal to k, where k=0~255.

Let $H_i(k)$ and $H_j(k)$ denote the histogram values for the $i^{th}$ video frame and the $j^{th}$ video frame, respectively, and k=0~255. The color histogram difference between the $i^{th}$ video frame and the $j^{th}$ video frame is calculated as follows:

$$D_1(H_i, H_j) = \frac{1}{256} \sum_{k=0}^{255} |H_i(k) - H_j(k)|$$

Alternatively, the color histogram difference between the $i^{th}$ video frame and the $j^{th}$ video frame can calculated as follows to reflect more strongly the difference:

$$D_2(H_i, H_j) = \frac{1}{256} \sum_{k=0}^{255} (H_i(k) - H_j(k))^2$$

Luminance normalization can be applied because lighting changes can cause a shift in the color histogram for two consecutive video frames. This can cause two similar video frames to exhibit relatively large color histogram differences. Luminance normalization can be performed by normalizing the sum of the luminance of all pixels in a video frame. Normalization can be performed when a relatively large color histogram difference is detected between adjacent video frames. The luminance of the subsequent video frames can be normalized according to that of the reference frame until a new reference frame is selected.

Figure 3:
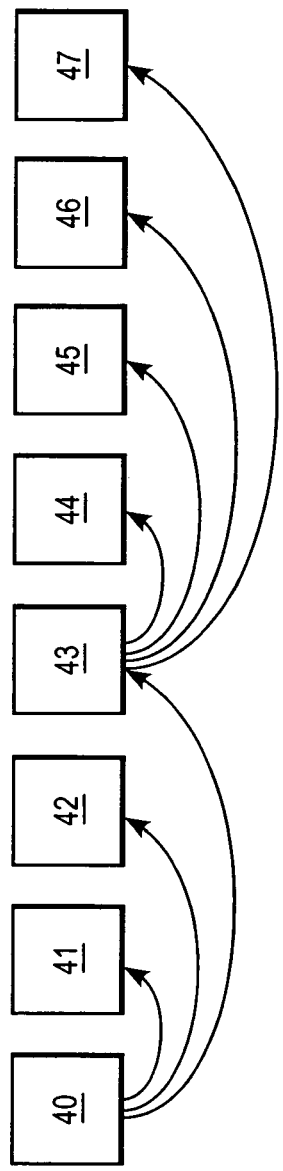
FIG. 3 illustrates the operations of a color histogram analyzer for an exemplary series of video frames in a video stream.

FIG. 3 illustrates the operations of a color histogram analyzer for an exemplary series of video frames 40-47 in the video stream 12. The video frame 40 is the initial video frame in the video stream 12 and is selected by the color histogram analyzer as an initial candidate key frame and as an initial reference frame.

The color histogram analyzer determines the color histogram for the video frame 40 and a color histogram for the video frame 41 and determines a difference in the color histograms of the video frames 40 and 41. The difference in the color histograms of the video frames 40 and 41 does not exceed the predetermined threshold. The color histogram analyzer determines a color histogram for the video frame 42 and a difference in the color histograms of the video frames 40 and 42. Again, the difference in the color histograms of the video frames 40 and 42 does not exceed the predetermined threshold. The color histogram analyzer determines a color histogram for the video frame 43 and a difference in the color histograms of the video frames 40 and 43. The difference in the color histograms of the video frames 40 and 43 exceeds the predetermined threshold so the color histogram analyzer selects the video frame 43 as another candidate key frame and as the new reference frame for comparison to color histograms for the subsequent video frames 44-47. In subsequent steps, the color histogram analyzer selects the video frame 47 as the next candidate key frame. The arrows shown in FIG. 3 depict the comparisons of color histograms between video frames 40-47.

The frame analyzers 20-24 include a color layout analyzer that determines a color layout for each video frame of the video stream 12. The color layouts in the video frames can be used to differentiate the content of the video frames. For example, differences in the color layouts of the video frames of the video stream 12 can be used to detect significant changes in the objects in the video stream 12 and to detect the movements of the objects in the video stream 12.

Figures 4A, 4B, 4C:
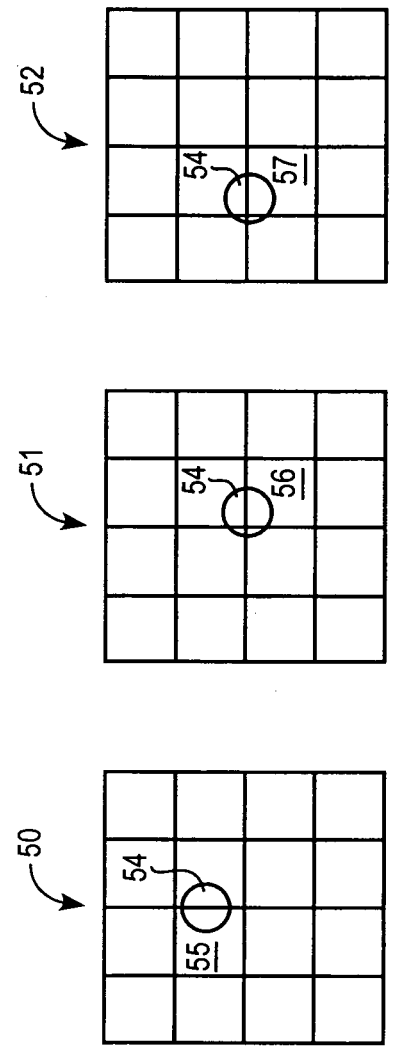
FIG. 4 shows a series of exemplary video frames in a video that include an object.

FIG. 4 shows a series of exemplary video frames 50-52 in the video stream 12 that include an object 54. The object 54 changes position within each subsequent video frame 50-52. The changing position of the object 54 is indicated by changes in the color layouts for the video frames 50-52. For example, the color content of the object 54 is mostly contained in a sub-block 55 of the video frame 50 and then moves mostly to a sub-block 56 of the video frame 51 and then mostly to a sub-block 57 of the video frame 52.

The color layout analyzer selects a video frame as a candidate key frame if a relatively large change in its color layout is detected in comparison to previous video frames in the video stream 12. Initially, the color layout analyzer selects the first video frame in the video stream 12 as a candidate key frame and as a reference frame. The color layout analyzer then compares a color layout for the reference frame with a color layout for each subsequent video frame in the video stream 12 until a difference is higher than a predetermined threshold. The color layout analyzer selects a video frame having a difference in its color layout that exceeds the predetermined threshold as a new candidate key frame and as a new reference frame and then repeats the process for the remaining video frames in the video stream 12.

A color layout difference can be computed by dividing a video frame into a number of sub-blocks. For example, if the width of a video frame is WIDTH and the height of the video frame is HEIGHT; and the video frame is divided into N×P sub-blocks, then the width of each sub-block is WIDTH/N and the height of each sub-block is HEIGHT/P. The average color of each sub-block can then be computed by averaging the red, green, and blue components, respectively, over the entire sub-block.

The color layout difference between two video frames can be computed by computing the difference of the average color of each pair of corresponding sub-blocks in the two video frames, i.e. compute an average of the absolute difference of each color component. The M sub-blocks with the greatest difference values are then selected out of the N×P sub-blocks. The average of the M difference values is computed to represent the color layout difference of the two video frames. Alternatively, other methods for computing color layout can be employed, e.g. methods defined in the MPEG-7 standard.

The color layout and color histogram analyzers yield candidate key frames that differ substantially in terms of color layout and/or color histogram. Candidate key frames that differ substantially in color layout and/or color histogram enable the selection of key frames that show different views of a scene in the video stream 12 while avoiding redundancy among the selected key frames.

The frame analyzers 20-24 include a fast camera motion detector. The fast camera motion detector can detect a fast motion of the camera that captured the video stream 12 by detecting a relatively large difference in the color layouts or the color histograms of adjacent video frames over a number of consecutive video frames in the video stream 12. The video frames in the video stream 12 that correspond to periods of fast camera motion are not selected for the candidate key frames 18 because fast motion tends to blur images. Instead, the fast camera motion detector selects a candidate key frame once the fast camera motion stops and the camera stabilizes.

The frame analyzers 20-24 include a camera motion tracker. The camera motion tracker detects highlights in the content of the video stream 12 by tracking the motion of the camera the acquired the video stream 12. The camera motion tracker detects a camera motion in the video stream 12 by analyzing a relative motion among a series of video frames of the video stream 12. The camera motion tracker can determine a relative motion among the video frames in the video stream 12 using a block-based motion analysis such as that associated with MPEG encoding.

FIGS. 5A-5C illustrate an exemplary method that can be employed by the camera motion tracker to determine a relative motion among a pair of adjacent video frames 60-62 in the video stream 12. The camera motion tracker compares the pixel content of the video frames 60 and 62 and determines that a block 70 of the video frame 60 is substantially similar to a block 72 in the video frame 62. For example, the camera motion tracker can determine a correlation metric between the blocks 70 and 72 based on the pixel data values in the blocks 70 and 72 to determine the similarity. The camera motion tracker generates a motion vector 74 that indicates a spatial relationship between the blocks 70 and 72 based on the video frame 60 as a reference frame. The camera motion tracker generates a set of motion vectors for the video frames 60-62, each motion vector corresponding to a block of the reference video frame 60. The camera motion tracker examines an arrangement of the motion vectors for pairs of adjacent video frames in the video stream 12 to detect a motion.

The camera motion tracker can detect a panning motion by detecting an arrangement of motion vectors for adjacent video frames having magnitudes and directions that exhibit a relatively consistent direction and uniform magnitude. The camera motion tracker can detect a zooming in motion by detecting an arrangement of motion vectors for adjacent video frames that point away from the center of a video frame. The camera motion tracker can detect a zooming out motion by detecting an arrangement of motion vectors for adjacent video frames that point to the center of a video frame. The camera motion tracker can detect a period of focus by detecting an arrangement of near zero motion vectors in adjacent video frames. The camera motion tracker can detect a period of fast panning or tilting camera motion by detecting motion vectors for adjacent video frames having relatively high magnitudes and uniform directions.

The camera motion tracker selects candidate key frames using a set of camera motion rules. One camera motion rule involves a camera focus after a period of panning or zooming motion. If the camera motion tracker detects a period of time when the camera focuses after a period of panning or zooming motion then a candidate key frame is selected shortly after the beginning of the period of focus. The period of focus can correspond to a scene or object of interest in the video stream 12.

Another camera motion rule involves a panning motion after a relatively long period of focus at the beginning of the video stream 12. If the camera motion tracker detects a panning motion after a relatively long period of focus at the beginning of the video stream 12, then a candidate key frame is selected at the beginning of the panning motion. The beginning of the panning motion can be an indication of an upcoming highlight in the video stream 12.

Another camera motion rule involves a fast camera motion in the video stream 12. If the camera motion tracker detects a fast camera motion in the video stream 12, then no candidate key frames are selected during the period of fast camera motion. A period of fast camera motion can indicate content in the video stream 12 that was of no interest to the operator of the camera that acquired the video stream 12.

The frame analyzers 20-24 include an object motion analyzer. The object motion analyzer examines the trajectories of moving objects in the video stream 12 by comparing small-grid color layouts in the video frames. The object motion analyzer selects a candidate video frame when a new object appears or when the motion of an object changes significantly in terms of object size or object location within a video frame. The object motion analyzer preferentially selects video frames having moving objects located near the middle of the video frame.

FIG. 6 shows a pair of adjacent video frames 110-112 in the video stream 12 that capture a moving object 114. The object motion analyzer selects the video frame 112 as a candidate video frame because the moving object 114 has substantial size within the video frame 112 and is positioned near the center of the video frame 112. The object motion analyzer detects the moving object 114 based on a set of observations pertaining to moving objects. One observation is that the foreground motion in the video stream 12 differs substantially from the background motion in the video stream 12. Another observation is that the photographer that captured the video stream 12 was interested in capturing moving objects of moderate size or larger and was interested in keeping a moving object of interest near the center of a camera viewfinder. Another observation is that the camera operator was likely interested in one dominant moving object at a time.

Figure 7A:
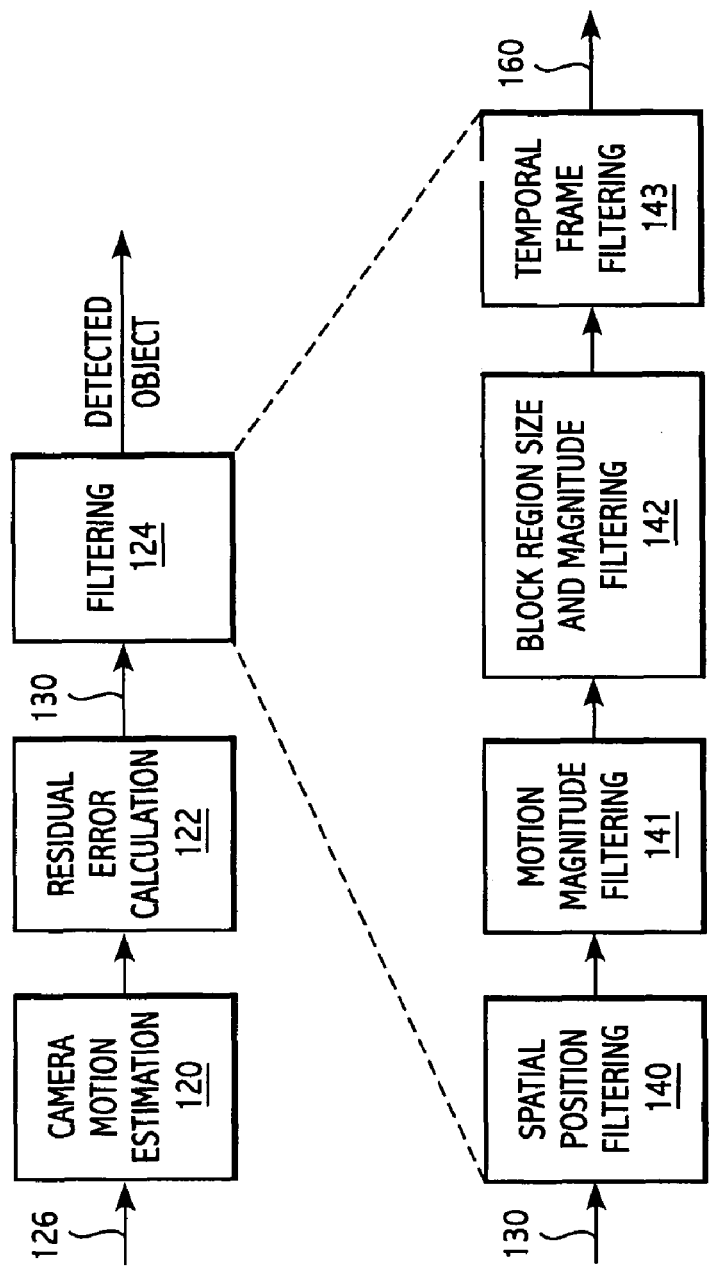
FIGS. 7A-7B show a method for detecting a moving object in a video frame.
Figure 7B:
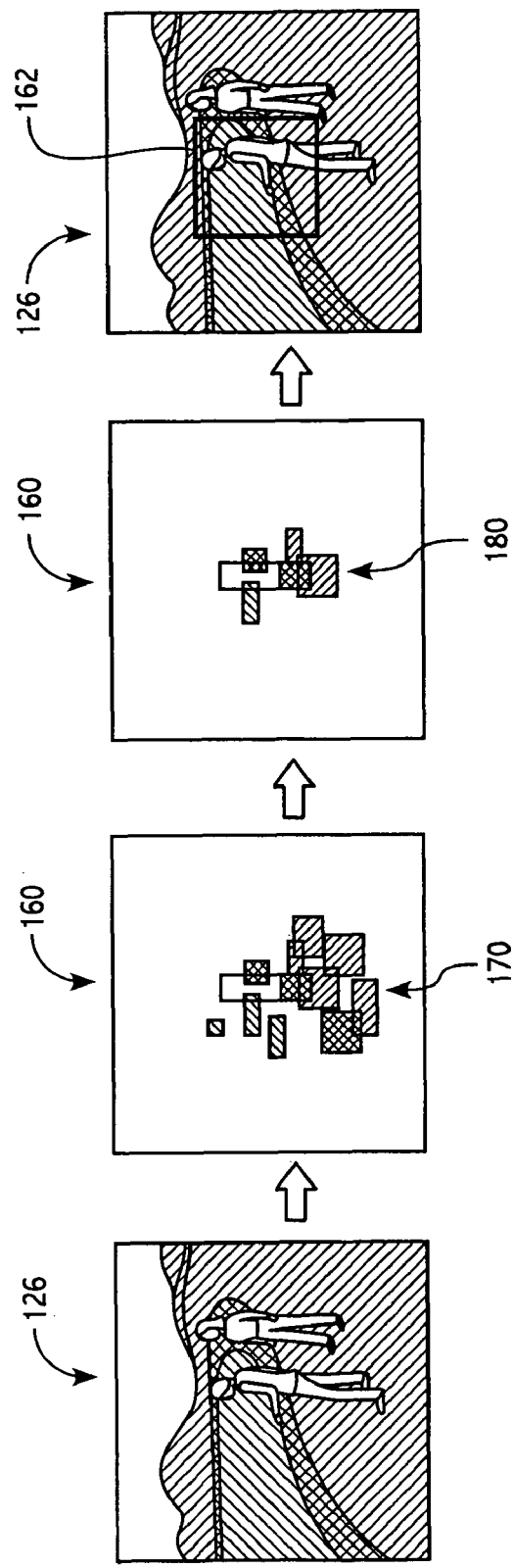

FIGS. 7A-7B show an exemplary method performed by the object motion analyzer to detect a moving object in a video frame 126 of the video stream 12. The object motion analyzer first performs a camera motion estimation 120 on the video frame 126. The object motion analyzer then generates a residual image 130 by performing a residual error calculation in response to the camera motion estimate for the video frame 126. The object motion analyzer then applies a filtering 124 to the residual image 130. The filtering 124 includes a series of filters 140-143. FIG. 7B shows a filtered residual image 160 derived from the residual image 130.

The object motion analyzer then clusters a set of blocks 170 in the filtered residual image 160 based on the connectivity of the blocks 170. The object motion analyzer maintains a cluster of blocks 180 which is the biggest cluster near the middle of the video frame 126 while removing the remaining of the blocks 170 as shown in FIG. 7B. The object motion analyzer then determines a box 162 for the blocks 180 that depicts the position of the detected moving object in the video frame 126 as shown in FIG. 7B. Once the moving object in the box 162 is detected, the object motion analyzer tracks it through the video frames of the video stream 12 that follow the video frame 126. The object motion analyzer can track an object using any of a variety of known methods for tracking object motion in successive video frames.

The frame analyzers 20-24 can include a human face detector. The human face detector selects candidate key frames which contain human faces from among the video frames of the video stream 12 because it can be assumed that the video frames that contain human faces are more likely to be of interest to a viewer of the video stream 12 than the video frames that do not include a human faces. The human face detector can also record the size and frame positions of any human faces that are detected. The human face detector can employ known methods for human face detection including methods based on pattern matching, e.g. matching an arrangement of human facial features.

The audio event detector 16 detects audio events in the sound track of the video stream 12 that can indicate a highlight. Examples of audio events can include applause, screaming, acclaim, and the start of high level noise after a period of silence. The audio event detector 16 selects the video frames in the video stream 12 that correspond to the start of an audio event for inclusion in the candidate key frames 18. The audio event detector 16 can employ statistical models of the audio energy for a set of predetermined audio events and then match the audio energy in each video frame of the video stream 12 to the statistical models.

Figure 8A:
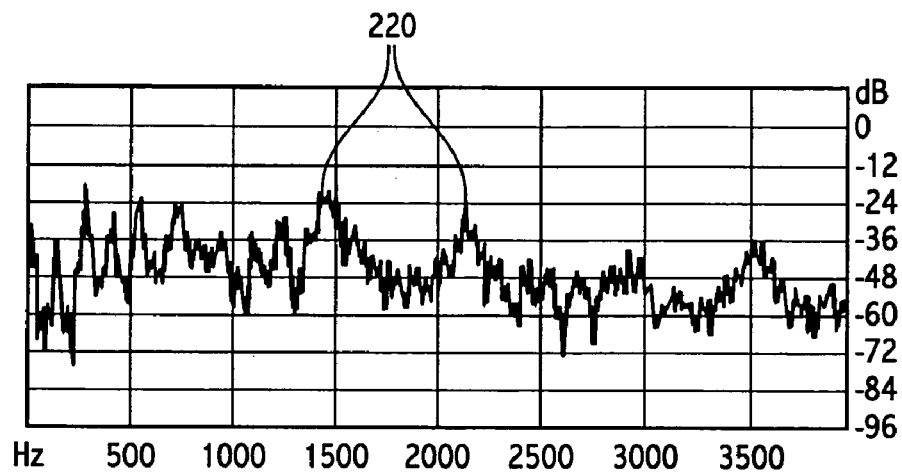
FIGS. 8A-8B illustrate exemplary audio events for selecting candidate key frames.

FIG. 8A is an audio spectrum for an exemplary audio event 220. The exemplary audio event 220 is the sound of screaming which is characterized by a relatively high-level rapidly changing pitch. The audio event detector 16 searches the sound track of the video stream 12 for screaming pitch, i.e. fundamental frequency, and partials, i.e. integer multiples of the fundamental frequency, in the frequency domain of the audio signal; and a candidate key frame is selected at the point of screaming.

Figure 8B:
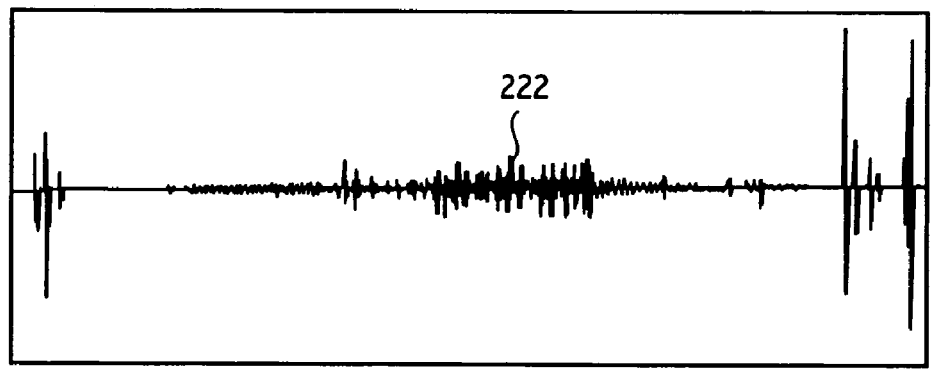

FIG. 8B is an audio signal waveform of an exemplary audio event 222 that is a period of noise or speech after a relatively long period of silence. The audio event detector 16 tracks the energy level of the audio signal and selects a candidate key frame at a point 222 which corresponds to the start of a period of noise or speech after a relatively long period of silence.

Figure 9:
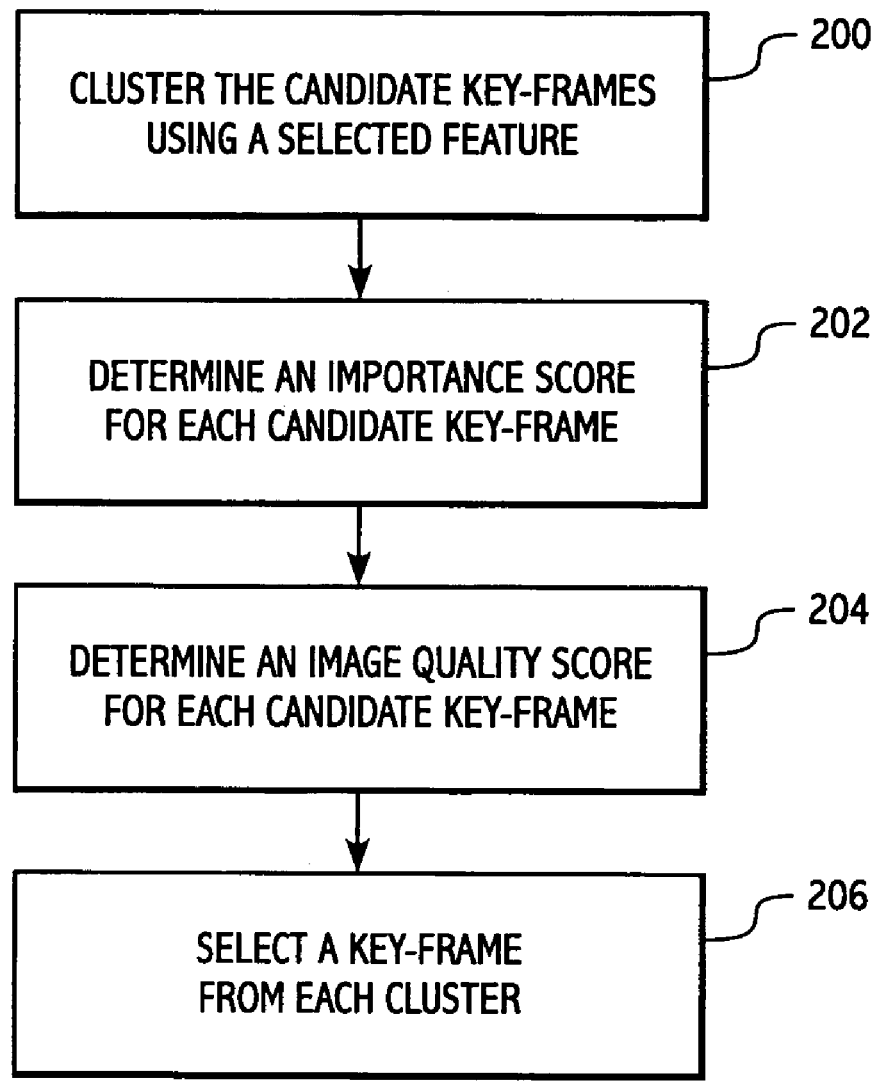
FIG. 9 shows an embodiment of a method for selecting a set of key frames from among a set of candidate key frames.

FIG. 9 shows an embodiment of a method employed by the key frame selector 30 to select the key frames 32 from among the candidate key frames 18. At step 200, the key frame selector 30 clusters the candidate key frames 18 on the basis of a feature of each candidate key frame 18. In one embodiment, the key frame selector 30 clusters the candidate key frames 18 in response to the color histogram of each candidate key frame 18. In other embodiments, other features of the candidate key frames 18 can be used as the basis for clustering at step 200.

The key frame selector 30 can cluster the candidate key frames 18 into a fixed number N of clusters at step 200. For example, in an embodiment in which 4 key frames are to be selected, the key frame selector 30 clusters the candidate key frames 18 into 4 clusters. The number of key frames can be limited to that which is suitable for a particular use, e.g. video postcard, video storybook, LCD display on cameras or printers, etc. Initially, the key frame selector 30 randomly assigns N of the candidate key frames 18 to respective clusters 1-N. The color histograms of these candidate key frames provide an initial centroid for each cluster 1-N. The key frame selector 30 then iteratively compares the color histograms of the remaining candidate key frames 18 to the centroids for the clusters 1-N and assigns the candidate key frames 18 to the clusters 1-N based on the closest matches to the centroids and updates the centroids for the clusters 1-N accordingly.

The key frame selector 30 can cluster the candidate key frames 18 into a variable number n of clusters at step 200. The value of n can vary according to the complexity of the content of the video stream 12. For example, the key frame selector 30 can employ a greater number of clusters in response to more diversity in the content of the video stream 12. This can be used to yield more key frames 32 for use in, for example, browsing a video collection. Initially, the key frame selector 30 assigns a first of the candidate key frames 18 to cluster 1 and uses its color histogram as a centroid of the cluster 1. The key frame selector 30 then compares a color histogram for a second of the candidate key frames 18 to the centroid of cluster 1. If a difference from the centroid of the cluster 1 is below a predetermined threshold, then the second of the candidate key frames is assigned to cluster 1; and the centroid for the cluster 1 is updated with the color histogram of the second of the candidate key frame 18. If the color histogram of the second of the candidate key frames 18 differs from the centroid of the cluster 1 by an amount that exceeds the predetermined threshold, then the second of the candidate key frames is assigned to cluster 2; and its color histogram functions as the centroid for the cluster 2. This process repeats for the remainder of the candidate key frames 18.

At step 202, the key frame selector 30 determines an importance score for each of the candidate key frames 18. The importance score of a candidate key frame is based on a set of characteristics of the candidate key frame. One characteristic used to determine an importance score for a candidate key frame is whether the candidate key frame satisfies one of the camera motion rules of the camera motion tracker. If a candidate key frame satisfies one of the camera motion rules, then the key frame selector 30 credits the candidate key frame with one importance point.

Another characteristic used to determine an importance score for a candidate key frame is based on any human faces that can be contained in the candidate key frame. Factors pertinent to this characteristic include the number of human faces in the candidate key frame, the size of the human faces in the candidate key frame, and the position of the human faces within the candidate key frame. The key frame selector 30 counts the number of human faces (F) that are contained in a predetermined area range, e.g. a center area, of a candidate key frame and that are larger than a predetermined size and credits the candidate key frame with F importance points.

Another characteristic used to determine an importance score for a candidate key frame is based on moving objects in the candidate key frame. The key frame selector 30 credits a candidate key frame with M importance points if the candidate key frame includes a moving object having a size that is within a predetermined size range. The number M is determined by the position of the moving object in the candidate key frame in relation to the middle of the frame. The number M equals 3 if the moving object is in a predefined middle area range of the candidate key frame. The number M equals 2 if the moving object is in a predefined second-level area range of the candidate key frame. The number M equals 1 if the moving object is in a predefined third-level area range of the candidate key frame.

Another characteristic used to determine an importance score for a candidate key frame is based on audio events associated with the candidate key frame. If a candidate key frame is associated with an audio event detected by the audio event detector 16, then the key frame selector 30 credits the candidate key frame with one importance point. The key frame selector 30 determines an importance score for each candidate key frame 18 by tallying the corresponding importance points.

At step 204, the key frame selector 30 determines an image quality score for each of the candidate key frames 18. The image quality score for a candidate key frame can be based on the sharpness of the candidate key frame or on the brightness of the candidate key frame or a combination of sharpness and brightness. The key frame selector 30 can perform known methods for determining the sharpness and the brightness of a video frame when determining an image quality score for each candidate key frame 18.

At step 206, the key frame selector 30 selects the key frames 32 by selecting one candidate key frame from each cluster of the candidate key frames 18. The key frame selector 30 selects the candidate key frame in a cluster having the highest importance score and having an image quality score that exceeds a predetermined threshold. For example, the key frame selector 30 initially selects the candidate key frame in a cluster having the highest importance score and if its image quality score is below the predetermined threshold then the key frame selector 30 selects the candidate key frame in the cluster having the next highest importance score, etc. until the image quality score threshold is satisfied. If more than one candidate key frame has the highest importance score then the one that is closest to the centroid of the cluster is selected.

The key frame extraction system 10 can enable automatic user selection of key frames for the video stream 12. For example, the key frames 32 can be used as an initial set. On the basis of the initial set, user-provided control parameters instruct the system to browse the previous frames and the subsequent frames to each key frame in the initial set to find the exact frame that is to be printed or emailed to friends, etc. In another example, the key frame selector 30 can select X candidate key frames for each cluster, e.g. the X candidate key frames the highest importance scores. The key frame extraction system 10 can include a display 1020 and a user interface mechanism. The X candidate key frames for each cluster can be rendered on the display 1020, and a user can select the most appealing of the candidate key frames via the user interface mechanism.

In an embodiment of the page production system, one or more frames neighboring, or adjacent to, each extracted key frame, can also be extracted in step 1104 for subsequent use in enhancing the resolution of the extracted key frames, as depicted as step 1106 in FIG. 11.

The present techniques can be used to manage collections of video clips, e.g. collections of short video clips acquired with a digital camera 1006, as well as unedited long shots in video recordings acquired with camcorders 1004. The key frames extracted from video clips can be used for video printing as discussed below regarding steps 1110 and 112 of FIGS. 11 and 12. The above methods for key frame extraction yield key frames that can indicate highlights in a video clip and depict content in a video clip that can be meaningful to a viewer. The multiple types of content analysis performed by the frame analyzers 20-24 enable extraction of key frames that provide a comprehensive representation of the content of video clips. The extracted key frames can be used for thumbnail representations of video clips, for previewing video clips, as well as categorizing and retrieving video data. Extracted key frames can be used for printing calendars, storybooks, postcards, posters, DVD cover pages, collages, etc.

As shown in step 1106 of FIG. 11, exemplary embodiments of the page production system can incorporate a dynamic approach to enhance the spatial resolution of an image sequence that allows different regions of the scene captured in the extracted key frames to be treated differently. In this way, these embodiments are able to avoid artifacts that otherwise might result from treating all regions of the scene in the same way during the resolution enhancement process. In addition, these embodiments are able to dynamically tailor the image resolution enhance process in an intelligent way. In particular, these embodiments deploy image processing resources to different regions of an enhanced resolution image of extracted key frames at varying computational intensity levels to achieve high quality resolution enhancement results in an accurate and efficient way.

Figure 13:
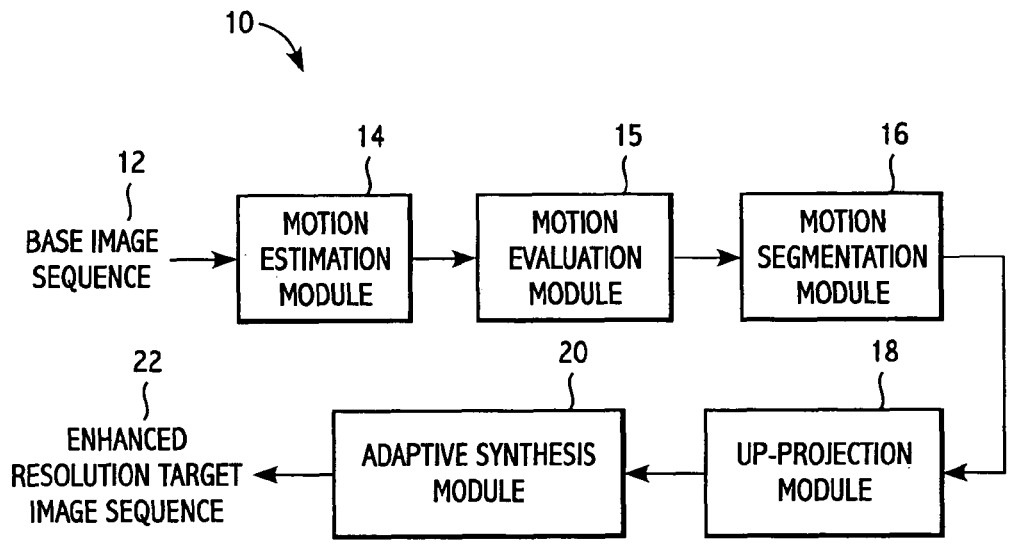
FIG. 13 is a block diagram of an embodiment of a system for enhancing the resolution of a reference image in a sequence of base images.

FIG. 13 shows an embodiment of a system 10 for processing a sequence of base images 12 that includes a motion estimation module 14, a motion evaluation module 15, a motion segmentation module 16, an up-projection module 18, and an adaptive synthesis module 20. The system 10 is configured to produce a sequence of enhanced resolution target images 22, or enhanced key frames. In some implementations, the system 10 also can be configured to produce a sequence of target images that have the same spatial resolution as the base images 12, but in which any compression, luminance and color aliasing artifacts associated with the base images are reduced.

In general, the modules 14-20 of system 10 are not limited to any particular hardware or software configuration, but rather they can be implemented in any computing or processing environment, including in digital electronic circuitry or in computer hardware, firmware, device driver, or software, including computer 1000. For example, in some implementations, these modules 14-20 can be embedded in the hardware of any one of a wide variety of digital and analog electronic devices, including desktop and workstation computers 1000, digital still image cameras 1006, digital video cameras 1004, printers 1014, scanners, and portable electronic devices (e.g., mobile phones, laptop and notebook computers, and personal digital assistants).

The base image sequence 12 can correspond to an original base image sequence that was captured by an image sensor (e.g., a video image sequence or a still image sequence) or a processed version of such an original base image sequence, such as the key frames extracted from the video stream. In order to achieve spatial resolution enhancement of the base image sequence 12, at least some of the base images correspond to displaced images of the same scene so that different samplings of the scene can be combined into an enhanced resolution target image.

Each target image 22 is produced from pixel value contributions from a selected set of the base images 12, including one that is designated the "reference image" and one or more base images that neighbor, or are adjacent to, the reference image in the sequence. It will be understood that the present discussion will use the terms, "reference image" and "extracted key frame," interchangably. As also used herein, the term "neighboring base images" refers to base images within a prescribed number of base images of each other in a base image sequence without regard to the temporal ordering of the neighboring base images in terms of capture time. In addition, the term "successive base images" refers to adjacent base images in a base image sequence that can be ordered chronologically or reverse-chronologically in terms of capture time. The number of neighboring images used to compute a target image, and the relative positions of the neighboring images in the sequence, can be determined by implementation-specific parameters. In some implementations, three successive neighboring base images on either side of the reference image in the base image sequence are processed with each reference image, for a total of seven base images that are processed for each target image.

Figure 14A:
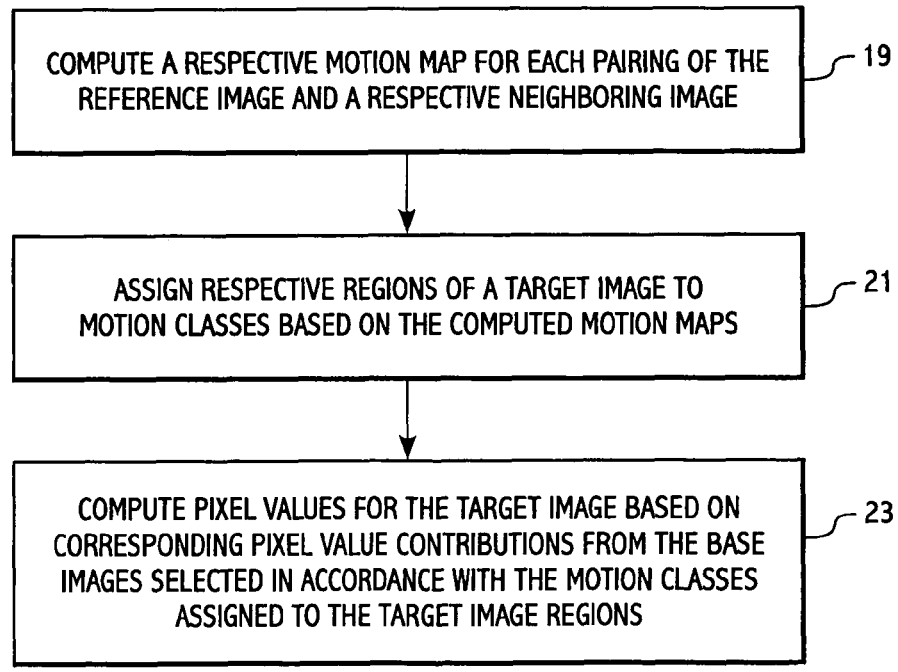
FIG. 14A is a flow diagram of an embodiment of a method of enhancing the resolution of a reference image in a sequence of base images.

Referring to FIG. 14A, in some embodiments, image processing system 10 processes base image sequence 12 to produce the target image sequence 22 as follows. Motion estimation module 14 computes a respective motion map for each pairing of a reference image and a respective image neighboring the reference image in the sequence of base images 12 (block 19). Each motion map comprises a set of motion vectors mapping reference image pixels to respective neighboring image pixels. Respective regions of a target image 22 are assigned to motion classes based on the computed motion maps (block 21). The target image has a target resolution level and the base images have a base resolution level equal to or lower than the target resolution level. Pixel values for the target image are computed based on corresponding pixel value contributions from the base images 12 selected in accordance with the motion classes assigned to the target image regions (block 23).

Figure 14B:
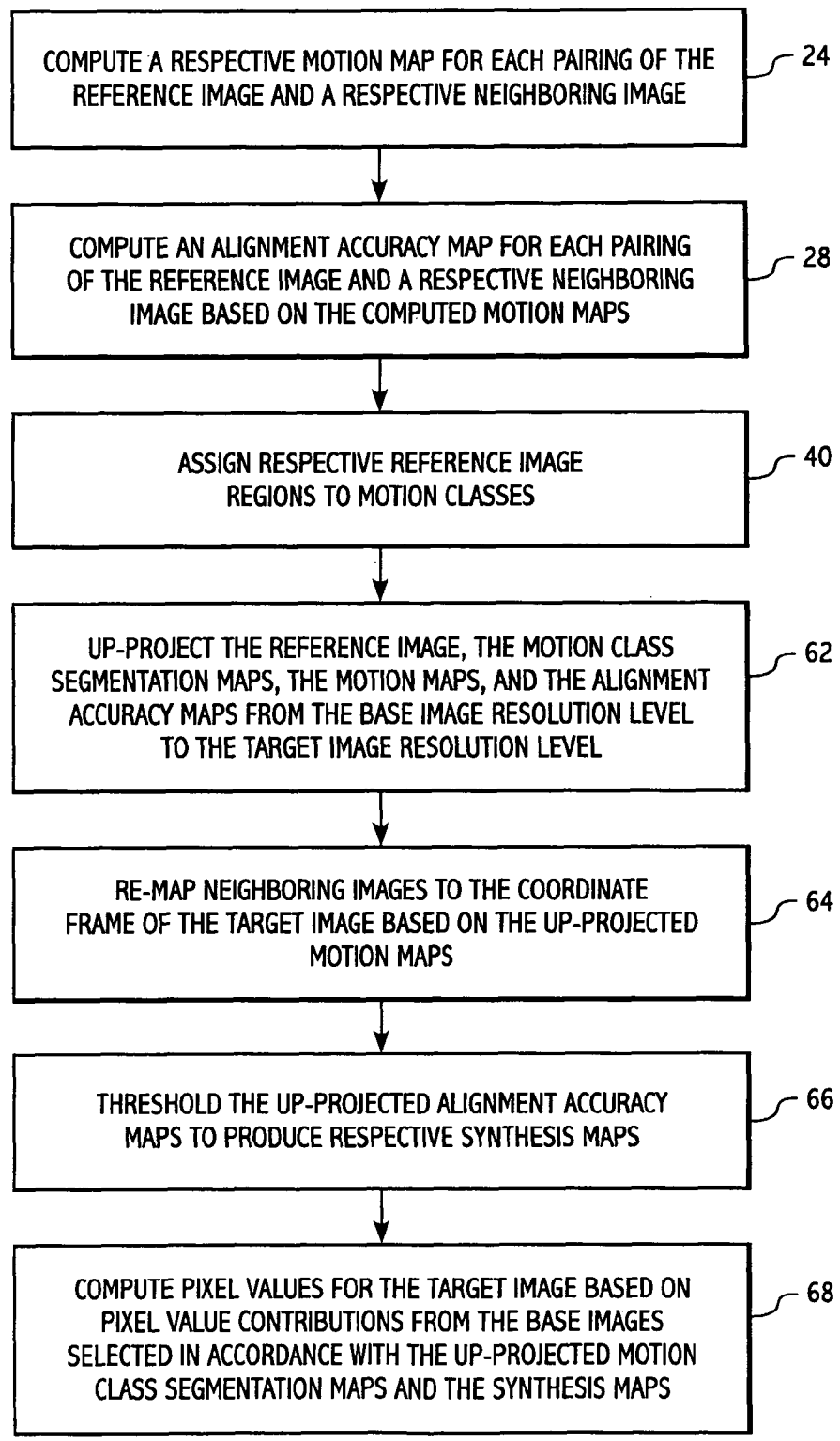
FIG. 14B is a flow diagram of an implementation of the embodiment of FIG. 14A.
Figure 15:
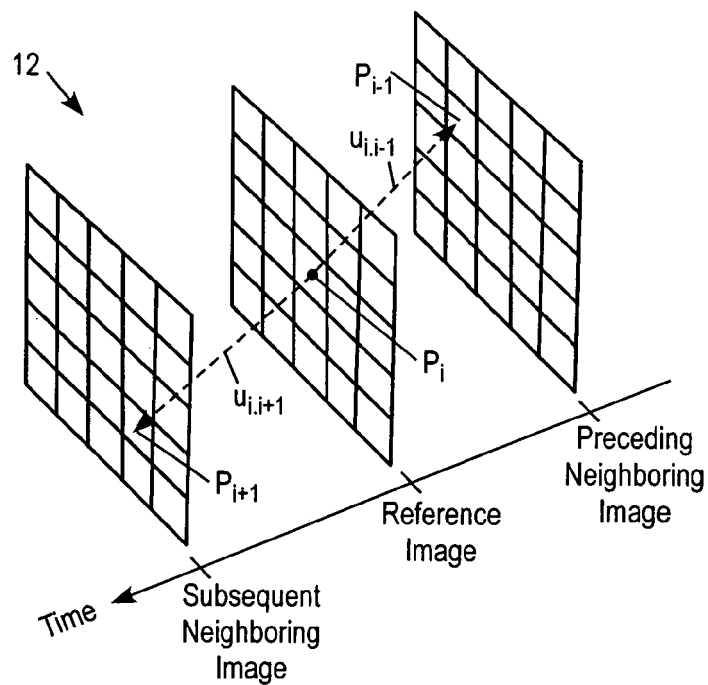
FIG. 15 is a diagrammatic view of motion vectors mapping a pixel of a reference image to respective pixels of images neighboring the reference image in a sequence of base images.

FIG. 14B shows one of many possible implementations of the image processing embodiment of FIG. 14A. Motion estimation module 14 computes a respective motion map (or motion correspondence map) for each pairing of the reference image and a respective neighboring image (block 24). Each motion map includes a set of motion vectors $U_{i,k}$ that map each reference image pixel $P_i$ to respective neighboring image pixels $P_{i+1}$, $P_{i-1}$, as shown in FIG. 15. The motion vectors estimate the inter-frame motion of features or objects appearing in the base images 12. In general, motion estimation module 14 can compute motion vectors based on any model for estimating the motion of image objects. For example, motion vectors can be computed based on an affine motion model that describes motions that typically appear in image sequences, including translation, rotation, zoom, and shear. Affine motion is parameterized by six parameters as follows:

$$U_x(x,y)=a_{x0}+a_{x1}x+a_{x2}y \quad (1)$$

$$U_y(x,y)=a_{y0}+a_{y1}x+a_{y2}y \quad (2)$$

wherein $U_x(x,y)$ and $U_y(x,y)$ are the x and y components of a velocity motion vector at point (x,y), respectively, and the $a_k$'s are the affine motion parameters.

Figure 16A:
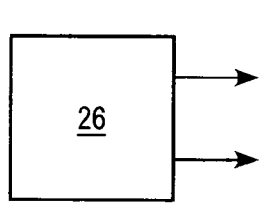
FIGS. 16A-16D are diagrammatic views of different respective motions that typically appear in dynamic images.
Figure 16B:
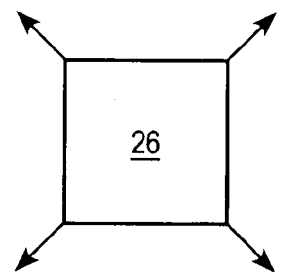
Figure 16C:
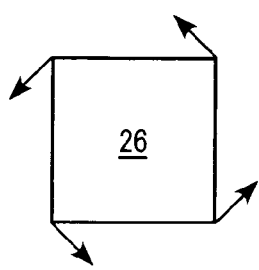
Figure 16D:
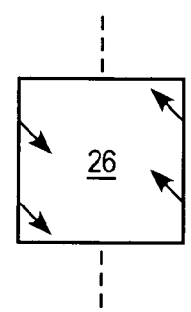

Examples of an affine motion model are illustrated in FIGS. 16A-16D. FIG. 16A shows parallel motion vectors that represent a translation of an object 26 at a constant distance from an image sensor (or image sensors). FIG. 16B shows vectors having a common focus of expansion that represent translation of object 26 in depth relative to the image sensor, or zooming (uniform scaling) motion. FIG. 16C shows concentric motion vectors that represent rotation of object 26 within the imaging plane. FIG. 16D represents rotation of object 26 with respect to Y axis.

In some embodiments, the motion maps of image pairs are represented as vector fields in the coordinate system of the reference image, which defines the coordinate system of the target image to be enhanced. A vector field U(P) the reference image $I_r(P)$, and the neighboring image $I_t(P)$ (e.g., one of the images preceding or succeeding the image to be enhanced in a image sequence), satisfy:

$$I_r(P)=I_t(P-U(P)) \quad (3)$$

where P=P(x, y) represents pixel coordinates. Therefore, each of the neighboring images can be warped to the coordinate frame of the corresponding reference image using equation (3) to create:

$$I_t^w(P)=I_t(P-U(P)) \quad (4)$$

where $I_t^w(P)$ is the warped neighboring image. FIG. 17A shows an example of a preceding neighboring image re-mapped to the coordinate frame of a corresponding reference image in accordance with equation (4), where the cross-hatched areas are regions of the re-mapped image that do not overlap with the coordinate frame of the reference image. Similarly, FIG. 17B shows an example of a subsequent neighboring image re-mapped to the coordinate frame of a corresponding reference image in accordance with equation (4).

In a typical image sequence of base images, if the motion vectors are computed correctly, the warped neighboring image should look very similar to the corresponding reference image. In the case of video sequences, the reference and neighboring images are captured at two different times. As a result, the pixel motion between images is due to both camera motion and also the motion of scene points moving independently. The motion of pixels is therefore unconstrained (non-parametric). Accordingly, in some embodiments, motion estimation module 14 computes movements of individual pixels or groups of pixels from a given base image to a neighboring base image based on a non-parametric optical flow model (or dense motion model). The motion estimates can be computed for one or both of forward and backwards transitions in time (i.e., from an earlier-captured base image to a later-captured base image, or from a later-captured base image to an earlier-captured base image).

In some embodiments, motion is modeled as a smoothly varying flow field, and motion analysis exploits local smoothness of optical flow fields. In this optical flow model, the movements are represented by velocity vectors (dx/dt, dy/dt) that describe how quickly a pixel (or a group of pixels) is moving across an image, and the direction of pixel movement. The optical flow model represents a projection of three-dimensional object motion onto the image sensor's two-dimensional image plane. Any one of a wide variety of optical flow computation methods can be used by the motion estimation module 14 to compute motion vectors. In some implementations, a multi-scale coarse-to-fine algorithm based on a gradient approach can be used to compute the optical flow motion vectors.

In some of these embodiments, the reference and neighboring image pairs are represented by Laplacian or Gaussian multi-resolution pyramids. In this way, these embodiments are able to accommodate a wide range of displacements, while avoiding excessive use of computational resources and generation of false matches. In particular, using a multi-resolution pyramid approach allows large displacements to be computed at low spatial resolution. Images at higher spatial resolution are used to improve the accuracy of displacement estimation by incrementally estimating finer displacements. Another advantage of using image pyramids is the reduction of false matches, which is caused mainly by the mismatches at higher resolutions under large motion. Motion estimation in a multi-resolution framework helps to eliminate problems of this type, since larger displacements are computed using images of lower spatial resolution, where they become small displacements due to sub-sampling.

In these embodiments, motion estimation module 14 uses a pyramid-based hierarchical image alignment technique to align two input images (i.e., a neighboring image and a corresponding reference image). A Laplacian or Gaussian pyramid is constructed from each of the two input images, and motion parameters are estimated in a coarse-to-fine manner. Within each pyramid level the sum of squared differences (SSD) measure integrated over regions of interest (which is initially the entire image region) is used as a match measure:

$$E(U(P)) = \sum_P (I_r(P) - I_t(P - U(P)))^2 \quad (5)$$

where I is the Laplacian or Gaussian filtered image intensity. The sum is computed over all the points P within the region and is used to denote the SSD error of the entire motion field within that region. The motion field is modeled by a set of global parameters (e.g., plane parameters) and local parameters (e.g., optical flow) as described above.

Numerical methods such as Gauss-Newton minimization is applied to the objective function described in equation (5) in order to estimate the unknown motion parameters and the resulting motion field. Starting with some initial values (typically zero), the hierarchical estimation algorithm iteratively refines the parameters in order to minimize the SSD error described in equation (5) from coarse to fine resolutions. After each motion estimation step, the current set of parameters is used to warp the neighboring image to the coordinate frame of the reference image, as described in equation (4), in order to reduce the residual displacement between the images.

The optical flow at each pixel is assumed to be locally constant in a small window around that pixel. The flow for a pixel is estimated by using all the pixels in its window. This process is repeated for each pixel and results in a smoothly varying flow field. In some implementations, dense optical flow is estimated using five windows 30, 32, 34, 36, 38, on and off-centered around each pixel under examination, as illustrated in FIG. 18. Local flow is computed for each window. The motion estimate that produces the smallest local error is used as the motion estimate for the pixel under consideration. Away from occlusion boundaries, the multiple windows 30-38 provide equally good estimates. However, at or near occlusion boundaries, the window with the best estimate will correspond only to the occluding surface. The non-optimal window estimates will come from the mixed estimate corresponding to the boundary between the occluding and occluded surfaces. Choosing the best estimate leads to crisp correspondence maps that are sub-pixel accurate at occluding boundaries.

Referring back to FIG. 14B, the motion evaluation module 15 computes an alignment accuracy map for each pairing of the reference image and a respective neighboring image based on the motion maps computed by the motion estimation module 14 (block 28). In some implementations, quality measures are computed based on correlations between the reference image and the re-mapped neighboring images. In some of these implementations, regions with low intensity variances optionally can be identified as being low-texture. The intensity means of corresponding low-texture regions in the aligned image pairs are compared. Pixels in low-texture regions with large difference in intensity means are assigned a correlation value of zero; whereas pixels in low-texture regions with little difference in intensity means are assigned a correlation value of one. The final alignment quality measure $M_{Align}$ is computed as follows, $$M_{Align} = \frac{\left[\sum_P (I_{ref}(P) - \overline{I_{ref}})(I_{re\text{-}mapped}(P) - \overline{I_{remapped}})\right]}{[N\sigma_{ref}\sigma_{remapped}]} \quad (6)$$

when $\sigma_{ref}^2 \leq \Omega$ AND $\sigma_{remapped}^2 \leq \Omega$ or $\sigma_{N\_ref}^2 < \Omega_N$ AND $\sigma_{N\_remapped}^2 < \Omega_N$ then $\begin{cases} M_{Align} = 1.0, \text{ if } \Delta\mu^2 \leq \kappa\Omega \\ M_{Align} = 0.0, \text{ else} \end{cases} \quad (7)$ where $\sigma_{ref}^2$ and $\sigma_{remapped}^2$ are the respective reference and remapped neighboring image variances within the correlation window; $\sigma_N^2 = \sigma^2/(\mu^2 = c)$ is the mean normalized variance with $\mu$ being the mean and c a stabilizing constant to handle close-to-zero mean values; $\Omega$, $\Omega_N$ and $\kappa$ are thresholding parameters, and N is the number of pixels in the correlation window.

In some implementations, the total alignment quality is determined by computing the geometric mean of the quality measure for each of the color (e.g., Red, Green, and Blue) spectral bands of the base images 12. The alignment quality measures for each pairing of the reference image and a respective neighboring image are contained in respective alignment accuracy maps.

Figure 19:
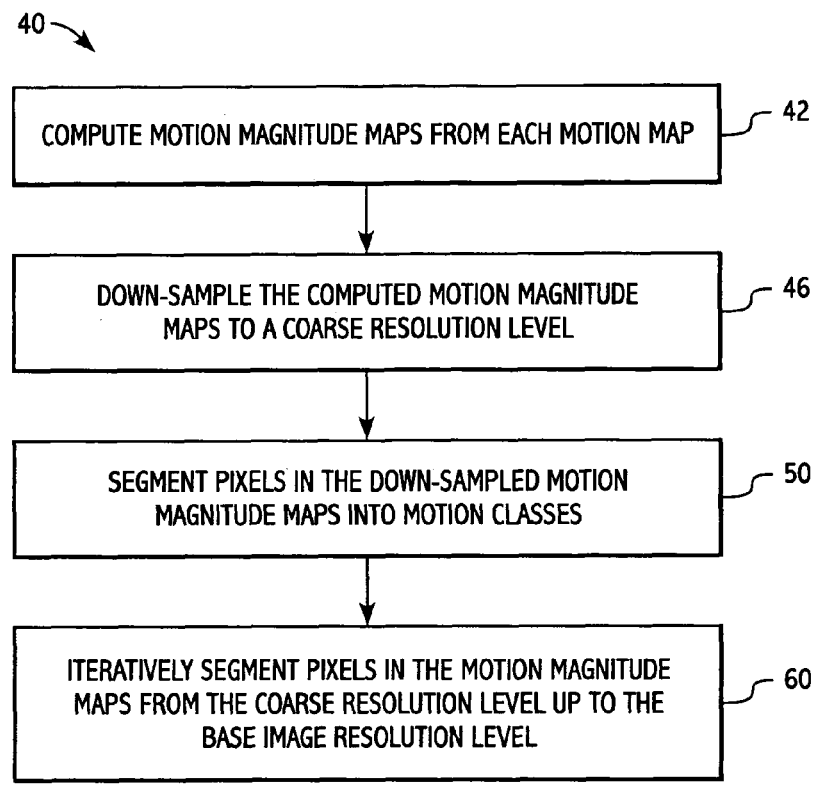
FIG. 19 is a flow diagram of an embodiment of a method of assigning respective regions of a reference image to motion classes based on computed motion maps in accordance with an implementation of the method of FIG. 14B.
Figure 20:
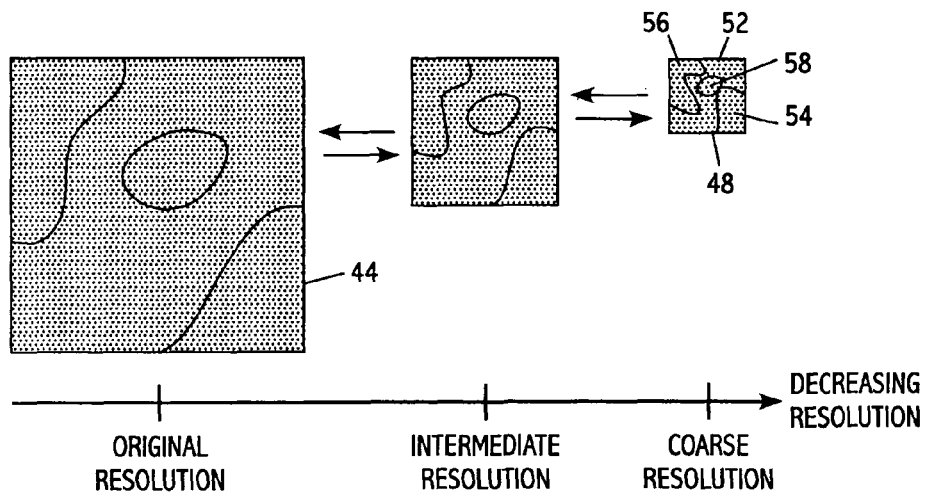
FIG. 20 is a diagrammatic view of segmented motion magnitude maps at different resolution levels in accordance with the method of FIG. 19.

Referring back to FIG. 14B and to FIGS. 19 and 20, the motion segmentation module 16 assigns respective regions of the reference image to motion classes based on the computed motion maps (block 40). The motion segmentation module 16 computes motion magnitude maps from each motion map (block 42). In some implementations, motion magnitudes are computed by taking the square root of the sum of the squares of the x- and y-components of the motion vectors in the motion maps. The motion segmentation module 16 down-samples each of the computed motion magnitude maps 44 to a pyramid of coarser resolution levels, as shown in FIG. 20 (block 46).

The motion segmentation module 16 then segments pixels in the down-sampled motion magnitude maps 48 into motion classes (block 50). Motion segmentation module 16 can classify pixel regions in each down-sampled motion magnitude map into a respective set of motion classes (e.g., a high motion class region 58, intermediate motion class regions 54, 56, and a low motion class region 52) using any type of classification or segmentation method. For example, in some implementations, motion vectors in each motion magnitude map are segmented in accordance with a k-means clustering method. In these implementations, either the number of clusters or a set of clusters representing an initial partition between motion magnitudes in a given motion magnitude map can be pre-determined. The partition is refined iteratively by assigning pixels to each partition and re-computing the center of each cluster. The segmentation method iterates between the following steps:

1. Compute cluster centroids and use them as new cluster seeds; and
2. Assign each object to the nearest seed.

In some implementations, the final partition corresponds to a respective set of motion magnitude clusters 52, 54, 56, 58 for each coarse motion magnitude map in which the total distance between pixels (or pixel groups) and the centers of their respective clusters is minimized, while the distances between clusters are maximized.

The motion segmentation module 16 iteratively segments pixel motion magnitude maps from coarser resolution levels up to the original base image resolution level (block 60). The segmentation results from the previous resolution are used as the starting point for the same segmentation process applied to the next higher resolution level.

The separate motion class segmentation maps that are computed for each pairing of the reference image and a respective neighboring image are merged into a unified motion class segmentation map for the reference image. In some implementations, the motion segmentation module 16 assigns a given reference image pixel to the low motion class in the unified motion class segmentation map when the given pixel is assigned to the low motion class in all of the separate motion class segmentation maps. The motion segmentation module 16 assigns a given reference image pixel to the high motion class in the unified motion class segmentation map when the given pixel is assigned to the high motion class in any of the separate motion class segmentation maps. As explained above, some implementations include an intermediate motion class, where motion vectors that are assigned to the intermediate motion class have magnitudes higher than motion vectors assigned to the low motion class and lower than motion vectors assigned to the high motion class. In these implementations, the motion segmentation module 16 assigns a given reference image pixel to the intermediate motion class in the unified motion class segmentation map when the given pixel is unassigned to the high motion class in any of the separate motion class segmentation maps and is unassigned to the low motion class in all of the separate motion class segmentation maps.

Referring back to FIG. 14B, the up-projection module 18 up-projects the reference image, the motion class segmentation maps, the motion maps, and the alignment accuracy maps from the base image resolution level to the target image resolution level (block 62). In general, the reference image, the motion class segmentation maps, the motion maps, and the alignment accuracy maps can be up-projected to the target image resolution level using any type of resolution re-mapping or up-sampling technique. In some implementations, the reference image, the motion class segmentation maps, the motion maps, and the alignment accuracy maps are up-projected to a higher target image resolution using bi-cubic interpolation. In some other implementations, the reference image, the motion class segmentation maps, the motion maps, and the alignment accuracy maps are up-projected to a higher target image resolution by first using a 5-tap Gaussian filter to up-sample the reference image, the motion class segmentation maps, the motion maps, and the alignment accuracy maps, and then using interpolation to achieve sub-pixel accuracy.

Based on the up-projected motion maps, the adaptive synthesis module 20 re-maps the neighboring images to the coordinate frame of the target image (block 64). In some implementations, the neighboring images are up-projected to the target image resolution level and the up-projected neighboring images are re-mapped to the target image coordinate frame using the up-projected motion maps in accordance with application of equation (4) at the target image resolution level.

The adaptive synthesis module 20 applies a threshold to the up-projected alignment accuracy maps to produce respective synthesis maps for each of the neighboring images (block 66). The synthesis maps are used by the adaptive synthesis module 20 to classify motion vectors in each up-projected motion map into valid and invalid motion vector classes. In the illustrated embodiment, the threshold that is applied to the up-projected alignment accuracy maps is set to a level that ensures that the neighboring image pixels are sufficiently aligned with respect to the corresponding reference image pixels that they contain relevant information for reconstructing the target image. In some implementations, the alignment measures in the alignment accuracy maps are normalized to values in the range of ±1 and the threshold is set to approximately 0.8. Pixels in the up-projected motion maps with alignment accuracy measures above the threshold are classified as valid motion pixels, whereas pixels with alignment accuracy measures below the threshold are classified as invalid motion pixels.

Figure 21:
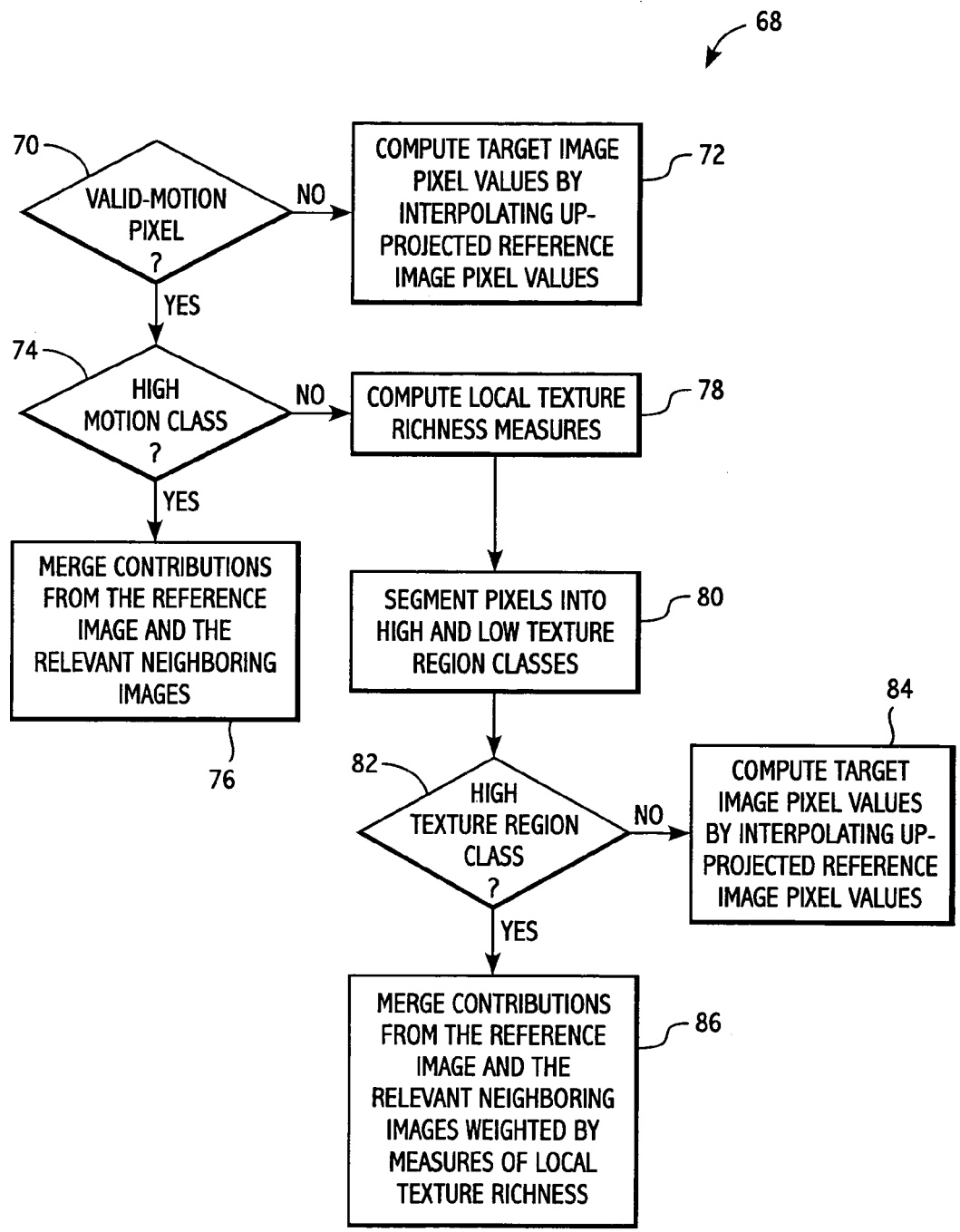
FIG. 21 is a flow diagram of an embodiment of a method of computing pixel values for a target image based on pixel value contributions from a sequence of base images.

Referring to FIGS. 14 and 21, the adaptive synthesis module 20 computes values for the enhanced target image based on pixel value contributions from the reference image and a selected number of relevant neighboring images (block 68). In particular, the adaptive synthesis module 20 selects the pixel value contributions in accordance with the up-sampled motion class segmentation maps and the synthesis maps. In the illustrated embodiments, the number of relevant neighboring images decreases with the degree of the motion class to which the target image pixels are assigned. In some implementations, only the two nearest neighbors of the reference image contribute pixel values to high motion class target image pixels, only the four nearest neighbors (i.e., two nearest neighbors on either side) of the reference image contribute pixel values to intermediate motion class target image pixels, and only the six nearest neighbors (i.e., three nearest neighbors on either side) of the reference image contribute pixel values to low motion class target image pixels.

For pixels in the neighboring images that are identified as having invalid motion vectors according to the synthesis maps, their contribution to the target image is zero. For target image pixels whose corresponding neighboring image pixels are all identified as having invalid motion vectors (block 70), the adaptive synthesis module 20 computes target image pixel values by interpolating up-projected reference image pixel values (block 72). In some implementations, the adaptive synthesis module 20 uses bi-cubic interpolation to compute values of target image pixels associated with invalid motion vectors in all neighboring images.

For target image pixels assigned to the high motion class with at least one neighboring image pixel with valid motion vectors (blocks 70, 74), the adaptive synthesis module 20 computes pixel values by merging contributions from the reference image and the two relevant nearest re-mapped neighboring images (block 76). In some implementations, the high motion class target image pixels are computed by a pixel-wise weighted combination given by equation (8):

$$I_{Target} = \frac{\sum_j \omega_{T_j} \omega_{Align_j}(P) I_j(P)}{\sum_j \omega_{T_j} \omega_{Align_j}(P)} \quad (8)$$

where $I_{Target}$ is the synthesized target image, $\omega_{T_j}$ is a weight for each of the re-mapped neighboring images, and $\omega_{Align_j}$ is a pixel-wise weight related to the alignment accuracy measure. In the case of a video stream, for example, weights $\omega_{T_j}$ can be set to values that are inversely proportional to the temporal distance between the reference image and the neighboring images. The weights $\omega_{Align_j}$ can be set to values that are proportional to the pixel-wise alignment quality measure if the measure is classified as a valid pixel in the corresponding synthesis map; otherwise it is set to be zero. The weights $\omega_{Align_j}$ can vary from pixel to pixel, and from image to image. This alignment-quality-related weighting guarantees that only relevant and valid information from well-aligned images is used during the rendering process and that unreliable information is ignored.

For target image pixels assigned to the intermediate and low motion classes (block 70, 74), the adaptive synthesis module 20 computes measures of local texture richness (block 78). Texture descriptors can be statistical, structural, or syntactic. In some implementations, a statistical descriptor is used. In these implementations, for a small local region around each pixel in the intermediate and low motion class regions, the adaptive synthesis module 20 computes the standard deviation of the Laplacian image, the skewness of the gradient value distribution, and the edge frequency as measures of local texture content. In some implementations, both the gradient image and the Laplacian image are computed during the motion estimation process (block 24; FIG. 14B). The adaptive synthesis module 20 can use any type of edge detection technique to find edges in the target and neighboring images. For example, in one implementation, the adaptive synthesis module 20 uses a Sobel edge detector, which performs a two-dimensional gradient measurement on the images, to compute edge directions and magnitudes. The Sobel edge detector uses a pair of 3×3 convolution masks, one of which estimates the gradient in the x-direction (columns) and the other of which estimates the gradient in the y-direction (rows).

The adaptive synthesis module 20 segments intermediate and low motion class pixels into high and low texture region classes based on the computed local texture richness measures (block 80). In some implementations, if the computed texture richness measure is below an empirically-determined threshold value, the adaptive synthesis module 20 segments the pixels into the low texture region class; otherwise the pixels are segmented into the high texture region class.

For intermediate and low motion class pixels assigned to the low texture region class in the reference image and all the corresponding neighboring images (block 82), the adaptive synthesis module 20 computes corresponding target image pixel values by interpolating up-projected reference image values (block 84). For intermediate and low motion class pixels assigned to the high texture region class in the reference image or any of the corresponding neighboring images (block 82), the adaptive synthesis module 20 computes target image pixel values by merging contributions from the up-projected reference image and the relevant re-mapped neighboring images in accordance with equation (9) (block 86):

$$I_{Target} = \frac{\sum_j \omega_{T_j} \omega_{Align_j} \omega_{Texture_j}(P) I_j(P)}{\sum_j \omega_{T_j} \omega_{Align_j} \omega_{Texture_j}(P)} \quad (9)$$

where $\omega_{Texture_j}$ is a weight with values ranging from 0 to 1 that are set based on the computed local texture richness measures. For example, in some implementations, $\omega_{Texture_j}$ corresponds to the computed local texture measure normalized to the 0 to 1 value range.

The above-described resolution enhancement embodiments can be applied to one or all of the luminance and chrominance components of the base images 12. In some embodiments, the resulting resolution-enhanced target images 22 can be subjected to one or more post-processing methods, including color re-mapping, sharpening, and de-scintillation methods prior to being input to the image cropping step 1108.

Figure 22A:
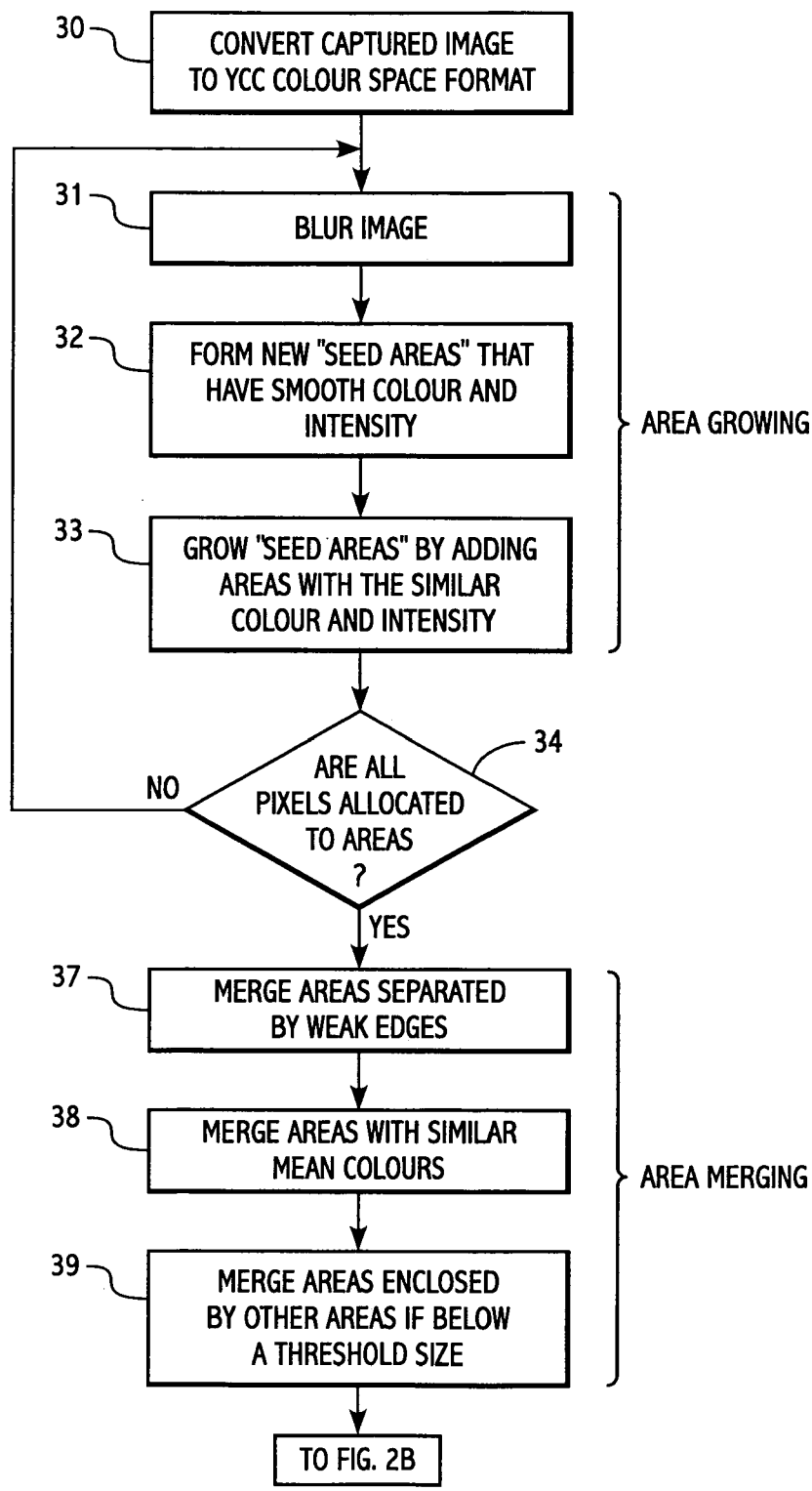
FIGS. 22A and 22B are flow charts illustrating an embodiment of a method according to exemplary embodiments for cropping a captured electronic image.

An example of an image cropping method used for processing extracted key frame images in accordance with one embodiment of the present page production system will be described with reference to FIGS. 22A and 22B. The various steps of the method, together with their results, can be seen with reference to FIGS. 23A to 23F. The input to the image cropping process can be the extracted key frames from step 1102 or the enhanced extracted frames from step 1106.

Figure 23A:
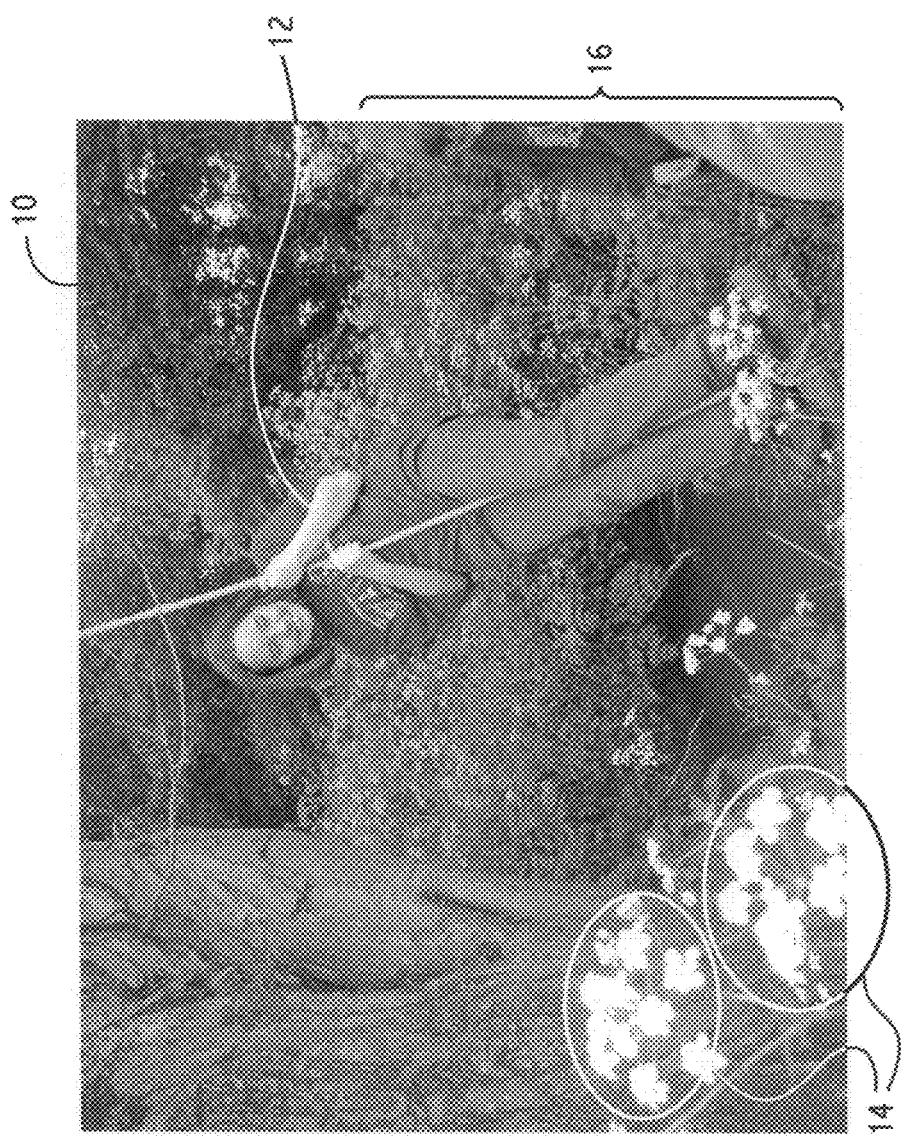
FIGS. 23A to 23F show the processing steps obtained by following the method described with reference to FIGS. 22A and 22B.

FIG. 23A shows a key frame image composed in a casual manner, perhaps by an inexperienced photographer or by someone who was rushing to try and capture the scene. The picture, generally indicated 10, shows a girl 12 on a swing. The girl 12 is reasonably well centered in the image and can be assumed to represent the main subject of the image. However, other potential regions of interest in the image include the flowers 14 located towards the bottom left hand corner of the image. On further inspection of the image it can be seen that a serious compositional error has been made by the inclusion of part of the figure of a person towards the right hand side of the image, and generally indicated 16.

The present automated image processing/page production system has no a-priori knowledge of the subject matter of the key frame image and therefore needs to process it in order to extract some form of representation which will indicate where the compositionally significant regions of the photograph lie.

Figure 23B:
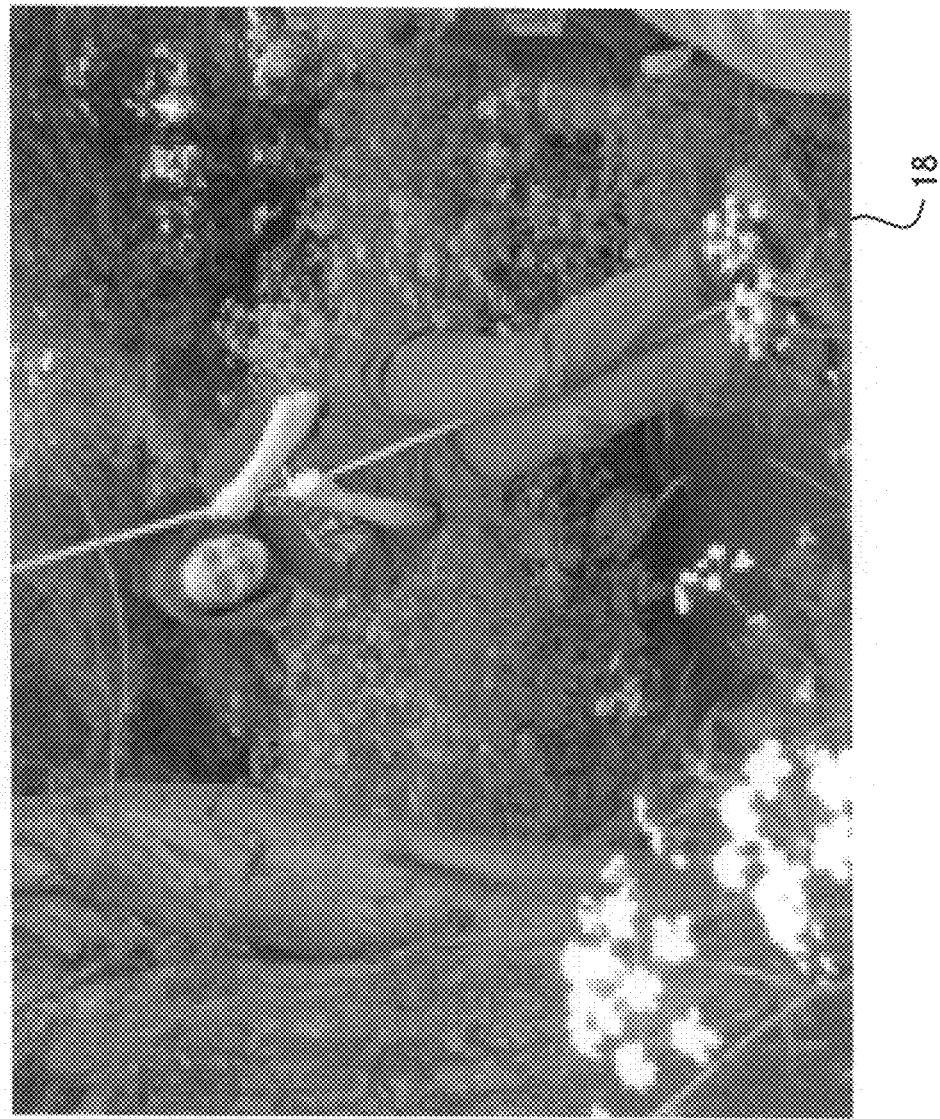

The image 10 can have been taken with a camera having in excess of 2,000,000 active pixels. Analyzing such a large number of pixels would be computationally significant. Thus prior to performing any other processing steps, the image processor down-samples the image to reduce the number of pixels therein. FIG. 23B schematically illustrates the same image as shown in FIG. 23A, but after down-sampling to 240 by 180 pixels. This down-sampling has reduced the number of active pixels to 43,200. Following the down-sampling, the down-sampled image 18 is then converted at step 30 into an image having compressed color variation while still retaining intensity variations. An example of such a processing is converting the image to the YCC color space format. It should be noted that this is not the only color space representation which could be used. For example, the CIELAB color space system can also be used. This system defines a space in which the lightness L*, which is a measure of how color brightness, is plotted against the vertical axis; and two further measurements a* and b* are defined as linear axes with the a* axis defining the color from a red to green scale and the b* axis indicating color on a blue to yellow scale. The measurements a* and b* are in the horizontal color plane and are perpendicular to each other such that this color system defines an orthogonal Cartesian space. Each of the L*, a* and b* axis are defined in such a way that one unit on any of the scales has approximately the same "visibility," making this system both linear and isotropic as regards human perception. The L* axis has a scale from zero (black) to 100 (white) whilst the a* and b* scales range from −60 to +60 each. This system has the advantage that a color difference of one unit has substantially the same visibility at any part of the color space.

Following conversion of the key frame image to a color space, areas within the converted image having similar color and intensity are generated and grown. This process commences at step 31 where the image is blurred, and then the blurred image is analyzed at step 32 in order to form "seed areas" that have a smooth color and intensity. The seed areas are then grown at step 33 by adding areas adjacent to the boundary of the seed areas where those adjacent areas have a sufficiently similar color and intensity. From step 33, a test is made at step 34 to determine whether all of the pixels within the color compressed image have been allocated to seed areas. If not, then control is passed from step 34 back to step 31 and the blur and region grow process is repeated in an iterative manner.

Figure 23C:
Figure 23D:

Eventually, the test at step 34 will be satisfied. FIG. 23C schematically illustrates the image 3B once all of the image has been blurred and assigned to regions. At this stage the image shown in FIG. 23C contains approximately 2,800 regions, some 2,200 of which contain 10 or less pixels. The image processing then continues at step 37 by merging adjacent areas of the image which are separated by "weak edges". "Weak edges" are those boundaries that separate areas of the image which have a relatively low color or intensity differences. In other words, the regions are close to one another within the YCC or CIELAB space. From step 37, control is passed to step 38 where adjacent areas with similar mean colors are merged together. From step 38, control is then passed to step 39 which examines the image to determine if small areas, that is areas whose size is less than a threshold value, are completely enclosed by another larger area. If so, then the small area is merged into the larger area. Steps 37, 38 and 39 can be applied in a single pass. However, steps 37, 38 and 39 can be applied iteratively, and a test can be made following step 39 to determine whether the number of individual regions has fallen to below a predetermined threshold number, which can be provided by a user-input control parameter. If it is judged that there are still too many regions, then steps 37, 38 and 39 can be repeated, possibly with the definition of what constitutes a weak edge being changed such that the distance in the color space by which colors must be separated before they are regarded as sufficiently different not to be merged can be increased. FIG. 23D shows the image following the region merging.

Figure 22B:
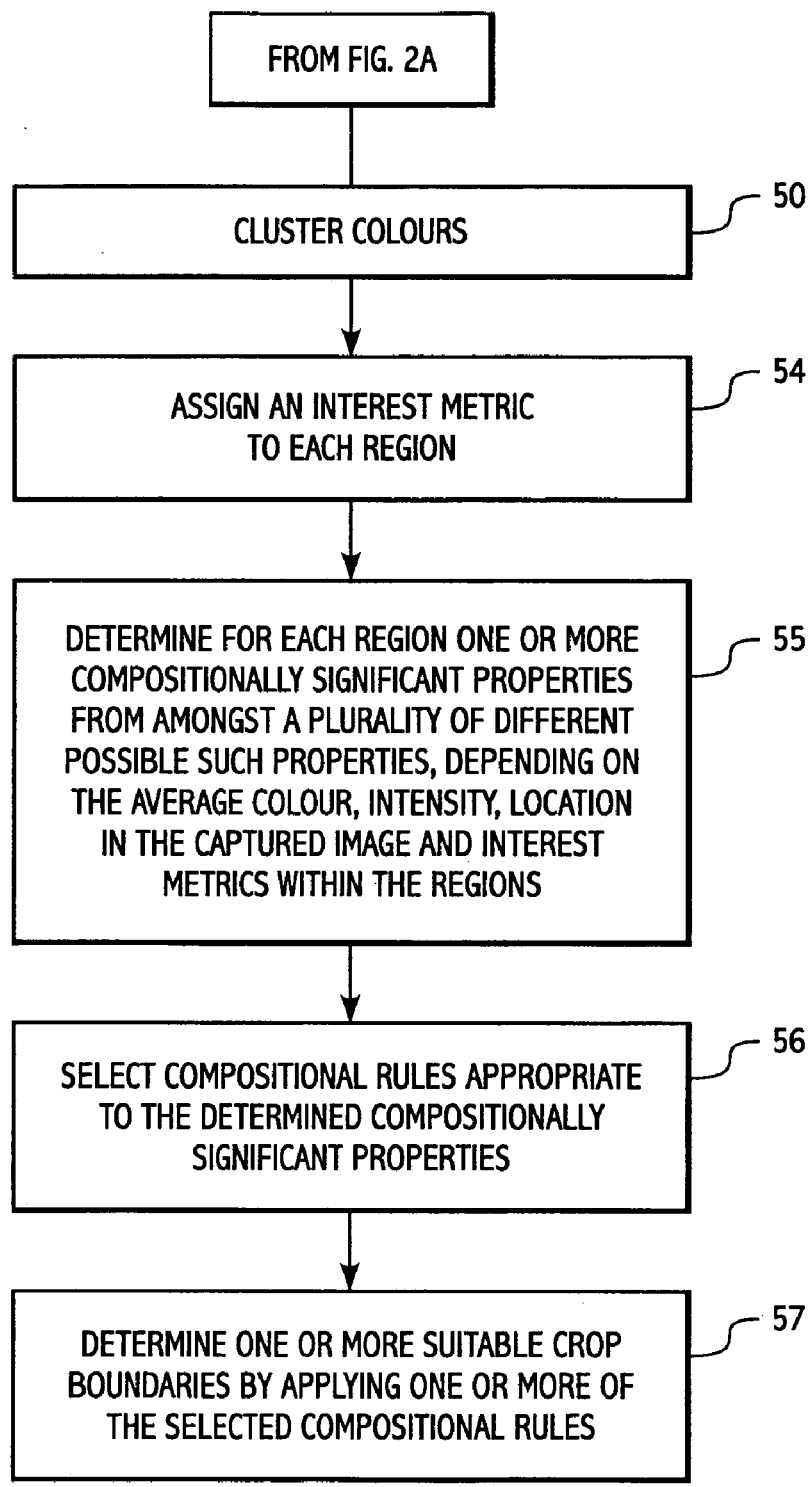
Figure 23E:
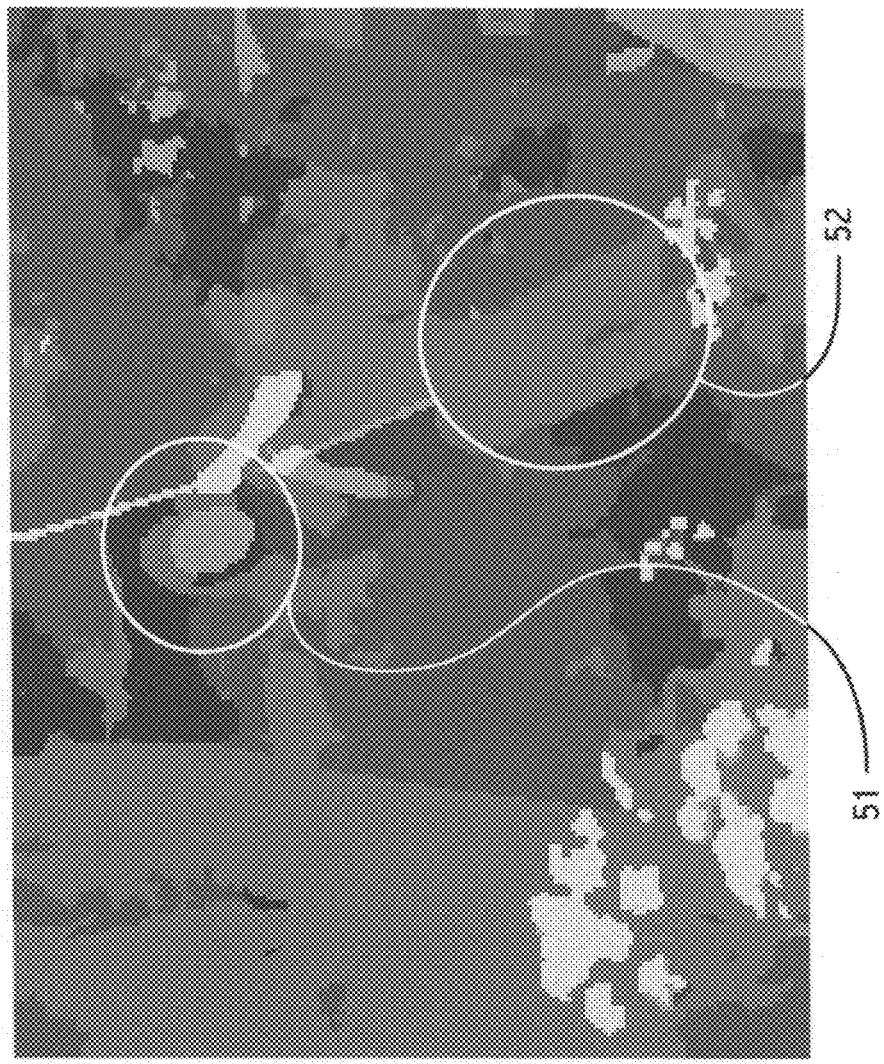

From step 39, control is passed to step 50, in FIG. 22B, where the image is further analyzed in order to cluster similar colors together until such time as the number of colors has dropped to an appropriate number, which is typically in the region of 20 or so. The image of clustered colors is schematically illustrated in FIG. 23E. It should be noted that as used herein a region is a spatially connected sub-area of the image. However a cluster is a collection of similar regions, but the regions do not need to be adjacent to one another.

It can be seem with reference to FIG. 23E that the main part of the flowers 14 have been merged into areas of uniform color. Similarly, the girl's face has been merged into an area of uniform color 51 as have her trousers 52. Large areas of the background have also been merged into areas of substantially uniform color, for example the tree towards the left hand side of the image. From step 50, control is initially passed to step 54 where an interest metric is formed on the basis of the unusualness of the color; and from there control is passed to step 55, where the image is analyzed to determine the compositionally significant properties therein from amongst a plurality of different possible properties. One such analysis that can be performed is the analysis of the clustered colors shown in FIG. 23E to determine how unusual they are. The image shown in FIG. 23E, as noted hereinbefore, comprises approximately 20 or so different color clusters. These clusters are then sorted in order to identify how many pixels belong to each one of the colors.

Figure 24:
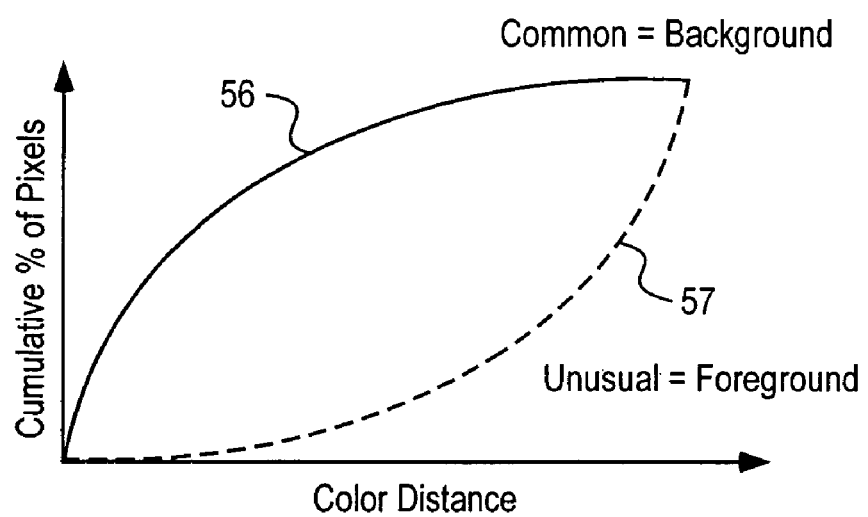
FIG. 24 shows a cumulative histogram of colored pixels against increasing color distance from a color cluster under consideration.

FIG. 24 schematically illustrates a cumulative histogram of the percentage of pixels belonging to a color against color distance. Each of the color clusters is processed in turn. When a color is processed, the color distance between it and each of the other color clusters is calculated, the clusters are then sorted in order of color distance from the color cluster being processed. A cumulative histogram can then be formed for the color cluster under test, by counting the cumulative sum of image pixels which are included in an increasing number of clusters along the color distance dimension. Clusters which, together with closely colored neighboring clusters, occupy a relatively large proportion of the pixels of the image are deemed to be background. The histogram for such a background color cluster is denoted by line 56. Conversely, cluster colors which together with closely colored neighboring clusters occupy only a relatively small proportion of the pixels of the image are deemed to be foreground. A typical histogram shape for such a foreground color is represented by line 57. By this analysis, cluster colors can be allocated a default saliency based on the likelihood that they are foreground colors.

Figure 23F:
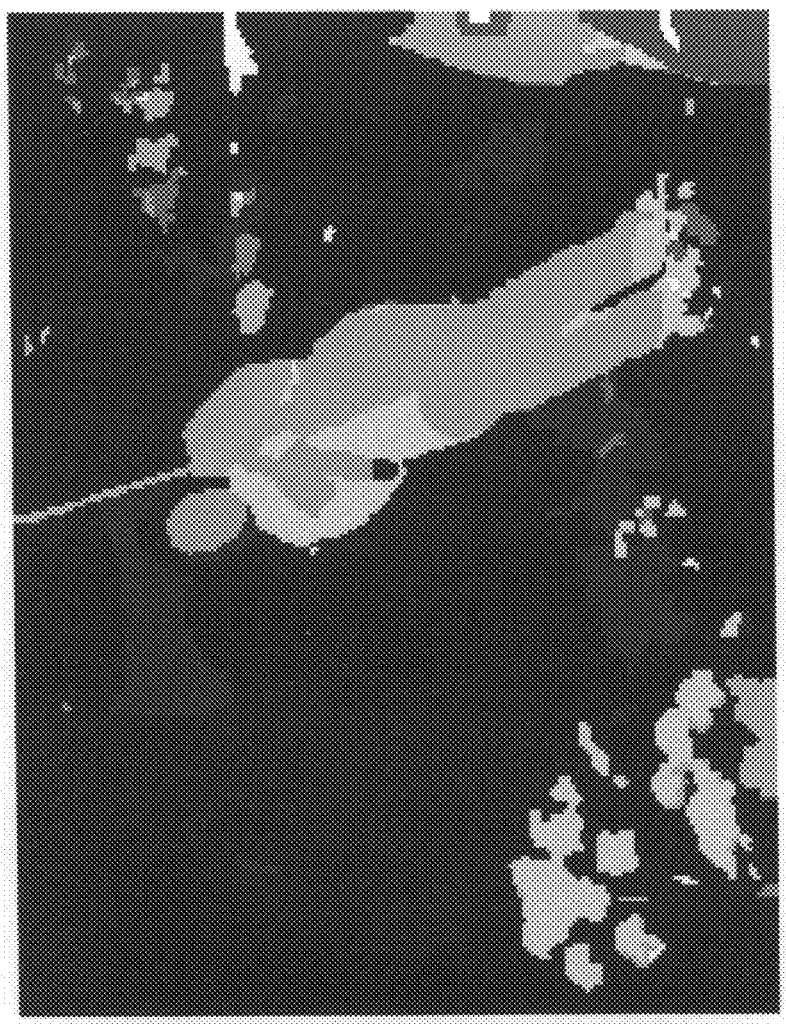

However, color mapping is not the only process that is applied in order to determine a saliency image. In general, those regions which are located towards the edges of the image can be penalized as they can belong to objects which are not fully in frame. Further processes, such as pattern recognition can also be applied to the image. Thus, a search can be made to identify bodies or faces as a result of comparing areas within the image against models held within a model library. FIG. 23F schematically illustrates a saliency image of FIG. 23A following the conclusion of the one or more processes performed in step 55.

The saliency image is processed to subdivide it into a small number of large areas (typically rectangles) which enclose the majority of the saliency in the images as shown in FIG. 25. Thus, the selected areas enclose the bright regions of the saliency image. One method of doing this is to form the sums of saliency pixel values along each row, and separately, down each column. Plotting these sums against the vertical and horizontal axes respectively, shows the vertical and horizontal distributions of saliency. These can then be analyzed to find the widest minimum in either the vertical or horizontal saliency distribution. The image can then be split into three parts at this minimum. A first part comprises a horizontal, or as the case can be vertical, band through the image having a width substantially corresponding to that of the minimum. This part can be ignored as non-salient. This will then leave two parts of the image each side of this minimum band which will contain saliency (except in the case where the minimum band is adjacent one of the edges of the image in which case there will only be one non-empty or salient side). These parts can each be processed by the same algorithm. The part with the widest minimum can be split in an analogous manner, discarding the width of the minimum and hence splitting that part into two smaller parts. This process can continue with each stage splitting the part about the best minimum until one of the following limiting conditions is reached:

i. No minimum can be found in any of the remaining parts. I.e. no minimum is found which is sufficiently wide and sufficiently low in saliency.

ii. The function of the total saliency of the image which is outside of the retained block reaches some predetermined limit, such as 5%.

The result of this process is the derivation of a small set of rectangular blocks which enclose the major areas of saliency of the image, as shown in FIG. 25.

Once features relevant to the composition of the image have been identified, that is up to and including step 56, the saliency map can now include regions of the image which are defined as include regions and exclude regions. Thus, considering FIG. 25A, the girl has been identified as an "include" region and has been framed by a crop boundary 60 which represents the minimum boundary possible to include all of the girl therein. Similarly, the flowers have been identified as an include region and have been framed by a crop boundary 61 representing the minimum crop required to include the flowers. Furthermore, "must exclude" regions have been identified and enclosed by crop boundaries 64 and 66 respectively.

Having identified the minimum crop boundary, it is then advantageous to identify the maximum crop boundary. With regards to FIG. 25B, one potential maximum crop boundary 68 has been identified. This crop boundary abuts the must exclude regions 64 and 66, but also abuts the edge of the must include region 61. The boundary also extends between the upper and lower edges of the photograph. This crop boundary 68 represents the maximum crop boundary available to include the girl but to exclude the flowers. However, an alternative crop boundary is available which includes both the girl and the flowers. Thus, as shown in FIG. 25C a further minimum crop boundary 70 can be defined which includes both the girl and the flowers (with partial exclusion of the flowers being allowed because they are so close to the edge), and a further maximum crop boundary 72 has also been defined which extends to the upper and lower edges of the photograph, to the left hand edge, but abuts the must exclude regions 64 and 66 at the right hand edge thereof.

Figure 26A:
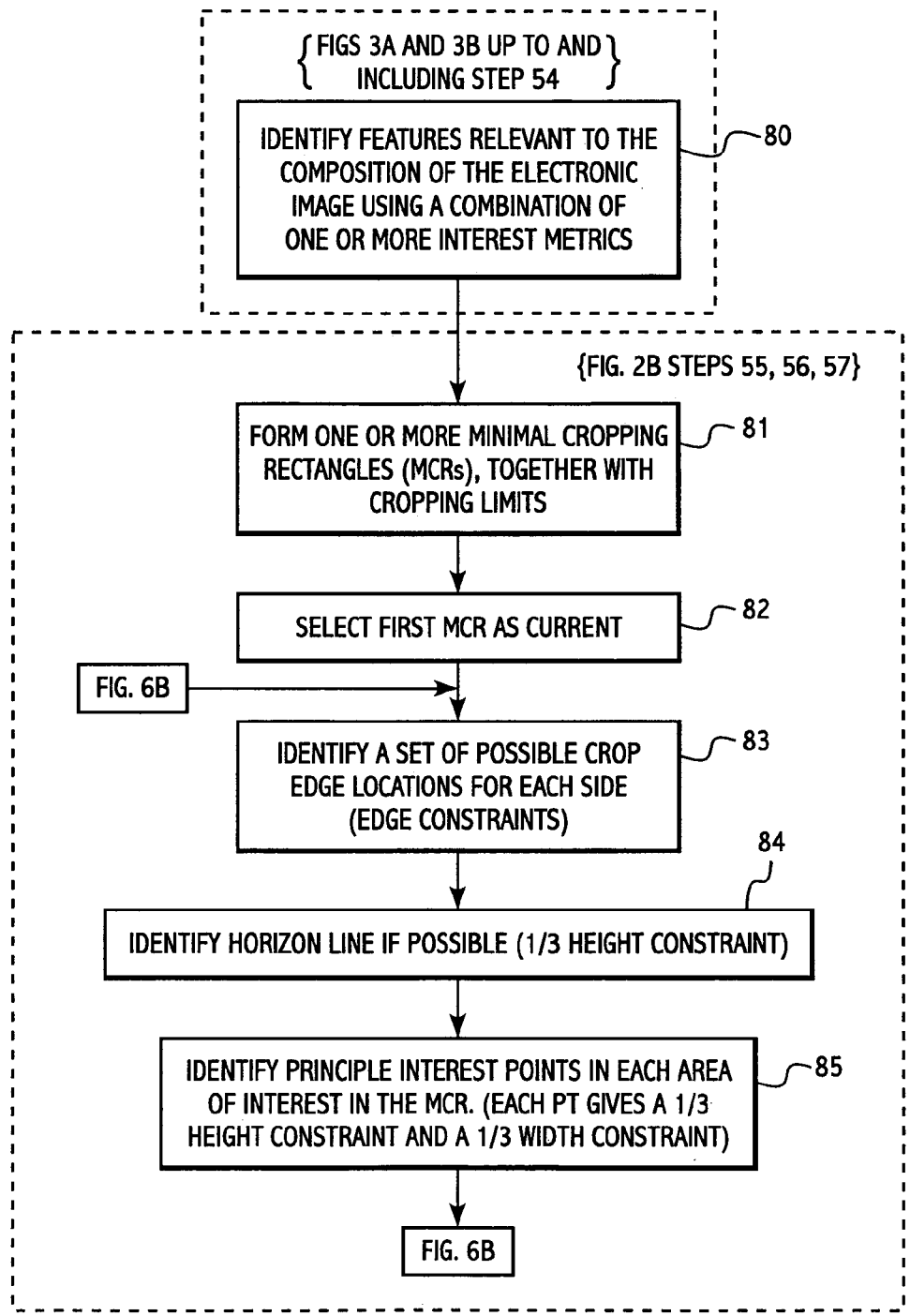
FIGS. 26A and 26B are flow charts showing in detail one way of implementing the method according to exemplary embodiments as shown in FIGS. 22A and 22B.

Referring to FIG. 26A, control commences at step 80 where the saliency map is analyzed in order to determine how many areas of interest exist therein. Thus, if the saliency map shows N distinct areas of interest (for example areas of interest separated by some area of non-interest as determined by some adaptively set threshold), possible minimum cropping rectangles can be generated which contain alternative combinations of between 1 and N areas of interest where the minimum cropping rectangle contains a selected combination of areas of interest and excludes other areas. This corresponds to generation of minimum cropping rectangle 60, 61 and 70 in FIGS. 25A and 25C. It should be noted that not all combinations can be possible as they can not be contained within a single rectangle that excludes one or more of the non-selected areas. The maximum cropping rectangle for the each single or combination of areas of interest is the maximum rectangle which contains the areas of interest but excludes the non-selected areas of interest. This corresponds to rectangles 68 and 72 in FIGS. 25B and 25C.

Each minimum cropping rectangle 60, 61 and 70 and its associated maximum cropping limit (of which only cropping limits 68 and 72 are shown in FIGS. 25B and 25C) and are then processed in turn. However, some initial sorting can reduce the processing required. One of the compositional rules can require that a large, well centered interesting area in the image is required. If we apply this rule, then only minimum cropping boundaries 60 and 70 are permitted, with the flowers as defined by crop boundary 61 being excluded. The first step is to select a first one of the minimum cropping boundaries 60 and 70 as a potential cropping candidate, together with its cropping limits. This process is performed at step 82. From thereon, control is passed to step 83 which seeks to identify possible edge locations for each of the edges.

Figure 27:
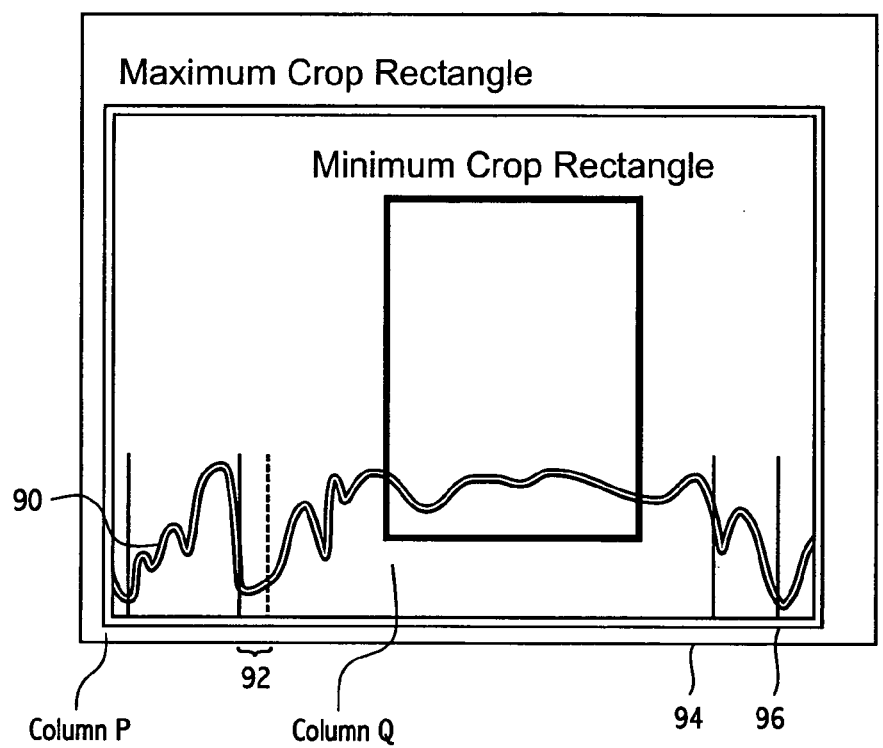
FIG. 27 is a plot of crop penalty metric against crop distance.

The procedure at step 83 is explained more fully with reference to FIG. 27. FIG. 27 presumes that minimum and maximum crop rectangles have been defined, and that it is now desired to find the position of suitable crop boundaries between the minimum and maximum limits. For the purpose of this description, the system will locate the edge of one boundary, occurring to the left hand side of the minimum crop rectangle. Given that the digital image can be considered as consisting of a plurality of columns, the left hand edge of the maximum crop rectangle is located in column P, whereas the left hand edge of the minimum crop rectangle is located in column Q. Columns P and Q are not adjacent.

Sequentially, each of the columns between P and Q is examined in turn to generate a metric of how good that column would be as a border of the cropping rectangle. Thus, the metric is constructed such that dark areas or slowly changing pixels along the column incur a low cost penalty, whereas brighter areas or alternatively rapidly changing colors in a row of pixels achieve a high penalty rating. Furthermore, the rating can also be modified with regards to the proximity of that column to the minimum and maximum crop boundaries, or the proximity of that column to the edge of the picture.

In a preferred embodiment of the present page production system, the edge quality metric is a function of:

a. Brightness. Under this criteria, dark edges are preferred and hence incur only a low penalty.

b. Activity. That is the sum of the color differences between regions crossed by a row or column is analyzed, with low sums scoring a lower penalty.

c. Saliency. The sum of the saliency values for pixels in the row or column is formed, with low saliency incurring a lower penalty.

d. Distance from strong color transitions parallel to, and on the inside of, the column or row being tested. The distance should not be too close nor too far, and a weighted distance term is used to accomplish this. This latter criteria is used to avoid cropping too close to a feature, even if it is not part of the minimum cropping rectangle.

These factors are independently smoothed and normalized before being combined in order to form a weighted sum to generate the edge quality metric as shown in FIG. 27.

Thus for each one of the individual columns, a penalty measurement is formed, and the penalty measurement can then be plotted with respect to each column, thereby obtaining a penalty measurement profile 90. The profile 90 can then be examined to determine the position of minima therein, such as broad minima 92 or the sharper minima 94 and 96, which are then deemed to be potential image cropping boundaries. This process can be repeated for each of the left, right, bottom and top crop boundaries individually, and can be repeated on a iterative basis such that, for example, those pixels in the column which lie above the upper crop limit or below the lower crop limit are excluded from the next iteration of the crop boundary. These candidate crops can then be subject to further constraints. In practice, there will be too many constraints to satisfy all of the constraints simultaneously. Steps 84 and 85 are given as examples of the implementation of some of the constraints which can be optionally utilized in the identification of crop boundaries from among the many candidate crop boundaries which produced at step 83. Thus, at step 84, an attempt is made to identify a horizon line, and those crops which place the horizon a from the edge of the candidate crop are favored over those cropping possibilities that do not achieve this. Thus, this corresponds to the imposition of the "rule of thirds" with respect to the horizon line. Similarly, the "rule of thirds" can be introduced at step 85 to act on the main feature of interest to place it ⅓ of a distance from the edge of the crop.

Figure 26B:
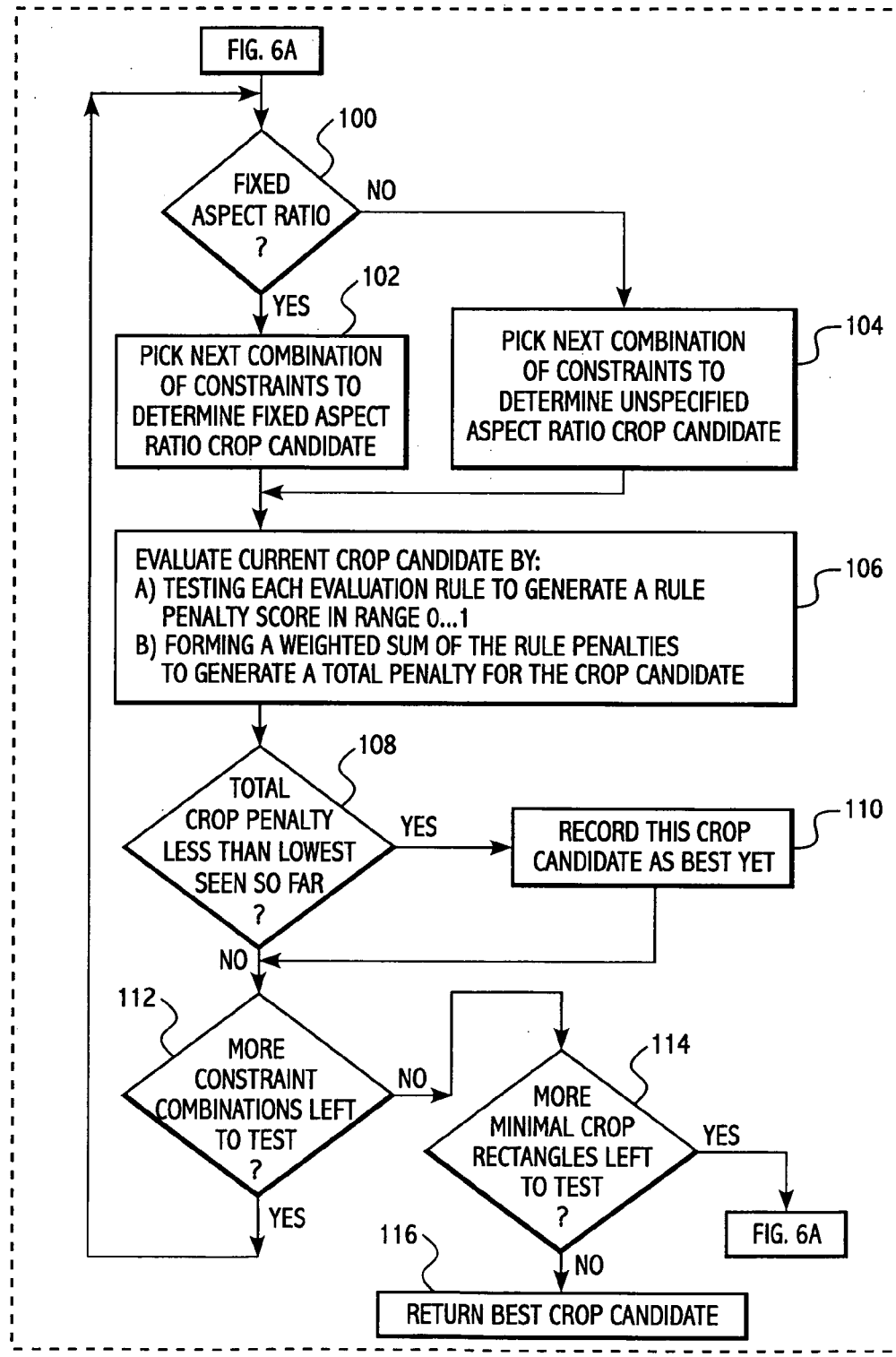

The final crop can also be constrained by the aspect ratio that the user has selected. FIG. 26B indicates the processing that can be implemented to select candidate crops based on their aspect ratio. Control commences at step 100, where a question is asked as to whether or not the cropped image is to have a fixed aspect ratio. This ensures that it is possible that a particular aspect ratio can be specified and enforced. In practice this means that when an aspect ratio is specified (control passes to step 102), a smaller number of other constraints will in general be required to completely specify a crop candidate than when no aspect ratio is required. In the case of no explicit aspect ratio requirement, it is likely that an evaluation rule in step 106 will penalize thin aspect ratios.

Figure 28:
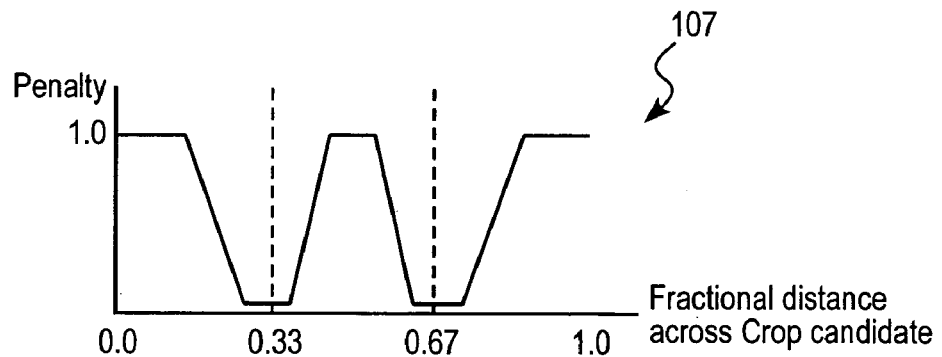
FIG. 28 is a plot of penalty metric versus position for alternative positions of a main region of interest.

Once a crop candidate has been identified, it is then evaluated at step 106 by applying one or more rules. Each rule is implemented as a heuristically evaluated measure on the image. For example, a metric 107 which measures how close a point of interest is from a one-third line is shown in FIG. 28. The fractional position of the point in the candidate crop is measured in both the horizontal and vertical directions. The penalty for each direction is determined from the heuristically determined graph shown in FIG. 28. The two measures of penalty.sub.vert and penalty.sub.horiz are combined by the rule:

penalty=max(penalty.sub.vert, penalty.sub.horiz) if max(penalty.sub.vert, penalty.sub.horiz)>0.75 and penalty=mean(penalty.sub.vert, penalty.sub.hortiz) if max(penalty.sub.vert, penalty.sub.horiz)=0.75

Similar heuristic measures are used for other compositional rules such as eliminating distractions close to the edge of the frame, minimum edge quality, a preference for dark or low activity boundaries, and the like.

The combination of different rule penalties by a weighted sum allows some rules to be considered as more important than others. Again, the weightings are determined heuristically. There are many possible extensions of the basic scheme. For example, it would be possible for the rule combination weightings to be dynamically adjusted according to the overall type of image. For example, crop rectangle 60 with a single area of interest containing a single face looking straight towards the camera can reduce the weighting for the rule of thirds, allowing a more centrally placed portrait to be preferred. Another possibility is for an additional penalty factor to be generated from step 81 where some crop rectangles are intrinsically preferred (i.e. given a low penalty) compared to others.

In FIG. 26B, the penalty is evaluated as follows. First, a test 108 is performed as to whether or not the total crop penalty is less than a lowest previous total crop penalty. If so, then the current crop candidate is recorded at step 110 as the best crop candidate so far. If not, then a test is performed at step 112 as to determine whether there are more constraint combinations left to test. If so, then the flowchart loops back to step 100. If not, the flow chart next tests at step 114 if there are other minimal cropping rectangles left to test. If so, then the flow chart loops back to step 83. If not, the flow chart shows that the best crop candidate is returned at step 116 as an output from the process.

Figure 32A:
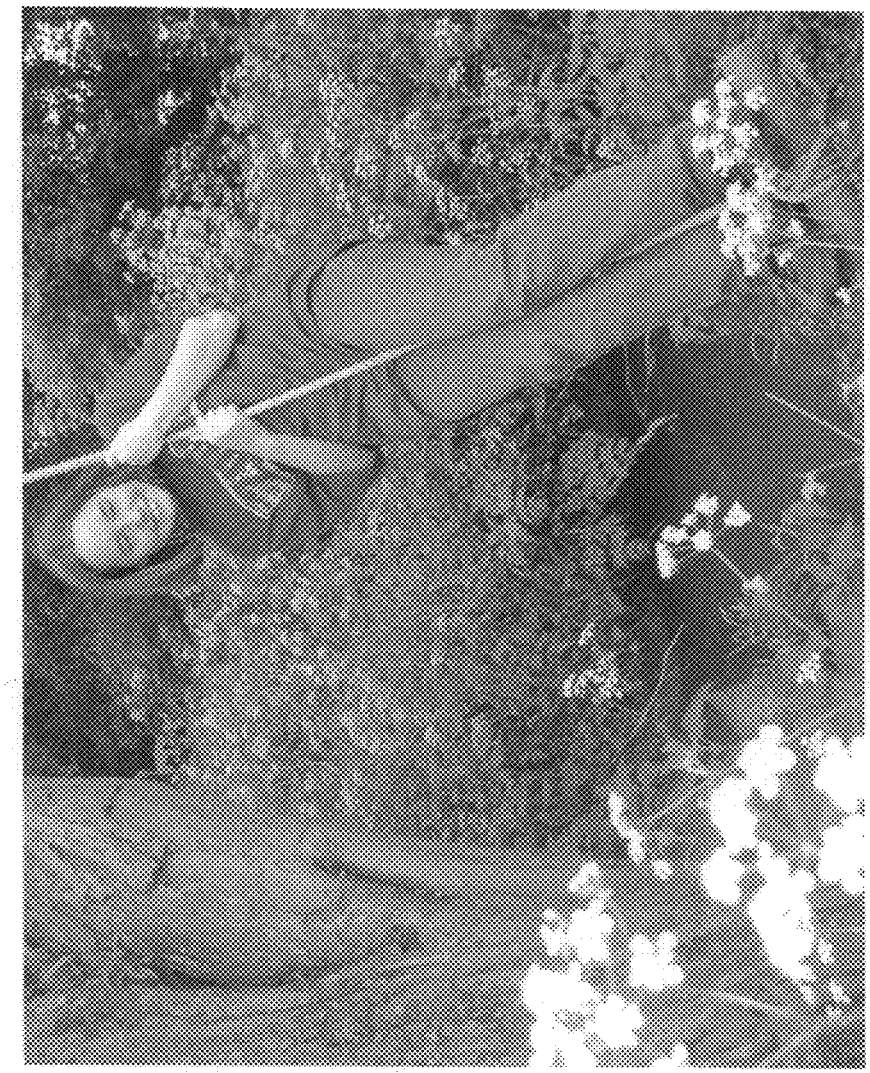
FIGS. 32A and 32B show examples of an automatically produced cropped images.
Figure 32B:

The idea behind FIGS. 26A and 26B is that all combinations of position are generated and then evaluated in the later steps. This is a "generate and test" approach to determining one or more suitable crop boundaries, using a "constraint set" determined by minimum and maximum cropping rectangles. FIGS. 32a and 32b illustrate examples of crops generated according to exemplary embodiments.

The cropping selection process can be modified, in an exemplary embodiment, by giving the user the ability to "tag" an object such that it is included. One way of manually tagging features is to use the camera viewfinder as a pointing device (as opposed to its conventional use as both a pointing and composition device). In this use the prime area of interest is deliberately positioned in the approximate centre of the frame. When the image is auto-cropped according to this exemplary embodiment, the region at the centre of the image is deemed to be essential to the cropped image and is thus prevented from being cropped out.

In another variant of exemplary embodiments, the camera can be initialized to identify certain colors or texture as having a high interest. At least two use models are possible here. One simply involves the identification of features of "natural" importance or inherent interest: faces, the overall shape of a person or object, and other possible compositional elements. Another is to provide additional elements or appendages for the specific purpose of "tagging" to force inclusion of an object in the cropped image. The practical effect can be similar in either case. For example, if a person is wearing a blue rain jacket, then the camera can be pointed close up at the blue rain jacket and then capture an image of the jacket. The camera can then be programmed to process a captured image to assign that particular color a high interest metric. If a wide angle picture is then taken of a scene in which the blue jacket appears, then this area can be assigned the highest interest metric so that the captured image is automatically cropped in such a way that the blue jacket is retained in the image. This is particularly useful when images are captured of a crowd of people, one of which the user would like to automatically make the key feature in the page produced from the extracted key frames.

Figure 30:
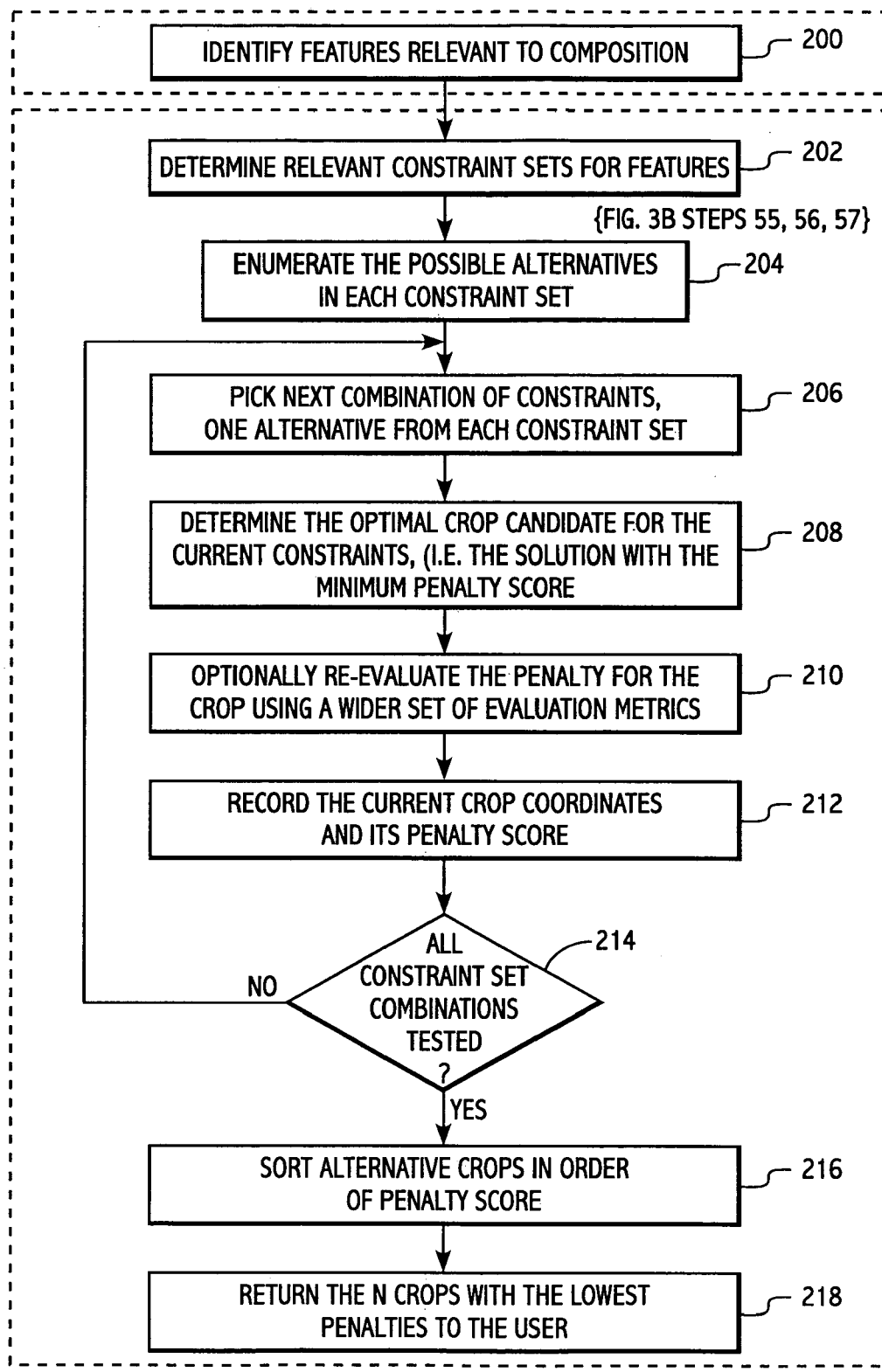
FIG. 30 is a flow chart showing in detail one way of implementing the method according to exemplary embodiments as shown in FIGS. 22A and 22B, using a "constraint" based approach.
Figure 31:
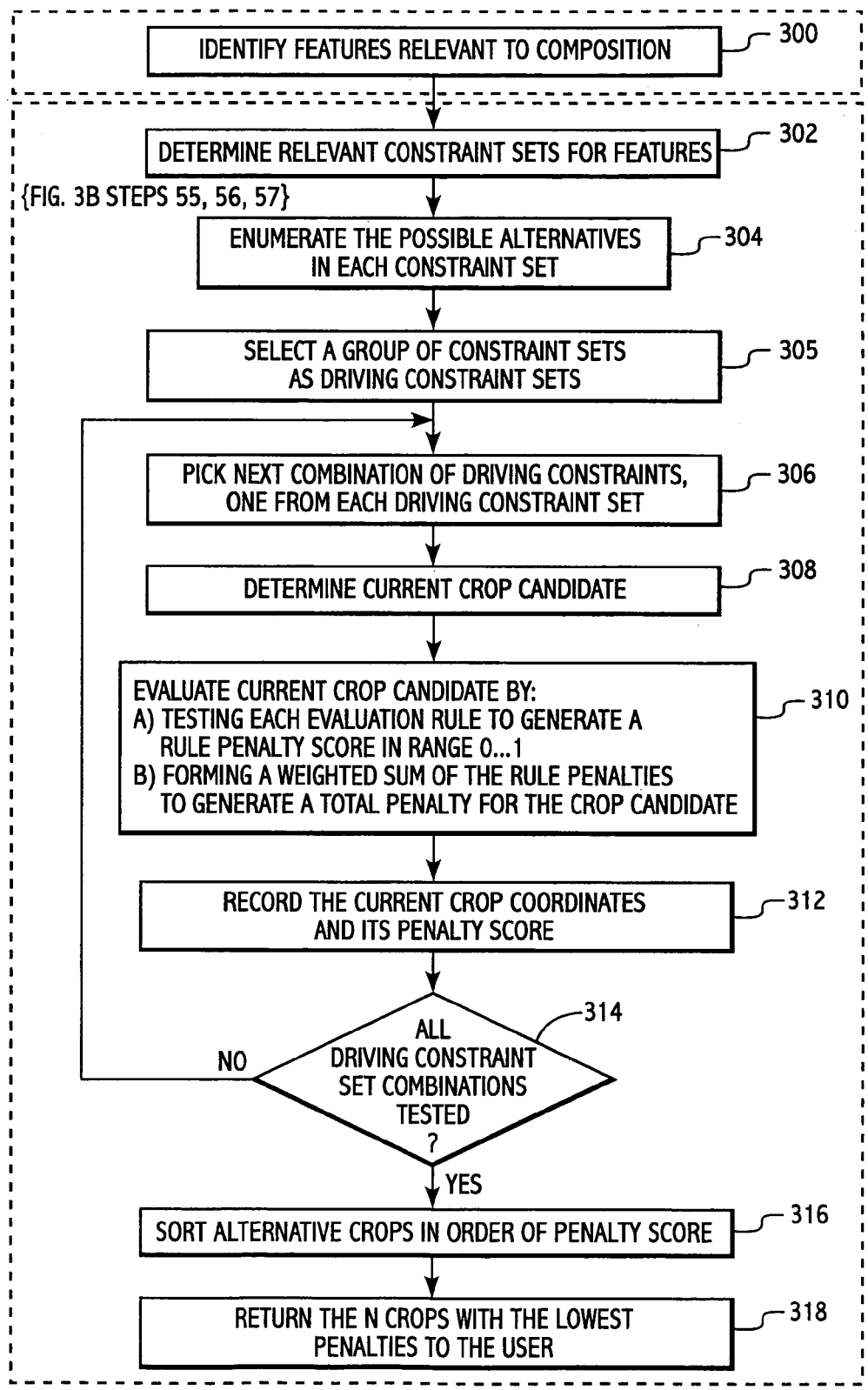
FIG. 31 is a flow chart showing in detail one way of implementing the method according to exemplary embodiments as shown in FIGS. 22A and 22B, using a "generate and test" based approach.

FIGS. 30 and 31 show in more general terms the concepts behind respectively the "constraint-based" and "generate and test" approaches described above. In both cases, the starting point is the identification of features relevant to the composition of the image (200, 300), for example, as set out in the steps up to and including step 54 in FIG. 22B. The next step

202 is to determine the relevant "constraint set" for the identified features. The concept of a "constraint set" is a set of alternatives, only one of which should be considered at a time. Each alternative consists of one or more fully specified constraints, for example, features with some required value, which are then enumerated at step 204. A simple example of a constraint set is "aspect ratio". There are two alternatives, "portrait" and "landscape". The first alternative (portrait) might be defined by the constraint:

(Right−Left)/(Bottom−Top)=0.75

The second alternative (landscape) might be defined by the constraint:

(Right−Left)/(Bottom−Top)=1.33

Figure 29:
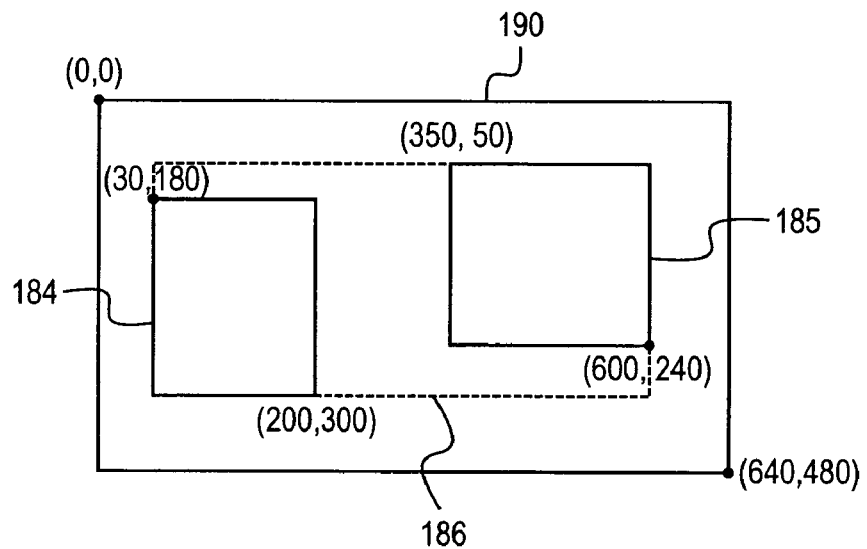
FIG. 29 shows schematically minimum and maximum cropping rectangles for two identified features.

With reference to FIG. 29, a more complex constraint set could define cropping limit alternatives for different groupings of areas of interest 184 and 185 within the maximum boundary 190 of the original captured key frame image. The number of alternatives in this set is determined by the analysis of the areas of interest in the image. Suppose that two areas of interest 184 and 185 have been determined with pixel coordinates: (30,180) to (200, 300) and (350,50) to (600,240) as shown below. In this example, the whole image has a top left co-ordinate (0,0) and bottom right coordinate (640,480).

The crop limits constraint set would consist of three alternatives:

Alternative 1 (left-hand area of interest 184 only) is defined by the constraints:
 Left>0 Left<30
 Top>0 Top<180
 Right>200 Right<350
 Bottom>300 Bottom<480

Alternative 2 (right-hand area of interest 185 only) is defined by the constraints:
 Left>200 Left<350
 Top>0 Top<50
 Right>600 Right<640
 Bottom>240 Bottom<480

Alternative 3 (include both areas of interest 186) is defined by the constraints:
 Left>0 Left<30
 Top>0 Top<50
 Right>600 Right<640
 Bottom>300 Bottom<480

The constraint set concept can be used to represent many mutually exclusive sets of alternatives. Typical examples include: aspect ratio; alternative subject choices based on the minimal crop rectangle and maximal crop limits of various groupings of areas of interest; horizon placement alternatives (bottom third line or top third line); point of interest placement (at each of the four "one-third" intersection points or, for elongated items, along one of the four "one-third" lines); and preferred edge placements for top, bottom, left and right edges. For each edge there is a constraint set consisting of alternative ranges of distances that are acceptable on the basis of an edge quality metric.

The examples given above presented "hard" constraints, where the conditions must be met; and there is no gradual penalty involved in deviating from the condition. In many cases, it is desirable to implement constraints as "soft", that is, incurring an increasing penalty the further away the solution moves from the local optimum. An example is that positioning a horizon line exactly on the one-third line is better implemented in a way that allows placement a little way off the precise one-third position, but penalizes increasing distance from the desired one-third location.

The optimization problem can easily be set to include this. For example by changing the condition:

$x=\frac{1}{3}$ to $x+e1-e2=\frac{1}{3}$ where e1 and e2 are positive penalty terms which contribute to an overall penalty function to be optimized, typically as a weighted sum of contributions such as:

penalty=$c1e1+c2e2+\ldots$

The next step 206 is to pick the next combination of constraints, one alternative from each constraint set. Many combinations can be excluded or simplified as being precluded by some of the other constraints. For example, choice of a particular cropping limits alternative will limit which points of interest can be considered as some can be outside those cropping limits.

The optimal crop candidate for the current constraints can then be determined at step 208. The constraints that have been discussed are combinations of simple linear conditions. These can be effectively solved by linear programming methods which find the location for top, bottom, left and right boundaries of the crop which meet all the hard constraints and satisfy the soft constraints in such a way that the overall penalty is minimized.

Depending on the precise set of constraint combinations being solved, there can be a number of situations. Ideally, there is a single optimal solution. Alternately, there may be no solution. This would be the case if some constraints were contradictory. For example, if there are two points of interest A and B where A is to the left of B, and a combination of constraints that attempts to place A near the right-hand one-third line and B near the left-hand one-third line, then there is clearly no solution. The method in step 206 of selecting sets of constraints to solve should ideally be implemented in such a way as to eliminate these situations.

There can be multiple solutions of equally low penalty score. In this case, there are a number of alternatives. One is to pick a solution at random within the space of multiple solutions. Another is to tighten the constraints by, for example, turning one or more soft constraints into hard constraints. Optionally, in step 210 it is possible to use a richer evaluation metric to generate a set of alternatives within the space of equally acceptable solutions and select these on the basis of the refined evaluation metric. This optional step can, for example, be a "generate and test" method.

The linear solution is a practical method that works well for automated cropping because constraint sets can be formed that represent alternative plausible choices. Treating each combination independently and hence finding different locally optimal solutions is a useful way of generating good alternatives for a user. Non-linear optimization methods frequently suffer from problems with locally optimal solutions being confused for globally optimal solutions. An improved understanding of the search space allows this technique to circumvent such problems in a relatively intelligent manner.

Although linear programming is one method that can be used in step 208, it does impose limitations on the way the constraints are defined. Other optimization techniques could be used within the same basic framework of local optimization within a subspace defined by the choice of constraints from constraint sets.

If all possible constraints and evaluation criteria are encoded as hard or soft conditions that can be optimized in step 208, then step 210 can be bypassed. However, if step 208 is achieved by linear programming, then some of the constraints may be poorly approximated or omitted. A more accurate evaluation of the solution generated by step 208 can be obtained afterwards in step 210. A more refined implementation might use the approximate solution from step 208 as the start point for a "generate and test" based local optimization using the more detailed evaluation metrics.

An example of constraints that can be only approximated with a linear representation is the edge quality metrics. The true edge quality can only be assessed when the limits of the edge are known. For example, the true relative quality of alternative left edge locations is dependent on the top and bottom limits. A narrower choice of top and bottom can exclude features in the image that would otherwise adversely affect the left edge quality. This type of interdependency cannot be modeled with a linear system. The best that can be done is that within step 204, having selected minimum and maximum cropping limits, the edge quality metrics are recalculated using, for example, the maximum cropping limits, to generate a specific set of alternative constraints for each edge constraint set. These specific constraints are used while the particular choice of cropping limits is being considered.

Another type of constraint that cannot be modeled linearly is one involving ratios of areas in the image, such as the relative area of a boring region within the crop boundary. This application will be nonlinear because the area is a multiplication of terms involving the horizontal and vertical crop locations.

In any event, once the crop candidate has been evaluated, this is recorded at step 212, along with its penalty score. From step 212 control is passed to step 214 where a test is performed as to whether or not all constraint set combinations have been tested. If not, the flowchart loops back to step 206. If so, then there are a number of possibilities for deciding what to do with the results. FIG. 30 shows one example, in which the crop candidates are sorted in order of penalty score at step 216, and then a number of the crop candidates having the lowest penalty scores are presented at step 218 to a user of the system.

In addition to selecting from a set of alternatives, a user may wish to suggest improvements to the selected alternative. This could be achieved by simple commands or control parameters such as "more" or "less". In such cases the system can define a new minimum crop rectangle and a new maximum crop limits, based on the selected crop and the alternatives which the user rejected. For example, if the user requested "more," then the selected crop becomes the new minimum crop rectangle; and the smallest non-selected crop which exceeds the size of the selected crop becomes the new maximum crop limit. The system can then re-consider alternative edge placements within these limits to generate a new set of alternatives to present to the user. Repeated use of this form of interaction can allow the user to interactively explore the space of alternatives which best meet the system's criteria for compositionally acceptable crops.

An example of another approach would be to ensure that one from each of the possible alternative crop limits was used to compute the crop boundaries. In preferred embodiments, the user is not involved; and the cropping of the images in the extracted key frames is fully automatic.

FIG. 31 is a general example of a "generate and test" method, in which certain constraints are defined as hard, equality constraints and are used to define a crop candidate without any attempt at optimization. Each hard constraint is a local optimum location for a particular criterion. For ease of comparison, steps in FIG. 31 that correspond with those in FIG. 30 are given a reference numeral incremented by 100. Once the relevant constraint sets for the features have been determined 300, these are enumerated at 304, and a group of constraint sets is selected at 305 as "driving constraint sets". These constraint sets are such that when groups of constraints are formed, one from each driving constraint set, a crop candidate is fully specified.

A simple example is for the group of driving constraints to consist of the constraint sets for top, bottom, left and right locations, where each of these constraints is a candidate edge position determined from the edge quality metric. For example, the left edge constraint set might be:

Left=5
Left=38
Left=150

Analogous constraint sets would exist for possible Right, Top and Bottom candidates. In the example discussed above, the driving constraints are edge constraints such as these, combined with the cropping limits for various combinations of areas of interest (i.e. minimum crop rectangles and cropping limits). An alternative group of driving constraint sets might be three enumerated edge location constraint sets and an aspect ratio constraint set. The driving constraint sets determine which out of all possible crop rectangles are "generated". In the least intelligent possible implementation, all possible left, right, top and bottom locations are generated. This, however, increases computational effort.

In step 306, the next combination of driving constraints is selected, one from each driving constraint set. The determination of the current crop candidate in step 308 is trivial, as there is only one possible solution to the driving constraints by definition. In step 310, all soft constraints are evaluated. Here, an unspecified collection of soft evaluation criteria are combined.

Once the crop candidate has been evaluated, this is recorded at step 312, along with its penalty score. Then a test is performed at step 314 as to whether or not all driving constraint set combinations have been tested. If not, the flowchart loops back to step 306. The flowchart only loops around the driving constraints as these fully specify the candidate crop rectangles to be considered. If all driving constraint sets have been evaluated, then there are a number of possibilities for deciding what to do with the results. FIG. 31 shows one example, in which the crop candidates are sorted in order of penalty score at step 316, and then a number of the candidates having the lowest penalty scores are presented to a user of the system at step 318.

It is thus possible to provide a method of and apparatus for analyzing a key frame image which:

a. Implements a set of metrics computed from features of the image, each embodying a compositional rule;

b. Utilizes dynamic decision mechanisms which decide which of the compositional rules are appropriate for a given image on the basis of the content of the image; and c. Incorporates a mechanism which optimizes the position of the crop boundary in accordance with the appropriate compositional rules.

A large number of compositional rules can be implemented under the scheme, a non-limiting and non-exhaustive list of which includes:

Identifying distractions which should be excluded from the scene.

Identifying boring areas which should be reduced in size.

Identifying a horizon line and ensuring that it is not placed centrally or close to the top or bottom of the image.

Identifying important subjects and arranging their placement in the output crop. This can, for example involve use of the "rule of thirds".

Identifying multiple possible subjects and generating alternate crops containing different combinations of subjects.

Identifying the approximate direction in which one or more persons are looking and providing more space on the side of the image that the person is facing. This rule may not be satisfied if two or more people are facing in different directions.

Ensuring that boundaries form natural frames where possible, for example by selecting relatively dark inactive areas in the image as areas in which to place boundaries.

Ensuring that strongly contrasting edges are not placed at or close to the edge of the frame.

Ensuring that thin objects pointing towards the edge of the frame are either completely in the frame, with some background border, or alternatively are decisively cropped. Examples of such objects include outstretched arms or church spires.

Ensuring that people are cropped, if necessary, at points which are known to be pleasing. This typically avoids cropping at joints such as ankles, waists, elbows or the neck.

Constraining the aspect ratio of output crops to be within a range of generally accepted conventional proportions, optionally which can be fixed to a desired aspect ratio.

In practice, not every rule applies to every image. Furthermore, some rules can be contradictory and hence can be combined in a weighted manner in order to define a potential crop incurring the least penalty under the rules. However the present system provides a set of implemented rules which are tested against the image to see if, and where, they are relevant. A single rule can be applied multiple times to the same image; for example removing a number of distractions. This is an aspect of exemplary embodiments which contrasts with the currently known art in which typically only one rule is used to isolate a single subject area.

It should also be noted that, because a plurality of compositional rules are implemented, it is typically not possible to fully satisfy all the compositional rules which apply to an image simultaneously. A means is therefore required to identify and form one or more relatively good compromises. The present system allows some or all of the rules which are found to apply to an image can be automatically formulated as constraints. Various automated methods are then possible to find locally optimal ways of satisfying a set of conflicting constraints. Another significant and important feature of the present system is that each alternative local optimization can itself be a suitable crop result. Thus exemplary embodiments are able to generate a small number of alternative crops from which a user can select or from which the system can automatically select.

In specific implementation of the present system, compositional rules are embodied in a number of key features of the processing steps. In particular:

i. Saliency map generation, wherein rules for identifying areas likely to attract the attention of a human viewer are applied.

ii. Rules for the identification and elimination of distractions at the edge of the images when forming the maximum cropping limits.

iii. Rules for identifying different combinations of subjects for alternative compositions.

iv. Generation of edge quality metrics, including rules for selecting locations appropriate for provision of the cropping edge locations.

v. Forming a weighted sum combination of crop quality metrics and implementing rules for comparatively assessing alternative possible output crops.

Figure 33:
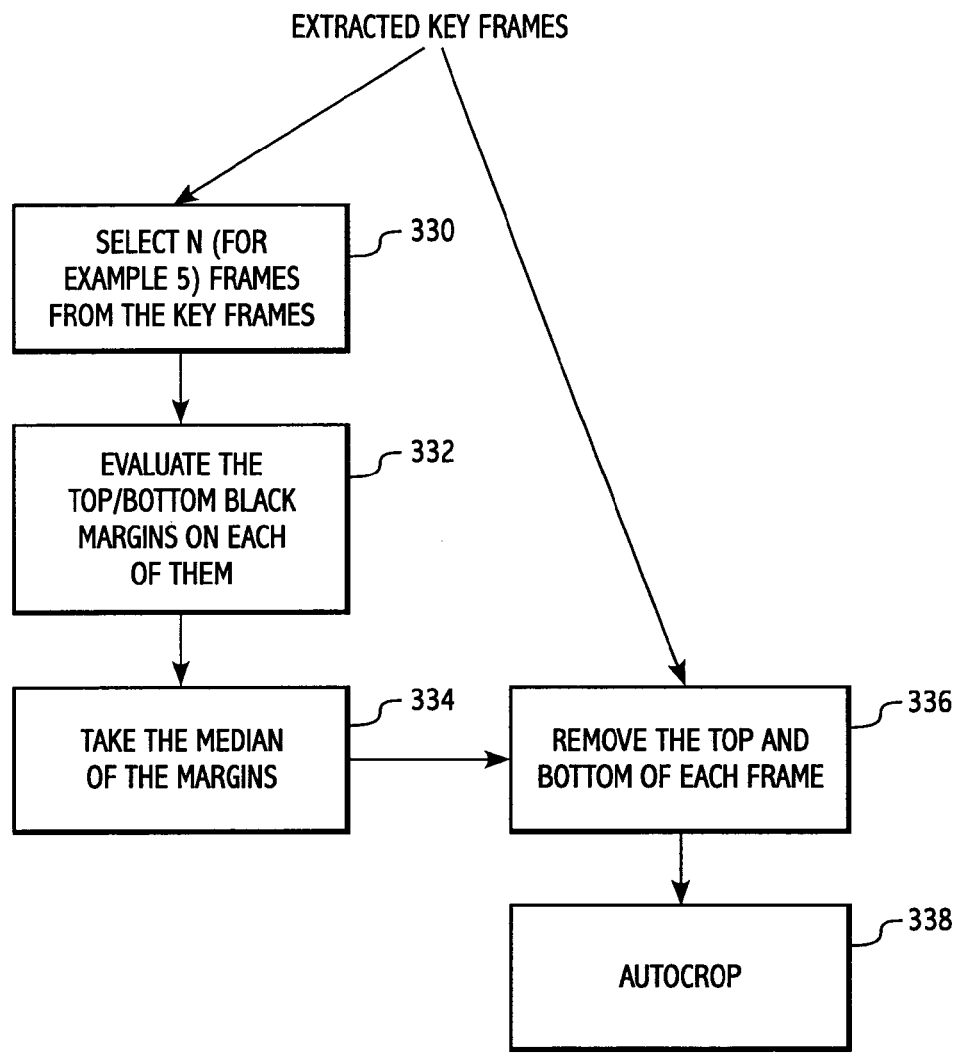
FIG. 33 shows a block flow chart of an exemplary method for removing black top and bottom margins from a video frame.
Figure 34:
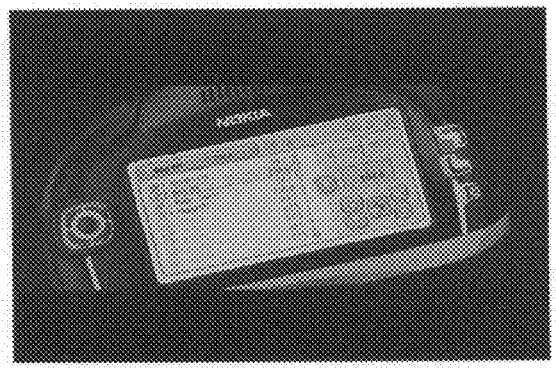
FIG. 34 shows a video frame before and after removal of the black top and bottom margins and after the image of the frame has been cropped.
Figure 34:
Figure 34:
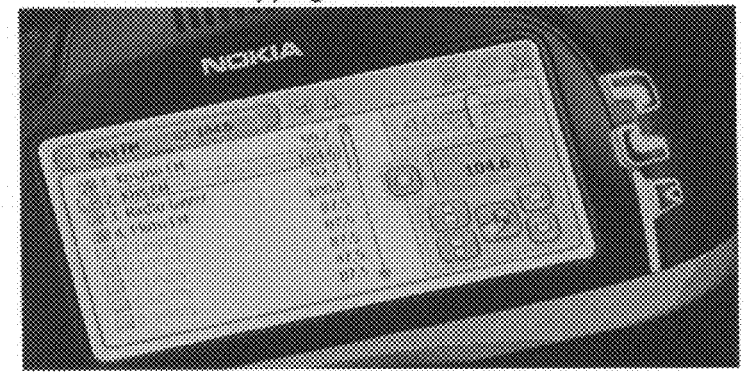

Referring now to FIGS. 33 and 34, there is shown an optional preprocessing step for the key frames prior to inputting the frames into the automatic image cropping step. Video frames can have black margins on the top and bottom of the frames, as shown in the top image of FIG. 34. Such frames can be input to a black margin removal process at step 330 of FIG. 33. A predetermined number, N, of sample frames are selected at step 330, and the top and bottom black margins on each of the selected frames are evaluated in step 332 to determine the width of the black margins. For example, a pixel by pixel analysis of frame images can determine the width of the top and bottom black margins of each frame. A median value for the top black margin width and a median value for the bottom black margin width are computed at step 334 from the N top black margin widths and the N bottom black margin widths. Based on the computed median margin widths, the top and bottom black margins are removed from each frame at step 336 as shown in the middle image of FIG. 34 prior to inputting the frames into the automatic image cropping step 338. The result of the cropping step is shown in the bottom image of FIG. 34.

Figure 35:
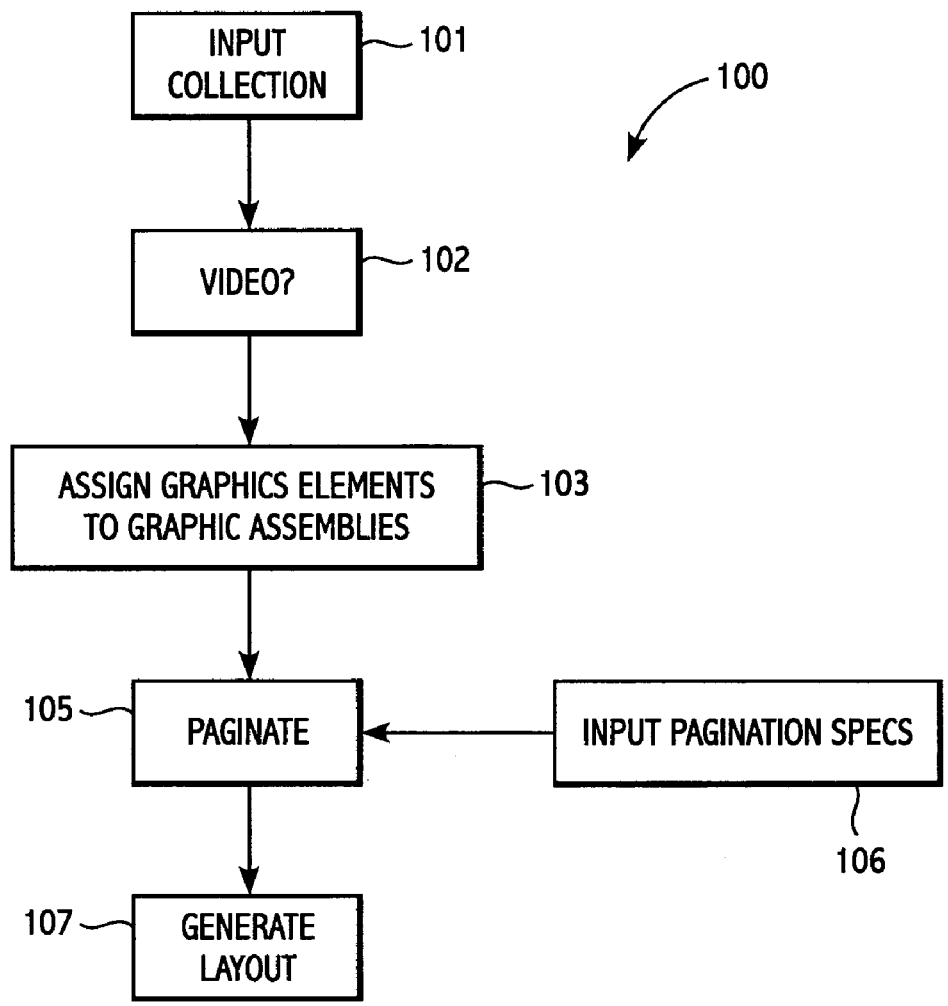
FIG. 35 is a flowchart illustrating general operation of a photo album creation system utilizing one embodiment of the page production system.

An overview of one embodiment of the page composition system 100 according to exemplary embodiments is illustrated in FIG. 35. The digital content collection to be used is specified by the user, and is input at step 101. While FIGS. 11 and 12 show the cropped frame images from step 1108 being input to the image page composition step, exemplary embodiments are not so limited; and frames from any of steps 1102, 1106, and 1108 of FIG. 11 can be input to the page composition system without detracting from the features of exemplary embodiments.

The input collection can include photographs, videos, video frames, clip-art, blocks of text, or other images. The system can retrieve the input collection from various data sources, including a folder on the user's computer, a digital camera memory card, an on-line photo sharing website, or other similar data source. The input collection can be in, for example, .pdf, .jpeg, or other suitable file format. Objects of the input collection are sent to step 103, where graphic elements of the input collection are assigned to graphic assemblies, with each graphic assembly having at least one graphic element and with the key frames from each video being assigned to a single graphic assembly in step 103. The graphic assemblies are divided into pages at step 105, using pagination specifications input at step 106. Pagination can be accomplished using any known method. In one embodiment, the pagination specifications include precise spatial distribution requirements for the graphic assemblies. For example, the user or the system can require that adjacent graphic assemblies or graphic elements be separated by a specific, fixed distance. In one embodiment, the user explicitly specifies the graphic assemblies to appear on each page. In one embodiment, the user does not explicitly specify the graphic assemblies to appear on each page, and instead sets a range or maximum number of graphic assemblies per page. For example, the user can specify that each page should have no more than 5 graphic assemblies. In another embodiment, the system provides a range or maximum number of graphic assemblies per page, such specifying between 3 and 7 graphic assemblies per page. Other pagination schemes can be used. In each of these features, the user can provide parameters to control the processing of the images prior to the collection being input, thereby allowing the composition process to proceed automatically. Finally, at step 107 a layout of the graphic assemblies is established for each page, where a precise position and dimensions for each graphic assembly are determined.

Figure 36:
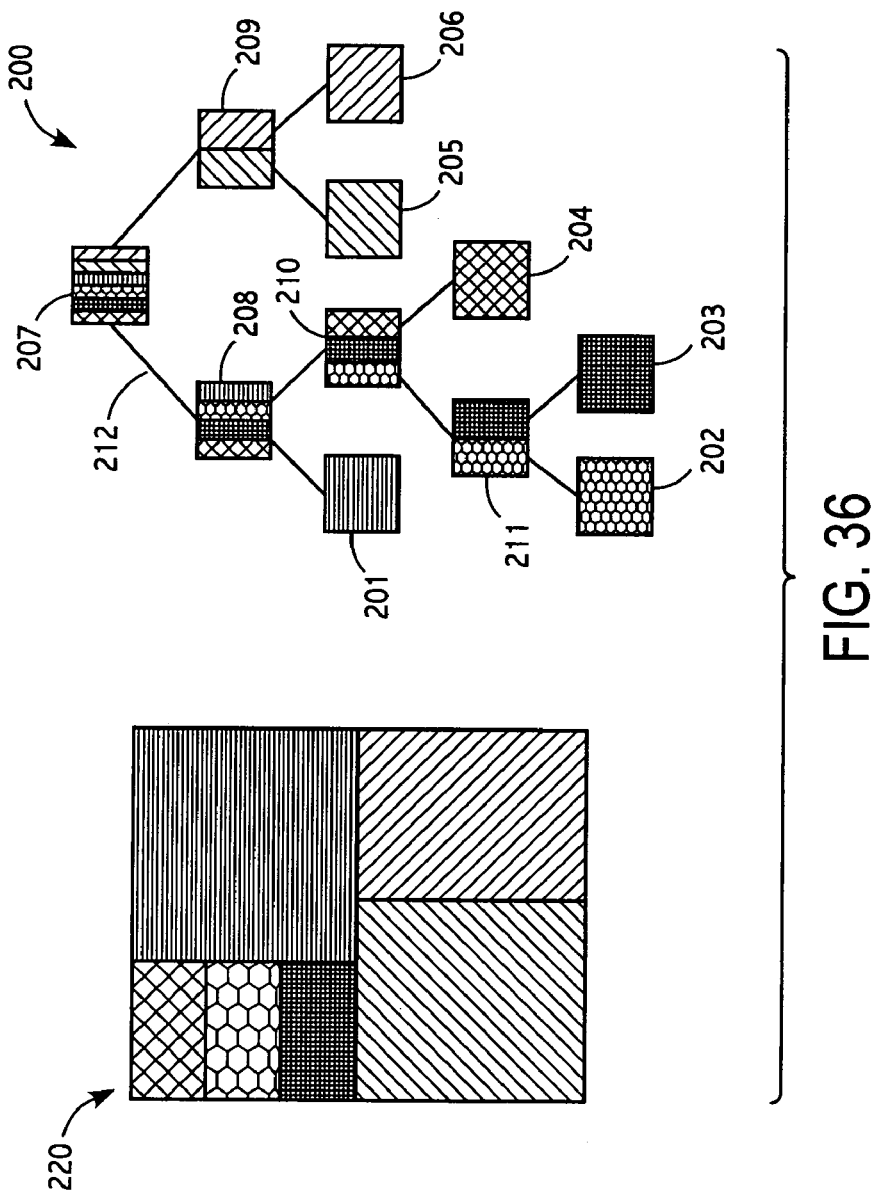
FIG. 36 illustrates a divided predefined area and its corresponding slicing structure.

The overall layout of graphic assemblies follows a "slicing structure" which can be written using a binary tree 200 as illustrated in FIG. 36, where components of the tree correspond to features of the page 220. The points in the tree that have branches 212 emanating from them are referred to as "internal nodes", while points in the tree that do not have branches emanating from them are referred to as "terminal nodes" or alternately, "leaves" of the tree 200. The page can be divided sequentially. Each internal node represents a horizontal or vertical dividing line or "cut" on the page; and each terminal node is associated with a graphic assembly. The representation on the left of FIG. 36 shows a page divided into six sub-areas, representing five divisions made from the original page. The representation on the right of FIG. 36 is a tree having six terminal nodes, or leaves 201, 202, 203, 204, 205, and 206, and five internal nodes, 207, 208, 209, 210, and 211. The present design builds different slicing structures depending on the desires of the user and the images presented, where each resultant slicing structure forms a layout, and multiple slicing structures and layouts can be prepared.

The layout creation method of an exemplary embodiment adds graphic assemblies to the layout one at a time, by refining the slicing structure. The first graphic assembly or GA is placed in the center of the page. The second graphic assembly is placed in one of two positions: either below, or beside, the first GA. The third GA is placed in one of 6 possible locations, and so on.

Figure 37:
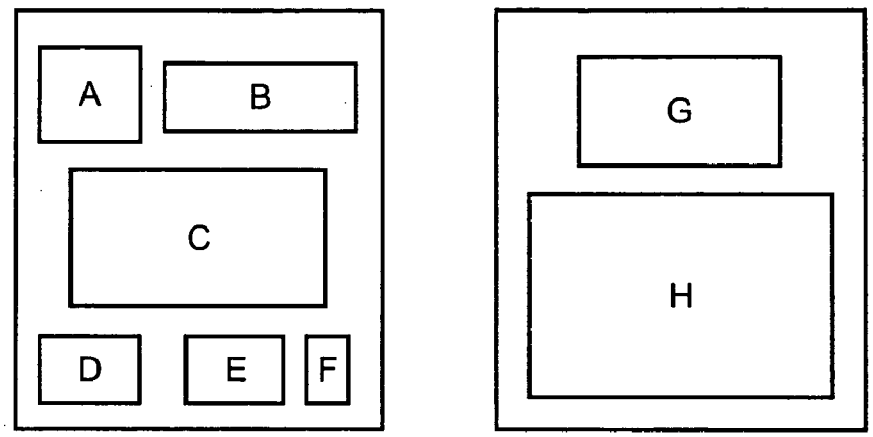
FIG. 37 illustrates the concept of strict area style layout of graphic assemblies in a predefined space.
Figure 38A:
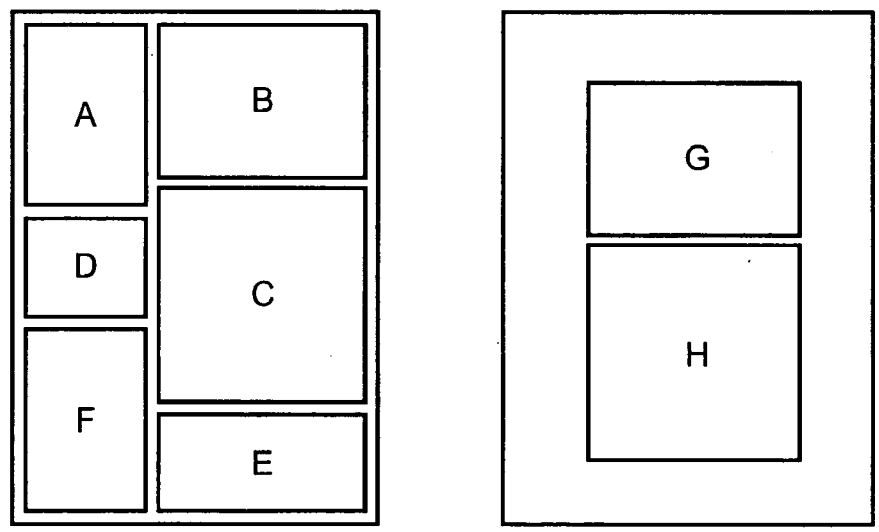
FIGS. 38A and 38B illustrate the concept of brick style layout of graphic assemblies in a predefined space.
Figure 38B:
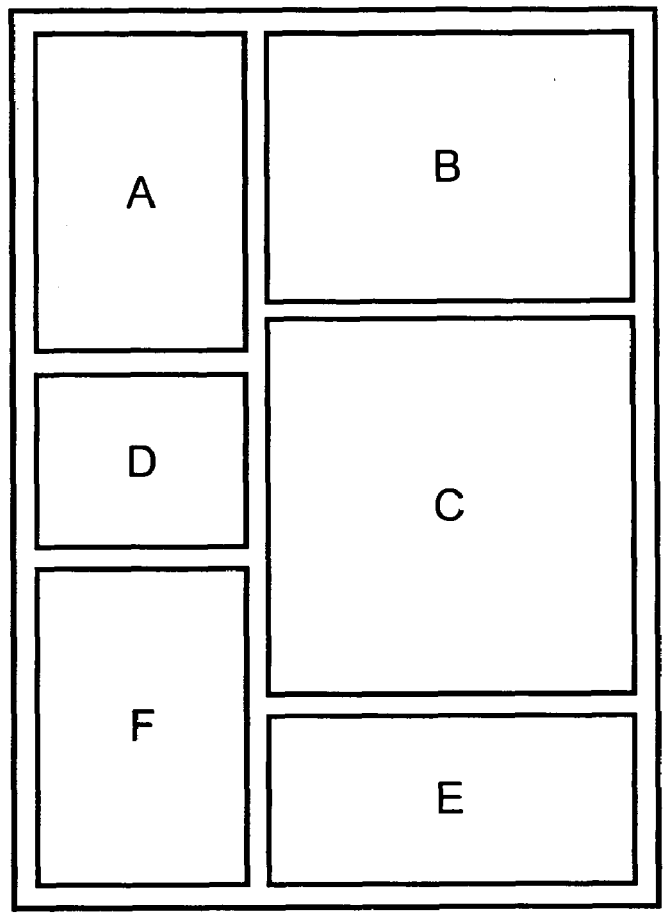

With respect to exemplary embodiments, two specific styles of layouts are considered, namely "strict area" style layouts (illustrated in FIG. 37) and "brick" style layouts (illustrated in FIGS. 38A and 38B). In strict-area style, each graphic assembly is either fixed-area or variable-area, and each variable-area GA is assigned a relative area proportion. Fixed-area graphic assemblies are constrained to be of a predetermined area, while variable-area graphic assemblies are constrained in that the areas of GA's on the same page must respect associated relative area proportions. In brick style, each graphic assembly is required to be of variable area. In brick layout, graphic assemblies are arranged like bricks in a wall.

Referring to the strict area style of layout in FIG. 37, strict area generally refers to the fact that the areas of variable-area GA's on the same page strictly adhere to their relative area proportions. Each image is located within a particular area or sub-area of the page. Conceptually, the page can be divided into multiple sub-areas, such as the left and right halves of the page, and the strict area layout style can center one image in the right half of the page and another image in the left half of the page.

When using the strict area style of layout, the user can provide a relative area proportion (RAP) value with each graphic assembly, used for purposes of dividing the page into areas. Use of a relative area proportion value enables the user to specify graphic assemblies have predetermined areas relative to other graphic assemblies on the same page. For example, a user can desire that a first graphic assembly be one-third the area of a second graphic assembly on the same page, and one-quarter the area of a third graphic assembly on the same page, where page areas are divided according to this preference and graphic assemblies centered in each area so divided. Relative area proportion is a numeric value, and in the foregoing example, the relative area proportions of the first, second and third graphic assemblies will be 1.0, 3.0, and 4.0, respectively. Relative area proportion is independent of the concept of aspect ratio, a subject discussed later.

Referring to the brick style of layout in FIG. 38A, brick style is defined by the aspect that there is no unused space between adjacent graphic elements. That is, GA's fit together like bricks in a wall, with no unused space between them. Brick style can be achieved by constraining adjacent photos, or blocks of photos, to be the same height (if they are placed side-by-side) or the same width (if they are placed one above the other). For example, as can be seen in the right-hand side of FIG. 38A, the width of photo G equals the width of photo H. Another example can be seen in the left-hand side of FIG. 38A, where the block of photos A, D, F has the same height as the block of photos B, C, E. Alternately, the layout of the GA's could be established as shown in FIG. 38B.

Mathematically, the strict area style of operation indicates that on a given page, the areas of the graphic assemblies satisfy:

$$A_1/e_1 = A_2/e_2 = \ldots = A_N/e_N = \Lambda$$

where N is the number of graphic assemblies on the page, $A_i$ are the actual graphic assembly areas, and $e_i$ are the user specified relative graphic assembly area proportions. Strict area layout controls relative area proportions. If the user specifies that graphic assembly A is to be three times the size of graphic assembly B, the strict area layout style directs graphic assembly A to be three times the size of graphic assembly B irrespective of the exact positions of the two graphic assemblies, and irrespective of the page dimensions. Strict area layout can also be employed where the user specifies area constraints in a more casual way. For example, the user can specify that certain selected graphic assemblies should be larger than the other graphic assemblies on the same page, but not larger by a precise multiplicative factor. In this example, the system making use of the present page production system could translate the casual specification into a precise assignment of relative area proportions even though the user is not aware of it. A user could specify three photos on the page to be "small" and three others to be "large," and the system would arbitrarily assign area proportions of between 1 and 3 to the "small" photos, and area proportions of between 4 and 6 to the "large" photos.

The aspect ratio of a graphic assembly is defined as the height of the graphic assembly divided by the width of the graphic assembly. Aspect ratios of graphic elements within graphic assemblies are regarded as fixed, reflecting the assumption that graphic elements, such as photographs, have already been framed or cropped to the satisfaction of the user and that it would be undesirable for the layout algorithm to crop graphic elements further. Thus, for graphic assemblies having only one graphic element, the aspect ratio of the graphic assembly is also regarded as fixed.

Each graphic assembly occupies an area on the page. The "area" as used herein is a fixed attribute of a rendered graphic assembly, which can be measured, for example, in units of square inches. The "relative area proportion," as described above, is a graphic assembly attribute used to compare areas of two graphic assembly on the same page. As such, "relative area proportion" and "area" are related but different concepts, with the former being purely relative in nature and the latter being absolute and measurable. For example, if the relative area proportions of two graphic assemblies differ by a factor of 4, so do the measurable areas of the two graphic assemblies in rendered output (e.g., on a printed page, on a representation of physical space, on a DVD cover, in a storybook, or on a computer display), regardless of the particular numerical values of their measurable areas.

Figure 39:
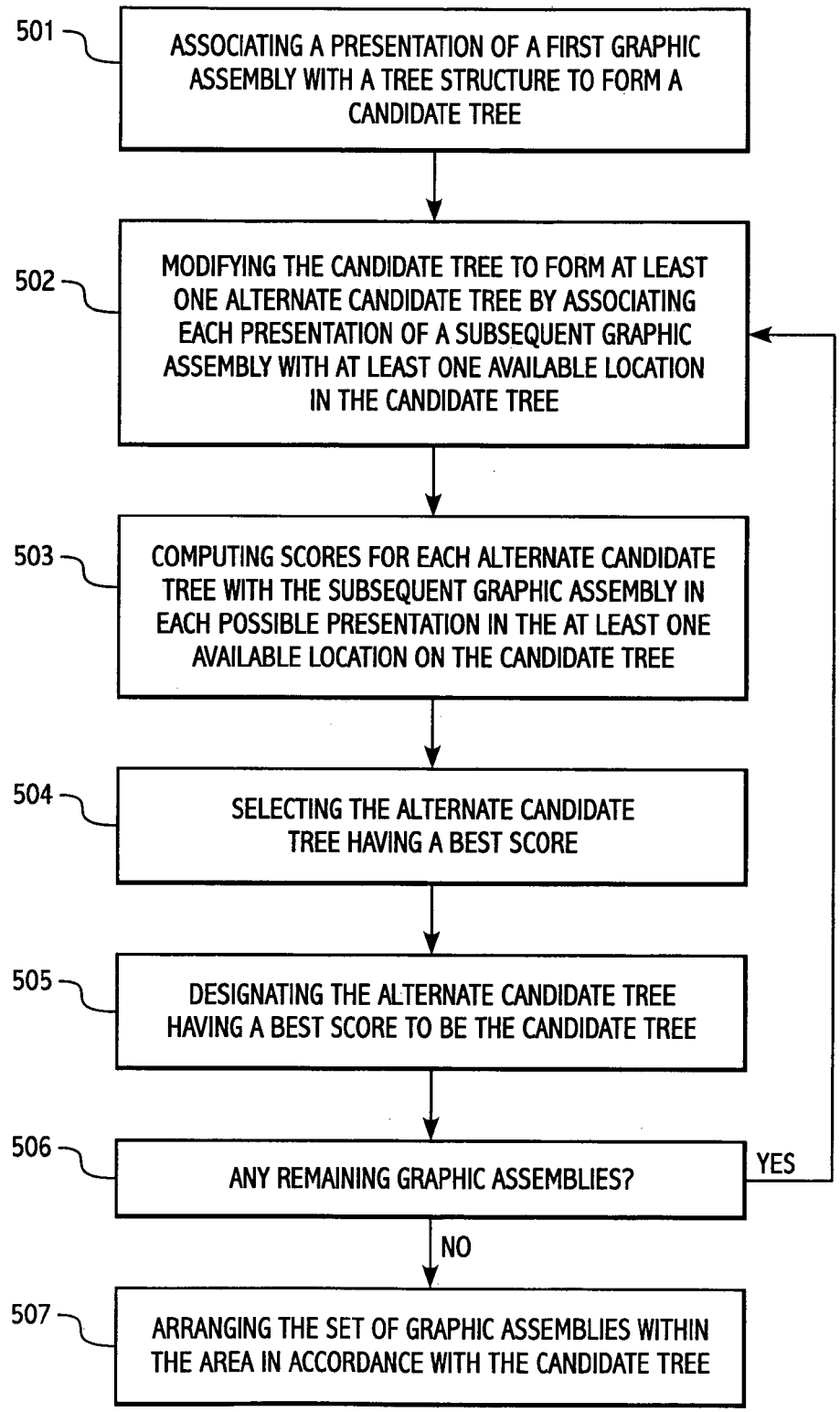
FIG. 39 is a flowchart of one embodiment of a method for arranging graphic assemblies in an area, according to exemplary embodiments.

FIG. 39 shows one embodiment of the page layout method of exemplary embodiments, where at least one graphic assembly has more than one possible presentation. At step 501, a first presentation of a first graphic assembly from a set of graphic assemblies is associated with a tree structure to form a candidate tree. At step 502, the candidate tree is modified to form at least one alternate candidate tree by associating each presentation of a subsequent graphic assembly from the set of graphic assemblies with at least one available location in the candidate tree. At step 503, scores are computed for each alternate candidate tree with the subsequent graphic assembly in each possible presentation in the at least one available location on the candidate tree. At step 504, the alternate candidate tree having a best score is selected, and at step 505 the selected alternate candidate tree is designated to be the candidate tree. At step 506, the system determines whether there are any remaining graphic assemblies to be added to the layout. If there are additional graphic assemblies, the newly designated candidate tree is modified at step 502 and the process as repeated. When no additional graphic assemblies remain, the system progresses to step 507, and the set of graphic assemblies is arranged in accordance with the candidate tree.

The method takes the specified graphic assemblies and adds each graphic assembly to the layout, one at a time. The method writes the layout in the form of a binary tree structure such as the binary tree structure illustrated in the right half of FIG. 36. The system adds each graphic assembly to the layout by inserting the graphic assembly into the layout tree structure. The system can insert the graphic assembly at any one of multiple locations within a layout tree structure. For graphic assemblies having more than one presentation, the system can consider each possible presentation of the graphic assembly at any one of multiple locations within a layout tree structure. In one embodiment, the system places and evaluates all presentations of the graphic assemblies in all available tree structure locations and selects the presentation and location yielding a layout having a best score.

Figure 40:
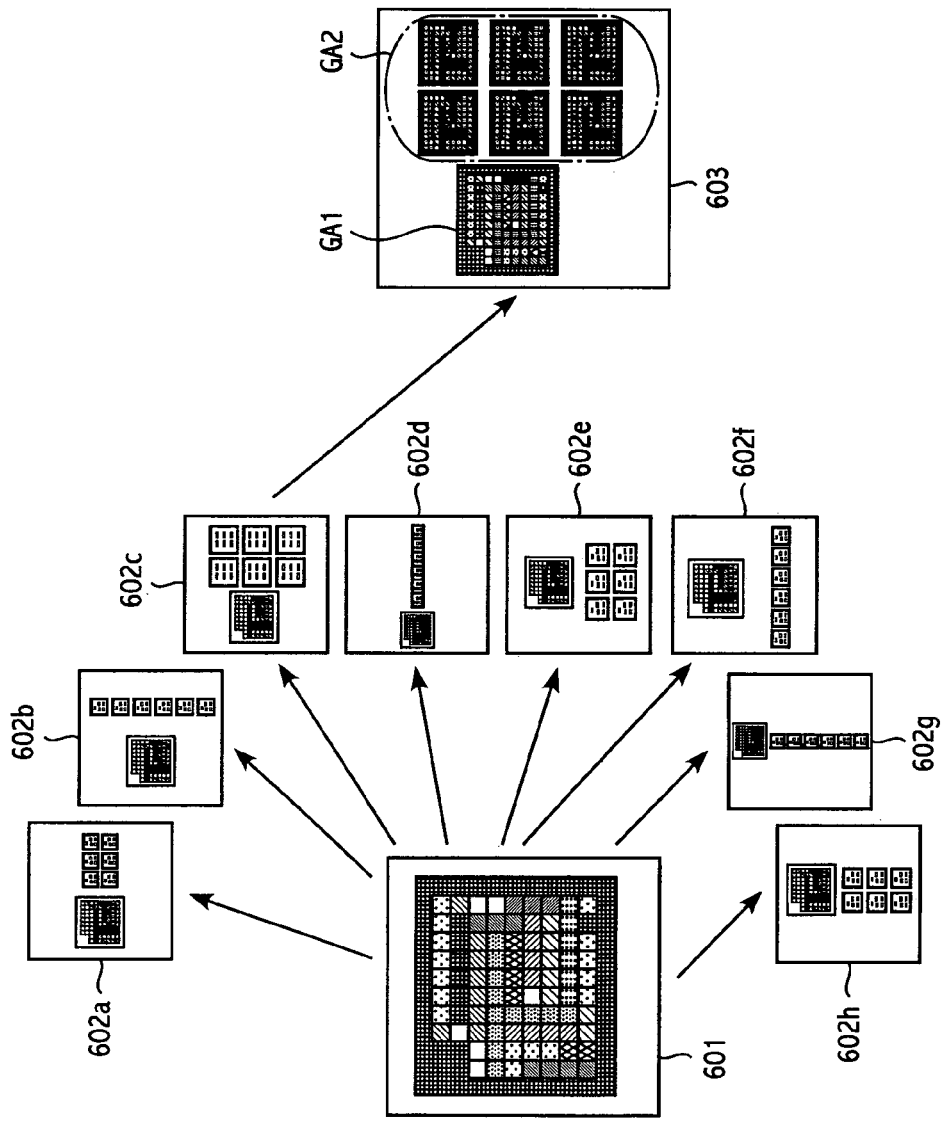
FIG. 40 illustrates the insertion of a graphic assembly having more than one possible presentation into a layout.

When inserting a graphic assembly into a location in the layout, each of the possible presentations of the graphic assembly is considered in turn. FIG. 40 shows a simple example, going from a page 601 with one graphic assembly (GA1) to a page 603 with two graphic assemblies (GA1 and GA2). In FIG. 40, the first graphic assembly GA1 is a single graphic element having a single presentation, while the incoming graphic assembly GA2 is a sequence of 6 key frames (e.g., graphic elements) with four allowable presentations of columns and rows (3×2, 1×6, 2×3, and 1×6,). The incoming graphic assembly GA2 is considered at two possible locations in the layout (beside and below the first graphic assembly GA1). Within each location, the incoming graphic assembly GA2 is considered in each of its four possible presentations. The resultant eight possible layouts are shown as candidate layouts 602a, 602b, 602c, 602d, 602e, 602f, 602g, and 602h. The position and presentation that are selected are those that produce the layout having the best score. In one embodiment, the scoring function depends upon the layout style (strict area or brick) as described below. In the example of FIG. 40, the selected candidate layout 602c places the incoming graphic assembly GA2 in the first location (beside the first graphic assembly GA1) in its third presentation (2 columns by 3 rows).

Thus, to add a graphic assembly to the layout, a deterministic sequence of candidate layouts are evaluated, where each candidate layout is induced by a candidate slicing structure. Each candidate slicing structure is the slicing structure of the existing layout with one additional node, which is associated with a presentation of the incoming graphic assembly. The candidate slicing structure having the best score is selected as the new layout that includes the new graphic assembly.

Figure 41A:
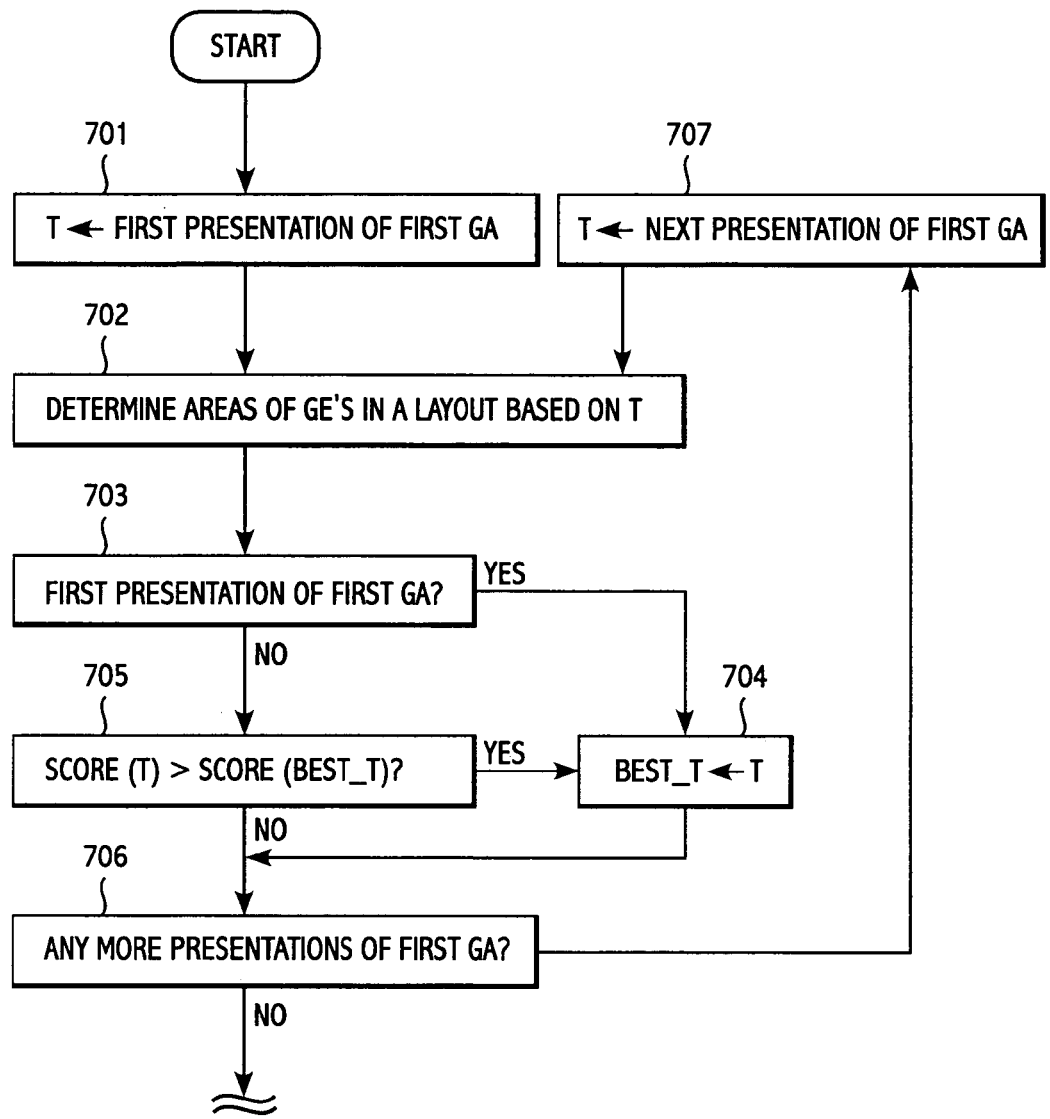
FIGS. 41A-41B is a detailed flowchart illustrating one embodiment of a method for arranging graphic assemblies in an area according to exemplary embodiments.
Figure 41B:
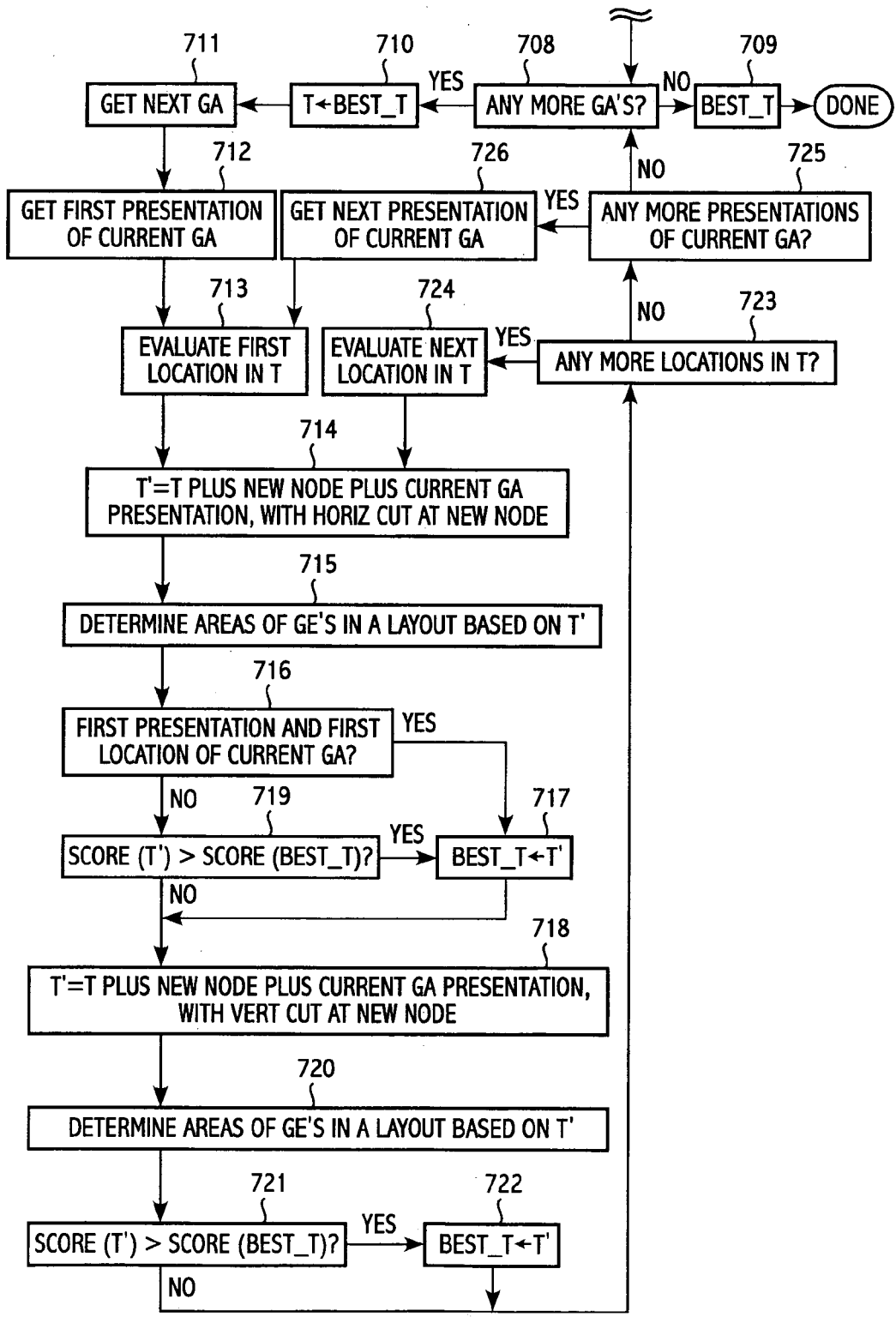

FIGS. 41A and 41B show one embodiment of the page layout method of exemplary embodiments, where at least one graphic assembly has more than one possible presentation. Element 701 initializes a candidate layout tree T with a first presentation of the first graphic assembly. Element 702 determines the areas of graphic elements in the graphic assembly (if any), operating according to the flow chart of FIG. 44, discussed below. The process of determining the area of graphic elements can also be referred to as normalization. Element 703 evaluates whether this is the first presentation of the first graphic assembly. If this is the first presentation of the first graphic assembly, element 704 designates tree T as the best layout tree, best_T, and proceeds to element 706. If this is not the first presentation of the first graphic assembly, element 705 computes a score for the current tree, Score(T), and compares Score(T) to a score for the best tree, Score (best_T), where scoring can be performed in the manner described below. If Score(T) is better than Score(best_T), element 704 designates the current tree T as the new best_T, and proceeds to element 706. If Score(T) is not better than Score(best_T), the best tree designation is not changed, and the process proceeds to element 706. Element 706 evaluates whether any further presentations of the first graphic assembly are available. If more presentations of the first graphic assembly are available, element 707 retrieves the next presentation of the first graphic assembly to form an alternate candidate tree layout. Element 702 determines the areas of graphic elements in the alternate candidate layout tree T (having the next presentation of the first graphic assembly). If, at element 706, it is determined that there are no further presentations of the first graphic assembly, element 708 determines whether there are any more graphic assemblies to be added to the layout. If there are no more graphic assemblies to be added to the layout, the best_T determined using the first graphic assembly is the final output at element 709.

If element 708 determines there are additional graphic assemblies to be added to the layout, then element 710 designates the best layout tree, best_T, from the first graphic assembly as the new candidate tree T, and element 711 retrieves the next graphic assembly. Element 712 retrieves or determines the first presentation of the current graphic assembly, and element 713 evaluates the graphic assembly presentation at a first location in candidate tree T. The "location" as used herein can be either an internal node or an external node (i.e., leaf) of the candidate tree T. At element 714, an alternate candidate tree T' is created by adding a new node in the place of the location, with one child of the new node being the subtree of candidate tree T whose root is the location in T, and with the other child of the new node being the current presentation of the graphic assembly currently being added to the layout. In alternate candidate tree T', a predetermined division, such as a horizontal or vertical division is made at the new node. Element 715 determines the areas of graphic elements in alternate tree T', in the manner described with respect to element 702. Element 716 determines if this is the first location and first presentation of the current graphic assembly. If this is the first location and first presentation of the current graphic assembly, element 717 designates alternate tree T' as the best layout tree, best_T, and proceeds to element 718. If this is not the first location and first presentation of the current graphic assembly, element 719 computes a score for the newly fashioned alternate tree T', Score(T'), and compares Score(T') with a score for the best layout tree, Score(best_T), where scoring can be performed in the manner described below. If Score(T') is better than Score(best_T), (indicating the alternate candidate tree T' is better than the candidate tree T), then element 717 designates T' as the best layout, best_T, and the operation moves to element 718. If Score(T') is not greater than Score(best_T), the best tree designation is not changed and operation progresses to the same element 718.

At element 718, another alternate layout tree T' is created by adding a new node in the place of the current location, with one child of the new node being the subtree of T whose root is the location of T, and with the other child of the new node being the current presentation of the graphic assembly currently being added to the layout. In alternate tree T' of element 718, a predetermined division such as a horizontal or vertical division, is made at the new node. The division made at element 718 (e.g., a vertical division) is different than the division made at element 714 (e.g., a horizontal division). Element 720 determines the areas of graphic elements in alternate tree T', in the manner described with respect to element 702 and 715. Element 721 determines a score for alternate candidate layout T', Score(T') and compares Score (T') with Score(best_T). Elements 705, 719, 721 can use the same or different scoring method. If the Score(T') is greater than Score(best_T), element 722 designates alternate tree T' as the best layout tree, best_T, and operation progresses to element 723. If element 721 determines the score of T' is not greater than the score of best_T, operation progresses directly to element 723. Element 723 determines whether there are any additional locations available in the candidate tree T. If additional locations are available in candidate tree T, the next location is designated for evaluation at element 724, and elements 714 through 723 are repeated using the same graphic assembly presentation. When element 723 determines no further locations are available in candidate tree T, operation progresses to element 725. Element 725 determines whether there are any additional presentations of the current graphic assembly available. If additional presentations of the graphic assembly are available, the system progresses to element 726 to retrieve the next presentation of the current graphic assembly. The next presentation of the current graphic assembly is then evaluated in each available location in T, following elements 713 through 724. When element 725 determines there are no more presentations of the current graphic assembly, the operation progresses to element 708, to again determine if there are any additional graphic assemblies to be added to the layout. When element 708 determines there are no more graphic assemblies to be added to the layout, best_T is the final output at element 709.

Figure 42:
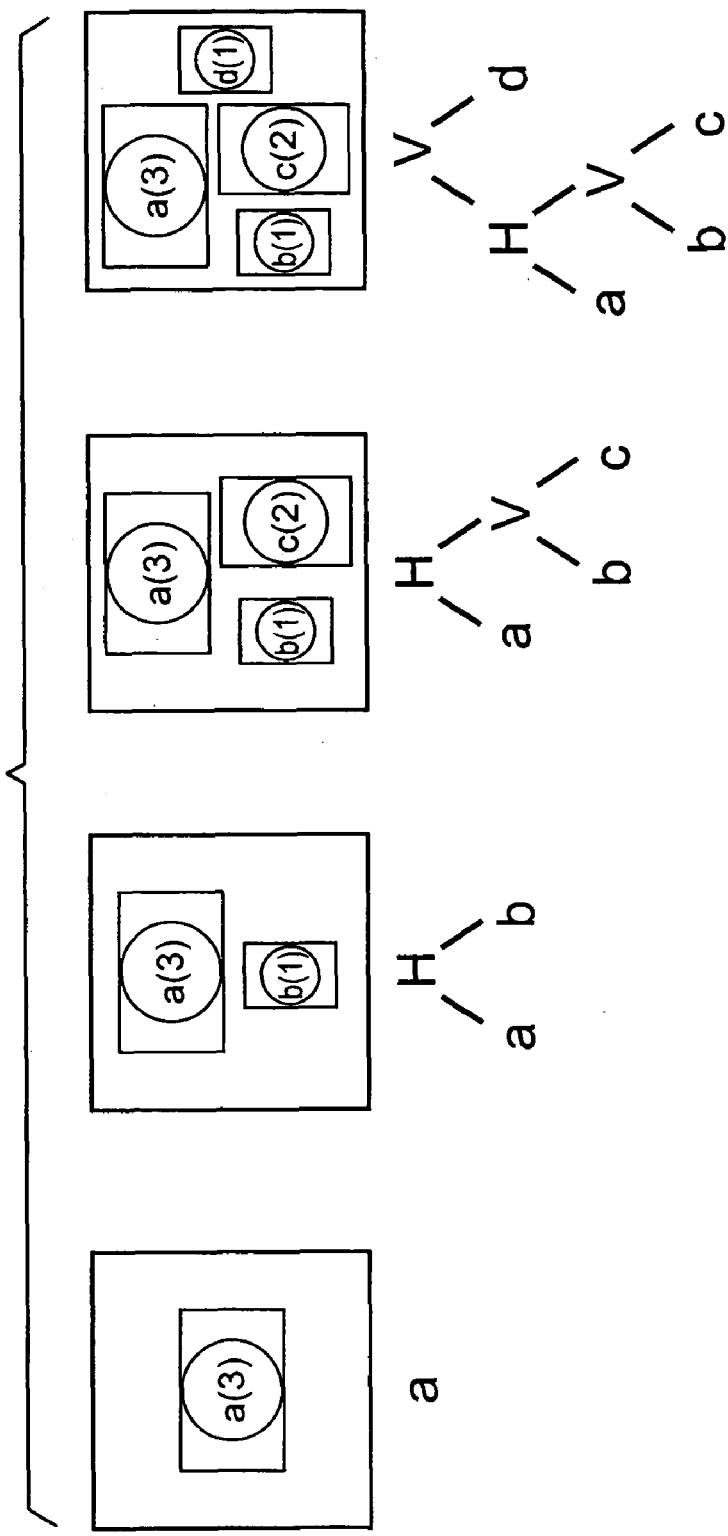
FIG. 42 illustrates successive insertions of graphic assemblies into an existing layout tree structure, and the corresponding layouts in one embodiment according to exemplary embodiments.
Figure 43A:
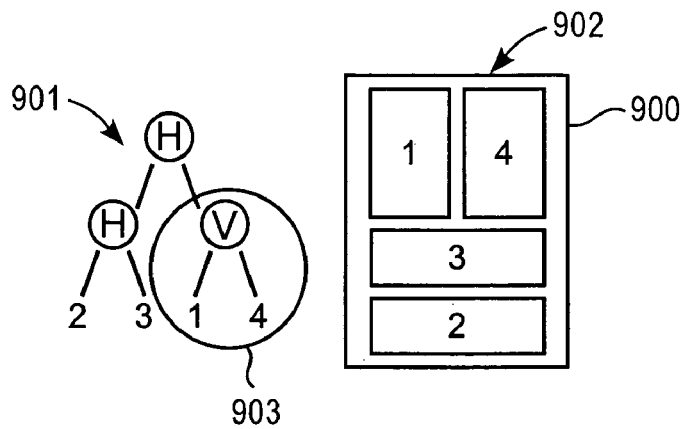
FIGS. 43A-43C illustrate insertion of a graphic assembly into an existing layout tree structure in one embodiment according to exemplary embodiments.
Figure 43B:
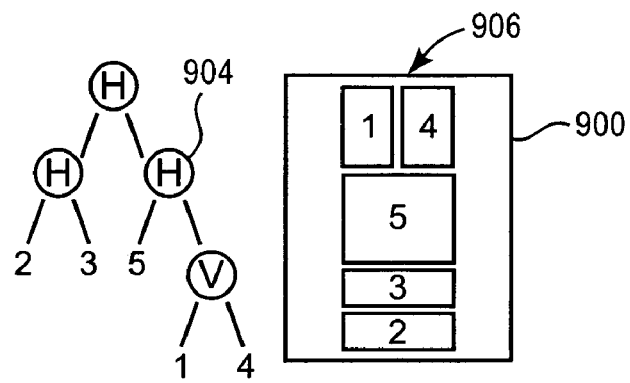
Figure 43C:
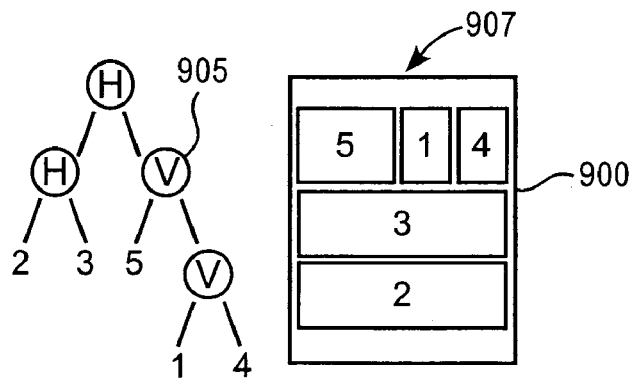

Successive insertions of graphic assemblies into an existing layout tree structure, and the corresponding layouts, are shown in FIG. 42. Insertion of each graphic assembly into an existing layout tree structure operates as follows. For a tree T having N graphic assemblies, the system can seek to add the $(N+1)^{st}$ graphic assembly. The system inserts the graphic assembly at a particular location of T in three steps. First the system removes the subtree rooted at the location, replacing it with a new node having either horizontal or vertical orientation. FIG. 43A shows a tree 901 having four associated graphic assemblies (GA1, GA2, GA3, and GA4) and a desire to insert a fifth graphic assembly, GA5, onto a page 900. The existing image layout without GA5 is shown as layout 902. FIG. 43B shows replacement of the subtree 903 with a new node 904, having a horizontal division "H". Second, the system can position the new graphic assembly GA5 as a child of the new node 904. FIG. 43B shows the new graphic assembly GA5 placed as a child of the new node 904. Finally, the system positions the subtree of T rooted at the original location (subtree 903) as the other child of the new node 904. From FIG. 43B, the system locates the new graphic assembly GA5, next to the subtree 903 of T rooted at the original node, and locates the original graphic assemblies, here graphic assemblies GA1 and GA4, as children of the new node 904 because they are included in the subtree 903. This three phase process is further illustrated in FIG. 43C. In FIG. 43C, the system inserts the new graphic assembly GA5 at the new vertical division "V" node 905.

In operation, the system adjusts the layout to fit within the usable area of the page 900, irrespective of whether the aspect ratios of layout and usable area are equal. In the example of FIG. 43A, the layout has aspect ratio approximately equal to the aspect ratio of the page 900. In both the trial layouts of FIGS. 43B and 43C, shown on the page 900 as layouts 906 and 907, respectively, the system scales the layout to fit inside the page 900. The two trial layouts have a different aspect ratio than the original layout, and all the graphic assemblies in the layout adjust to the newly added graphic assembly GA5. The system adjusts existing graphic assemblies GA1, GA2, GA3, and GA4 in size and not aspect ratio.

Figure 44:
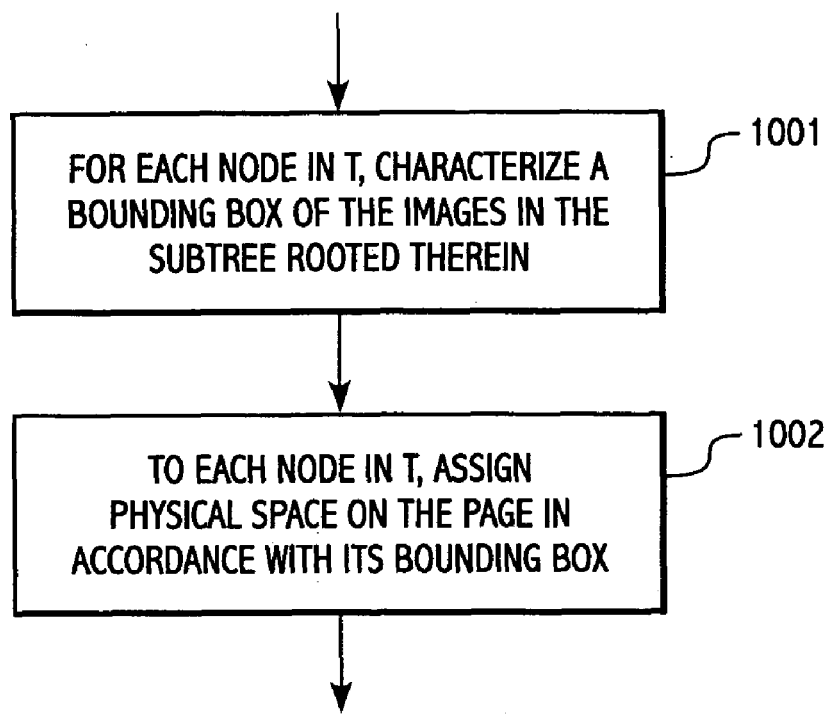
FIG. 44 is a flowchart of one normalization process according to exemplary embodiments.

Normalization of a layout is shown in FIG. 44. As related above, normalizing a layout refers to the steps required to determine the areas of variable-area graphic assemblies, and makes the tree layout structure generally consistent with the desired style, such as strict area style or brick style. From FIG. 44, element 1001 states that for each node in T, the system characterizes a bounding box of the images in the subtree rooted therein. Element 1002 operates by, for each node in T, assigning physical space on the page in accordance with its bounding box. Thus, irregularly shaped images, images with captions, and so forth, can be uniformly defined and positioned in a visually acceptable format. One exemplary operation of elements 1001 and 1002 is described in co-pending U.S. patent application Ser. No. 10/675,823, filed Sep. 30, 2003, titled "Single Pass Automatic Photo Album Page Layout", having common inventorship herewith.

In one embodiment according to the page production system, normalization of a candidate layout requires a determination whether an established candidate layout is "feasible." If a determination is made that a candidate layout is feasible, then the areas of variable-area graphic elements within the graphic assemblies are determined. A layout is "feasible" if the graphic assemblies and user or system-specified fixed spaces between graphic assemblies and/or graphic elements all fit inside the usable area of the page.

Figure 45A:
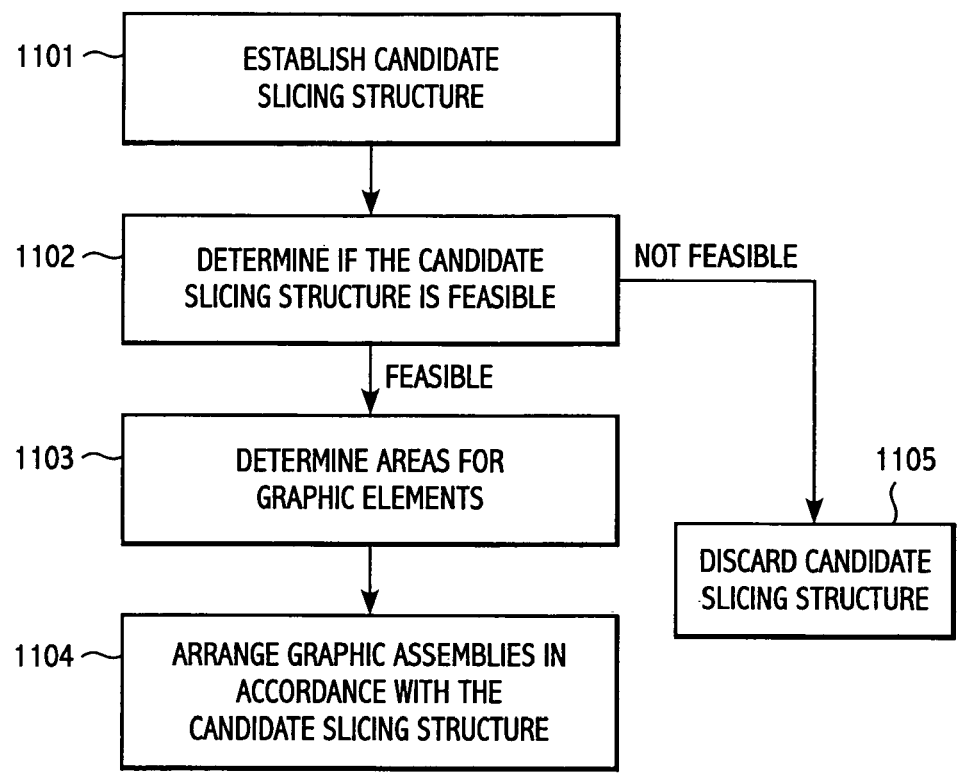
FIGS. 45A-45B are flowcharts of another normalization process according to exemplary embodiments.
Figures 46A, 46B:
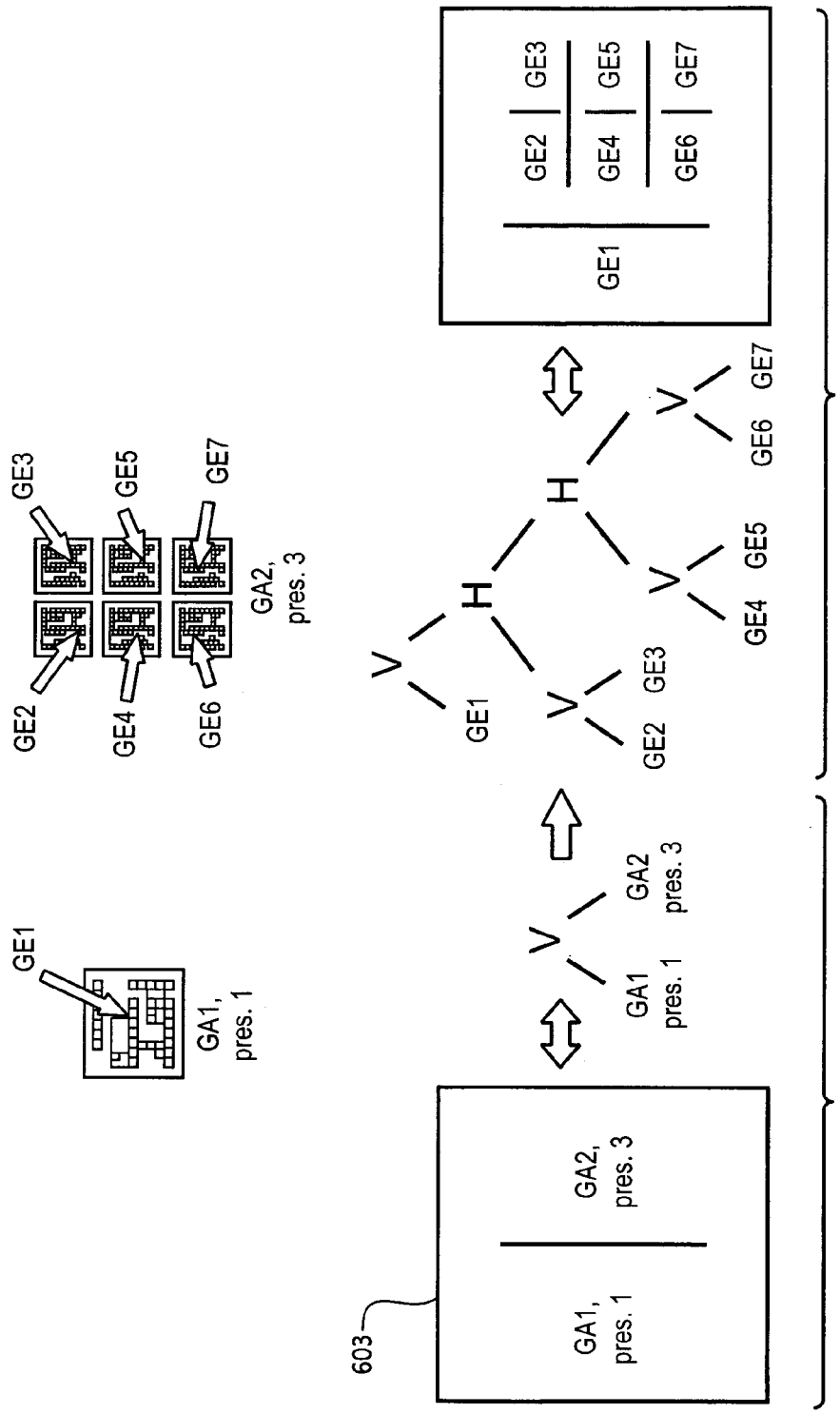
FIGS. 46A-46B illustrate the translation of a candidate slicing structure where each terminal node is associated with a graphic assembly presentation, to a complete slicing structure where each terminal node is associated with a graphic element.

With reference to FIG. 45A, a candidate slicing structure or tree is established (step 1101). The candidate slicing structure can be established as described above, where each terminal node or leaf is associated with a graphic assembly presentation. Because a graphic assembly can include more than one graphic element, the candidate slicing structure is translated to a "complete" slicing structure (CSS) where each terminal node or leaf is associated with a graphic element (i.e., individual photo, key frame, etc.). This is a straightforward operation as illustrated in FIGS. 46A and 46B (which use the candidate layout 603 of FIG. 40 as an example), because each graphic assembly presentation is itself represented by a slicing structure. In FIG. 46A, the terminal node associated with presentation 3 of GA2 is replaced with the slicing structure representing the third presentation of GA2, to arrive at the CSS of FIG. 46B. In the case where each graphic assembly is a single graphic element, then the CSS is identical with the candidate slicing structure.

Referring again to FIG. 45A, after the candidate tree or slicing structure is established and translated to a CSS, the feasibility of the CSS is determined (step 1102). In response to a CSS being feasible, the areas of variable area graphic assemblies and/or graphic elements can be determined (step 1103) and then arranged in accordance with the CSS (step 1104). If a CSS is determined to not be feasible, it is discarded (step 1105).

Figure 45B:
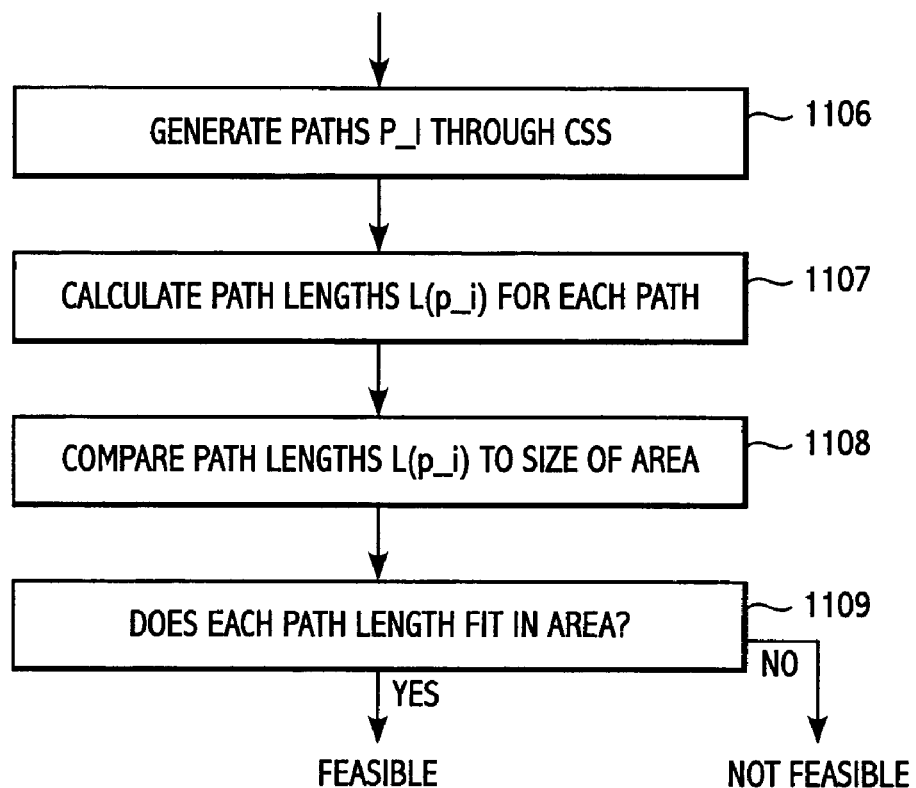

In one embodiment, determining the feasibility of the CSS in step 1102 of FIG. 45A is accomplished as illustrated in FIG. 45B. Referring to FIG. 45B, paths through the CSS are generated (step 1106), where the i$^{th}$ path is denoted as p_i, and the path lengths L(p_i) are then calculated for each path (step 1107). One implementation of step 1106 is described below with reference to FIGS. 47A and 47B. The path lengths are compared to the size of the area (step 1108), and the layout is determined to be feasible if each path fits within the available area (step 1109).

Figure 47A:
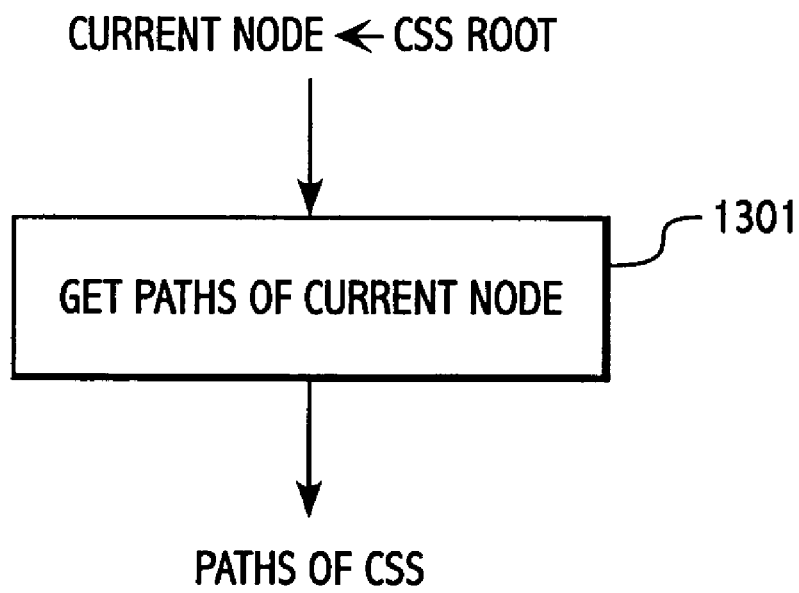
FIG. 47A is a flowchart illustrating the generation of paths through a complete slicing structure according to exemplary embodiments.
Figure 47B:
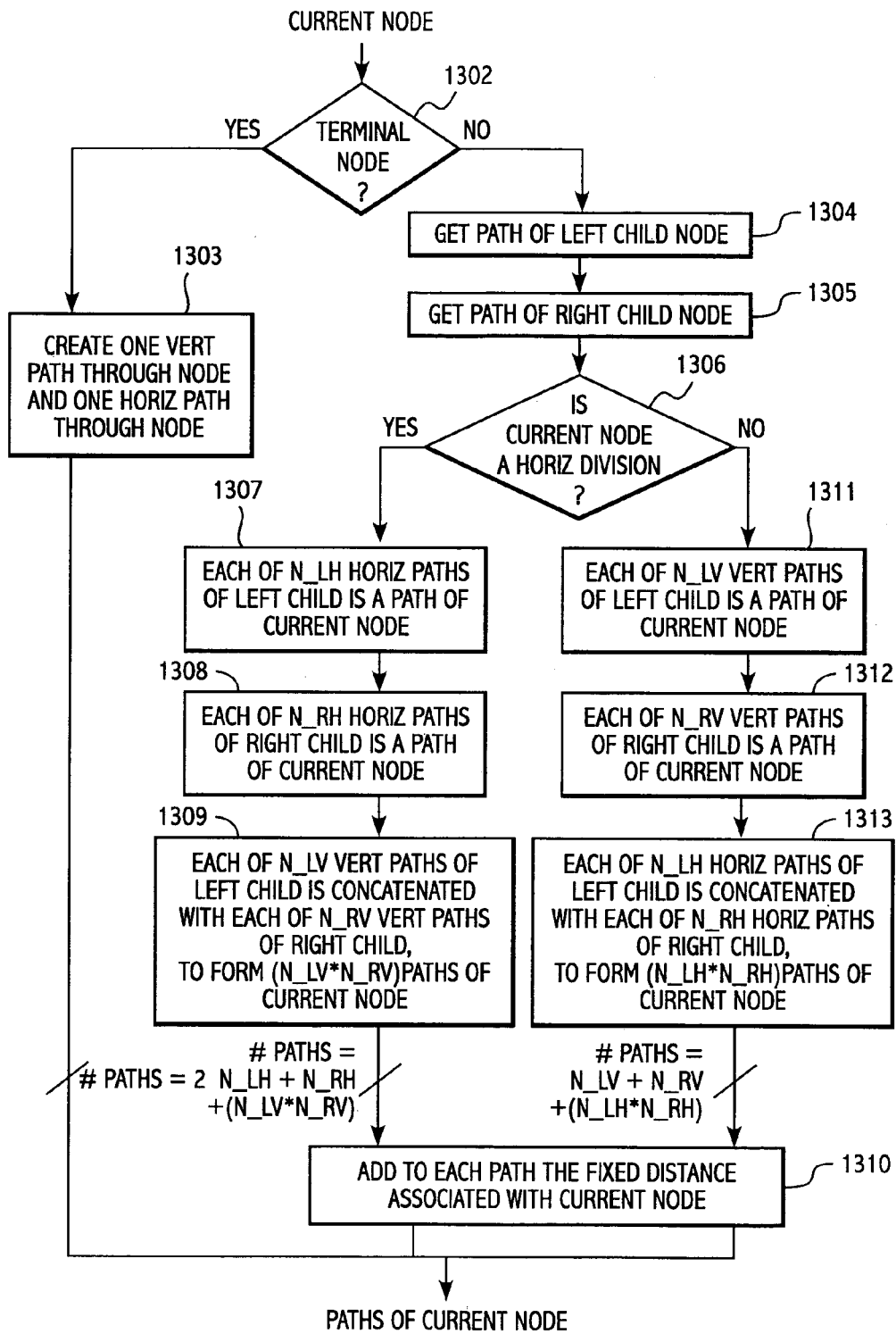
FIG. 47B is a flowchart illustrating one embodiment of a recursive method for generating paths through a complete slicing structure according to exemplary embodiments.
Figure 48A:
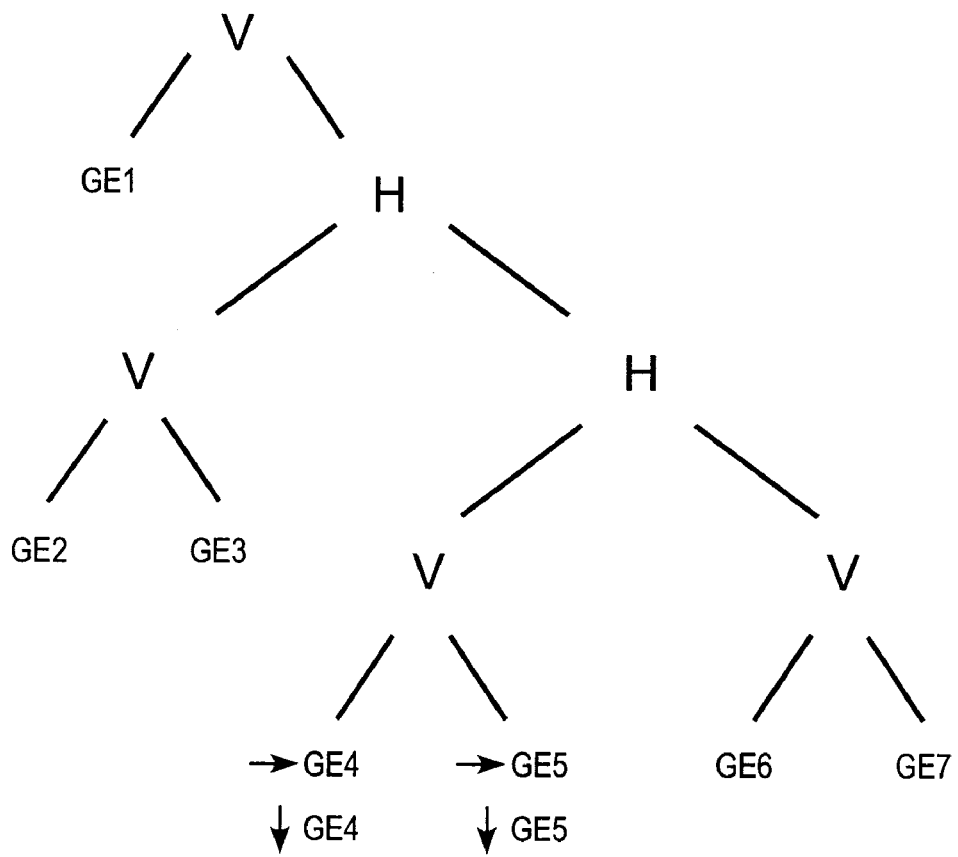
FIGS. 48A-48E illustrate the process generating paths according to the method of FIG. 47A.
Figure 48B:
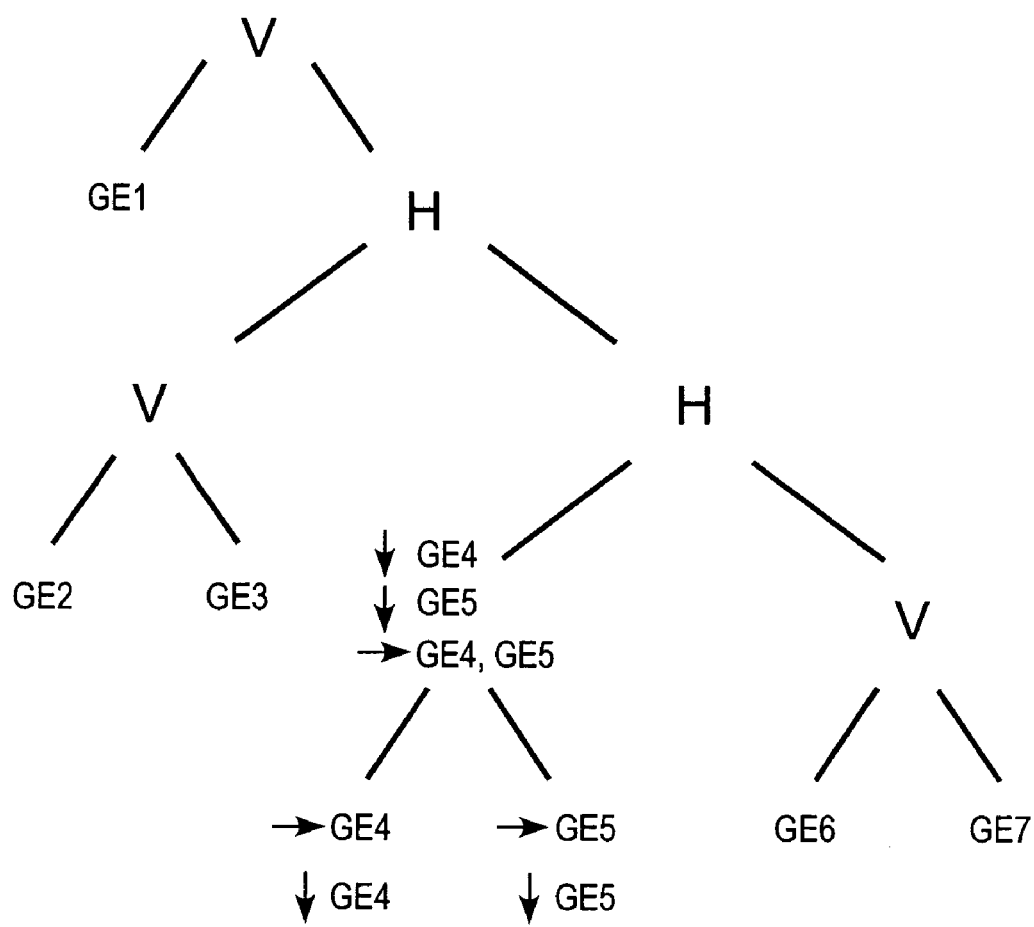
Figure 48C:
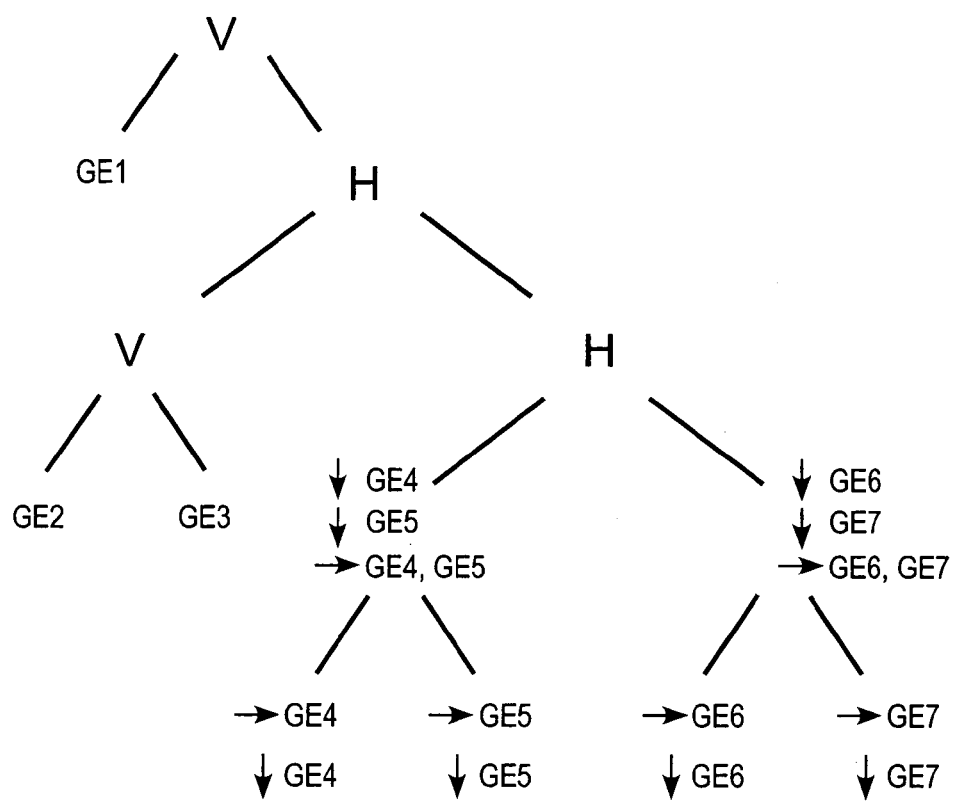
Figure 48D:
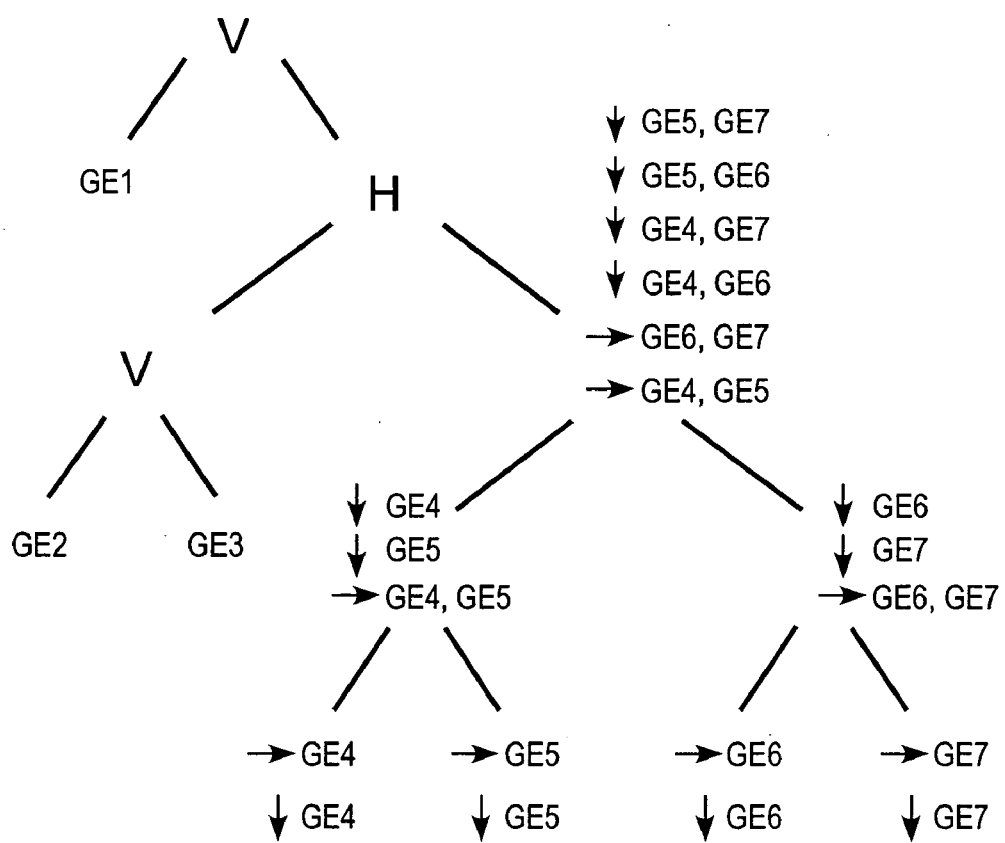
Figure 48E:
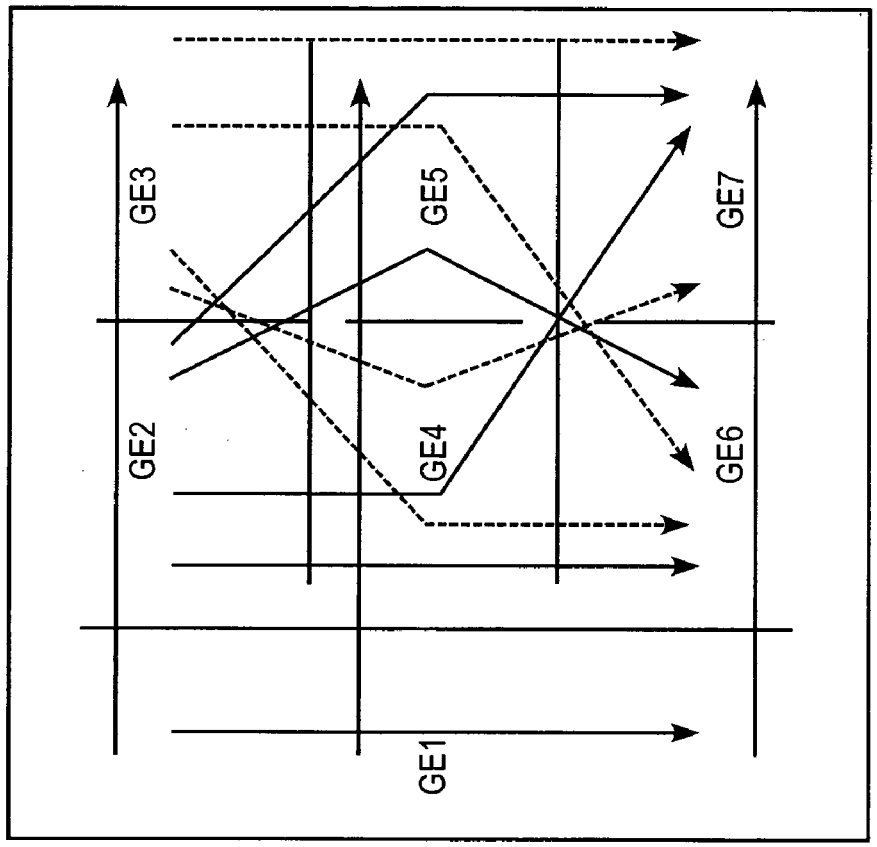

Referring to FIG. 47A, a complete set of paths through the CSS is determined by setting the root node of the CSS as the current node, and submitting the node to a recursive process 1301. One implementation of the recursive path generation process 1301 is illustrated in FIG. 47B In the recursive process, the current node is input into the process and a decision is made at element 1302 whether the current node is a terminal node (i.e., leaf) or not. If the current node is a terminal node, two new paths are started at element 1303: a horizontal path with a single step traveling through the graphic element associated with the terminal node (e.g., from left to right), and a vertical path with a single step traveling through the graphic element (e.g., from top to bottom).

If the current node is not a terminal node, the two child nodes of the current node (i.e., the left child node and the right child node) are submitted to the same recursive process in elements 1304 and 1305, and then the paths from the two child nodes are combined. Element 1306 determines if the current internal node represents a horizontal division or a vertical division. If the internal node represents a horizontal division, then the node inherits the horizontal paths of its children. In particular, if the internal node represents a horizontal division, then the node inherits each of the horizontal paths, N_LH HORIZ, of its left child (element 1307), and each of the horizontal paths, N_RH HORIZ, of its right child (element 1308). At element 1309, the node obtains a new set of vertical paths created in a kind of "crossing" operation: each vertical path of the left-hand child, N_LV VERT, is in its turn concatenated with each vertical path of the right-hand child, N_RV VERT, to form (N_LV*N_RV) vertical paths of the current node. The number of paths is thus equal to N_LH+ N_RH+(N_LV*N_RV). At element 1310, any fixed distances K associated with the current node are added to each path. Fixed distances K can include, for example, dimensions of fixed area graphic elements and user-specified fixed spacing between graphic elements. If the internal node represents a vertical division, then the node inherits the vertical paths of its children. In particular, if the internal node represents a vertical division, then the node inherits each of the vertical paths, N_LV VERT, of its left child (element 1311), and each of the vertical paths, N_RV VERT, of its right child (element 1312). At element 1313, the node obtains a new set of horizontal paths created in a kind of "crossing" operation: each horizontal path of the left-hand child, N_LH HORIZ is in its turn concatenated with each horizontal path of the right-hand child, N_RH HORIZ, to form (N_LH*N_RH) horizontal paths of the current node. The number of paths is thus equal to N_LV+N_RV+(N_LH*N_RH). At element 1310, any fixed distances K associated with the current node are added to each path. The paths from the root node are an exhaustive collection of paths through the divisions of the CSS. An example of this process is partially illustrated in FIGS. 48A-48E, using the CSS of FIG. 46B.

Referring back to FIG. 45B, the lengths of the vertical and horizontal paths are then calculated (step 1107). If path p_i is vertical, then its length is:

$$L(p\_i)=\text{sum(fixed distances through divisions along } p\_i)+\text{sum(heights of fixed-area graphic elements on } p\_i)+\text{sum(heights of variable-area graphic elements on } p\_i) \qquad (1)$$

Notice that the height of a graphic element can be written as follows:

$$sqrt(a*A)=sqrt(a)*sqrt(A)=sqrt(a)*Q$$

where A is the area of the graphic element; a is the aspect ratio; and Q is defined as the square root of the area. So if p_i is a vertical path, its length can be written:

$$L(p\_i)=K\_i+sum\_j(Q\_(i,j)*sqrt(a\_(i,j))) \qquad (2)$$

where K_i is the sum of the first two terms in (1), that is, all the fixed distances along path p_i; and where the "sum over j" is adding up the heights of variable-area graphic elements on path p_i. (Thus, the variable i is used to indicate a path, and for a given path p_i, the variable j indexes across all the variable-area graphic elements along the path.)

From a similar derivation the length of horizontal path p_i can be written:

$$L(p\_i)=K\_i+sum\_j(Q\_(i,j)/sqrt(a\_(i,j))) \qquad (3)$$

where K_i is a sum of horizontal fixed distances and widths of fixed-area photos along path p_i.

After the horizontal and vertical path lengths L(p_i) through the complete slicing structure (CSS) are known, the path lengths L(p_i) are compared with the size of the area (e.g., height and width) (step 1108) to determine if the layout is feasible. The layout is determined to be feasible if the fixed-distance term K_i for each path p_i fits within the available space on the page (step 1109). That is, the layout is feasible if, for each horizontal path p_i, K_i is less than the width of the usable area; and for each vertical path p_i, K_i is less than the height of the usable area.

In strict area style layout, each variable-area graphic assembly has an assigned relative area proportion (RAP). In the context of a graphic assembly having more than one graphic element (such as a series of key frames from a video), a single, "aggregate RAP" is assigned to the entire graphic assembly, and the RAPs of the individual graphic elements in the graphic assembly are set to equal the aggregate RAP divided by the number of graphic elements in the graphic assembly. In the remainder of this section we will assume each object is a graphic element with a positive RAP denoted "e."

Since a RAP is proportional to the actual area, the variable Q introduced above, can be rewritten as follows:

$$Q=g*sqrt(e)$$

where g is a positive scalar such that g$^2$ multiplied by the RAP is an absolute measurable area (e.g., square inches). The ratio of Q divided by sqrt(e) is a constant across all variable-area graphic elements, so that the same value of g is used for all variable-area graphic elements on the page. Thus, in equations (2) and (3) above, when substituting g*sqrt(e) for Q, g can be pulled out of the summation terms to arrive at:

$$L(p\_i)=K\_i+g*sum\_j(sqrt(e\_(i,j))*sqrt(a\_(i,j))) \qquad (4)$$

$$L(p\_i)K\_i+g*sum\_j(sqrt(e\_(i,j))/sqrt(a\_(i,j))) \qquad (5)$$

where $e\_(i,j)$ is the relative area proportion of the j-th variable-area graphic element situated on path p_i.

If path p_i is a vertical path and the available area on the page has height H, then solving the following equation for g_i yields the value for which p_i is exactly as long as the available area is high:

$$K\_i+g\_i*sum\_j(sqrt(e\_(i,j))*sqrt(a\_(i,j)))=H \quad (6)$$

Similarly, if path p_i is a horizontal path and the available area has width W, then solving the following equation for g_i yields the value for which the path fits exactly across the available area:

$$K\_i+g\_i*sum\_j(sqrt(e\_(i,j))/sqrt(a\_(i,j)))=W \quad (7)$$

In one embodiment, areas for variable-area graphic elements are made as large as possible, while still allowing all the graphic elements to fall completely on the usable area of the page, by (for each path p_i) solving for g_i using either equation (6) or (7), depending on whether p_i is a vertical or horizontal path. Because the layout has previously been determined to be feasible, as described above, each solution for g_i will be positive. If g* is defined to be the smallest solution across all the paths:

$$g^* = \min\_i(g\_i)$$

then the area of the j-th variable-area graphic element is computed as:

$$A\_j=(g^*)^2*e\_j$$

where e_j is the RAP assigned to the j-th variable-area graphic element.

In brick style layouts, relative area proportions are not used, and all graphic elements are of variable area. Graphic element areas are determined by first computing values of Q. Once the values of Q are known, they can be squared to compute absolute, measurable areas (e.g., square inches). Values of Q are computed for two scenarios: (1) the height of the area occupied by graphic elements is constrained to equal the height of the usable area on the page; and (2) the width of the area occupied by graphic elements is constrained to equal the width of the usable area on the page. In most cases, only one of scenarios (1) and (2) will yield a feasible solution because in the other scenario, the unconstrained dimension will be greater than the available space. The scenario yielding the feasible solution is selected to produce the final set of graphic element areas.

In either scenario (1) or (2), values of Q are computed as the solution to a linear system of equations having N unknowns, where N is the number of graphic elements. N−1 of the equations come directly from the interior nodes of the complete slicing structure (CSS), because in a CSS accommodating N graphic elements, there are exactly (N−1) interior nodes.

For an interior node that represents a vertical division or cut of the area, the equation is obtained by first obtaining two vertical paths, one path from each of its two children, and setting their lengths to be equal. Referring to equation (2) above, denoting the vertical path from the left-hand child as p_L, and from the right-hand child as p_R, the equation is:

$$K\_R+sum\_j(Q(R,j)*sqrt(a\_(R,j)))=K\_L+sum\_k(Q(L,k)*sqrt(a\_(L,k)))$$

where the variable j indexes over the graphic elements along p_R, and k indexes over the graphic elements along p_L. Rearranging the equation yields:

$$sum\_j(Q(R,j)*sqrt(a\_(R,j)))-sum\_k(Q(L,k)*sqrt(a\_(L,k)))=K\_L-K\_R \quad (8)$$

The situation is analogous for an interior node that represents a horizontal division or cut of the area. Two horizontal paths are obtained, and their lengths set to be equal, yielding:

$$sum\_j(Q(R,j)/sqrt(a\_(R,j)))-sum\_k(Q(L,k)/sqrt(a\_(L,k)))=K\_L-K\_R \quad (9)$$

By constructing an equation of the form of either (8) or (9) for each interior node, N−1 equations are obtained for N unknowns. For scenario 1, the $N^{th}$ equation is obtained by setting the length of any vertical path from the root node equal the height of the available area. For scenario 2, the $N^{th}$ equation is obtained by setting the length of any horizontal path from the root node equal the width of the available area.

For either scenario, the N equations are written in matrix-vector form (Ax=b). The matrix contains only zeros, positive and negative square roots of graphic element aspect ratios, and positive and negative inverses of square roots of graphic element aspect ratios. The N elements of vector x are the sought-after Q variables, and b is a column vector of dimension N where each element is computed as the right-hand side of either (8) or (9), or is equal to the height (scenario 1) or width (scenario 2) of the available area. Computing inverse (A)*b yields the vector of Q values.

In one embodiment, the area of variable-area graphic elements is determined for every candidate layout using the process of FIGS. 45A and 45B. When there is at least one fixed-area graphic assembly or graphic element, or if the specified fixed distance between graphic elements is not small compared to the available page area, then using the process of FIGS. 45A and 45B is necessary to ensure that areas for the variable-area graphic assemblies are sized such that space is reserved for the fixed-area elements (e.g., fixed-area graphic assemblies, fixed-area graphic elements, and/or fixed spacings).

In another embodiment, when the graphic assemblies include only variable area graphic elements and the specified fixed distance between graphic element is small compared to the available page area, the process of FIGS. 45A and 45B is used only as a finishing step after incorporating all graphic assemblies into the tree. The result of using the process of FIGS. 45A and 45B as a "finishing" step is that the graphic element sizes are in accordance with both the page dimensions and the required fixed spacing between graphic elements.

For either strict area or brick style layouts, once the graphic element areas are known it is possible to arrange the graphic elements on the page, generating a complete layout. Because graphic element areas have previously been determined, it is only necessary to find graphic element positions.

Figure 49A:
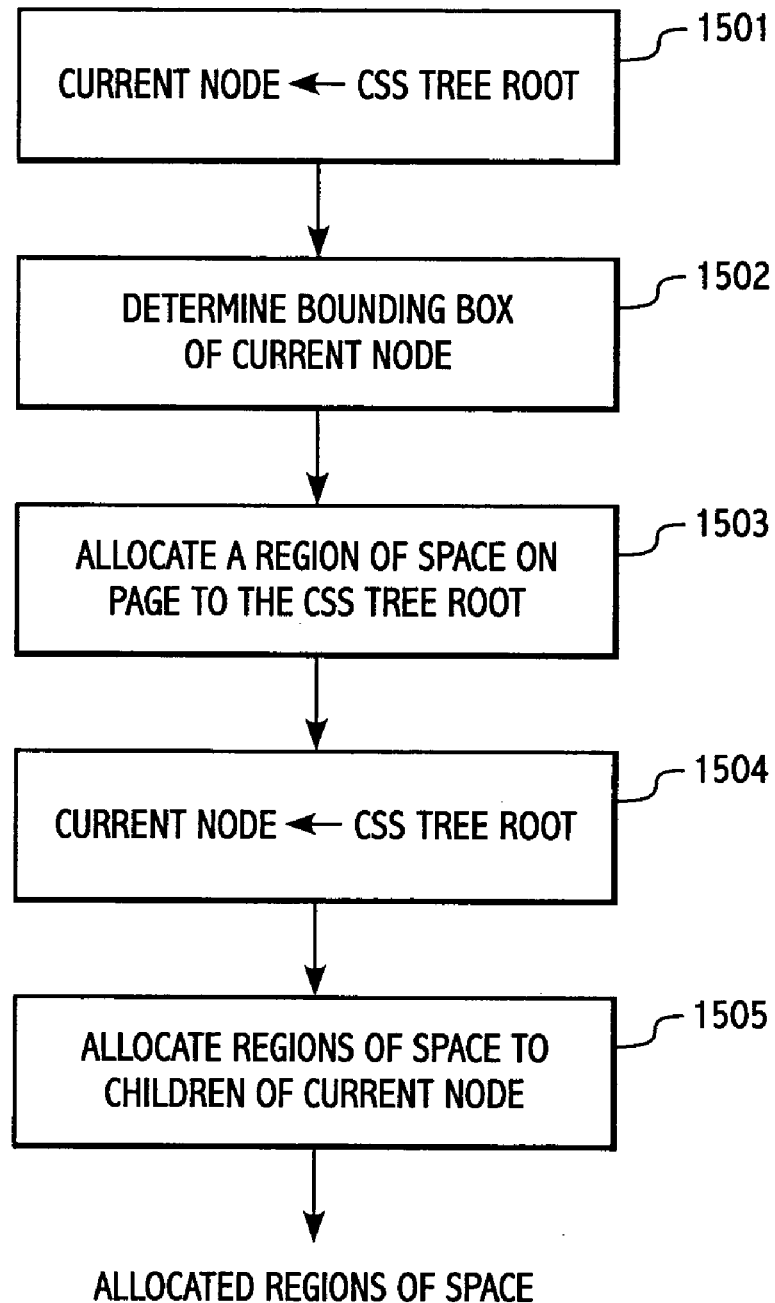
FIG. 49A is a flowchart illustrating one embodiment of a method for determining graphic element positions according to exemplary embodiments.

Referring to FIG. 49A, regions of space on a page are allocated to graphic elements. First, the root node of the CSS is set to the current node (element 1501), and a bounding box that encloses the current node is determined using a recursive process (element 1502). One implementation of the recursive process of element 1502 is described below with reference to FIG. 49B. Next, a physical region of space on the page is allocated to the root node in the CSS (element 1503). One implementation of element 1503 is described below with reference to FIG. 49C. In one implementation, the region allocated to the root node has the area and aspect ratio of the bounding box for the root obtained in element 1502, and it is centered on the usable area of the page. Next, the CSS is again set to the root node (element 1504), and then regions of space are allocated to children of the root node using a recursive process (element 1505). One implementation of element 1505 is described below with reference to FIG. 49D.

Figure 49B:
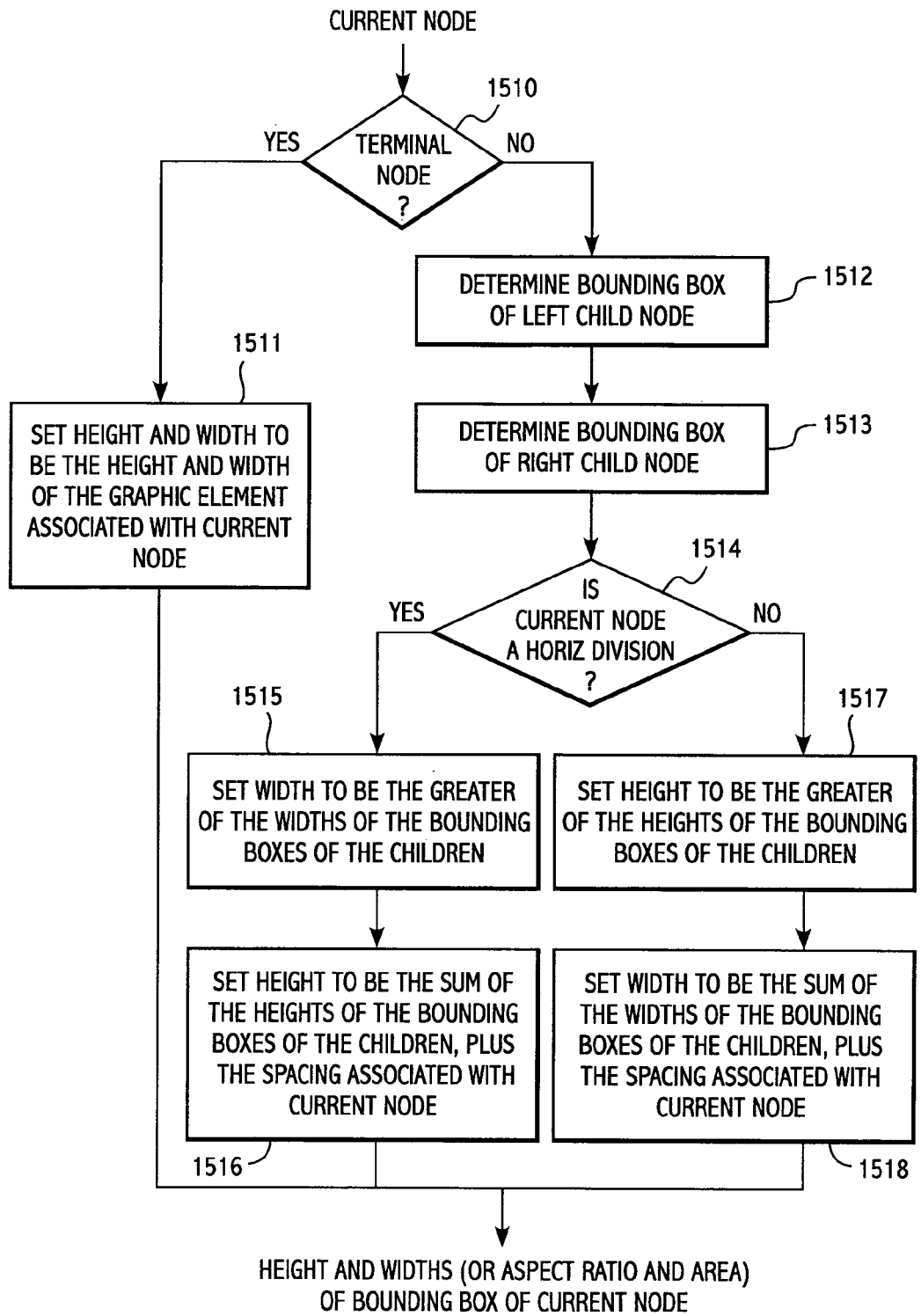
FIG. 49B is a flowchart illustrating one embodiment of a method for determining a bounding box of a node according to exemplary embodiments.

Referring to FIG. 49B, for each interior node in the CSS, a bounding box is determined that encloses the graphic elements and fixed spacing between graphic elements by submitting the current node to a recursive subroutine. In the recursive subroutine, a decision is made whether the current node is a terminal node (element 1510). If the current node is a terminal node, a bounding box is established that has the height and width of the associated graphic element (element 1511). If the current node is not a terminal node, the two child nodes of the current node (i.e., the left child node and the right child node) are submitted to the same recursive process in elements 1512 and 1513, and then the bounding boxes of the two children are combined to form the bounding box for the current node as follows: Element 1514 determines if the current node is a horizontal division or a vertical division. If the current node represents a horizontal division, then the width of the bounding box is defined to be the width of the wider of the bounding boxes of the two children (element 1515), and the height of the bounding box is determined as the sum of the heights of the bounding boxes of the two children, plus the fixed spacing distance assigned to the node itself (element 1516). If the current node represents a vertical division, the height of the bounding box is defined to be the height of the taller of the bounding boxes of the two children (element 1517), and the width of the bounding box is determined as the sum of the widths of the bounding boxes of the two children, plus the fixed-spacing distance assigned to the node itself (element 1518). This process repeats until the bounding box for the root node is computed.

Figure 49C:
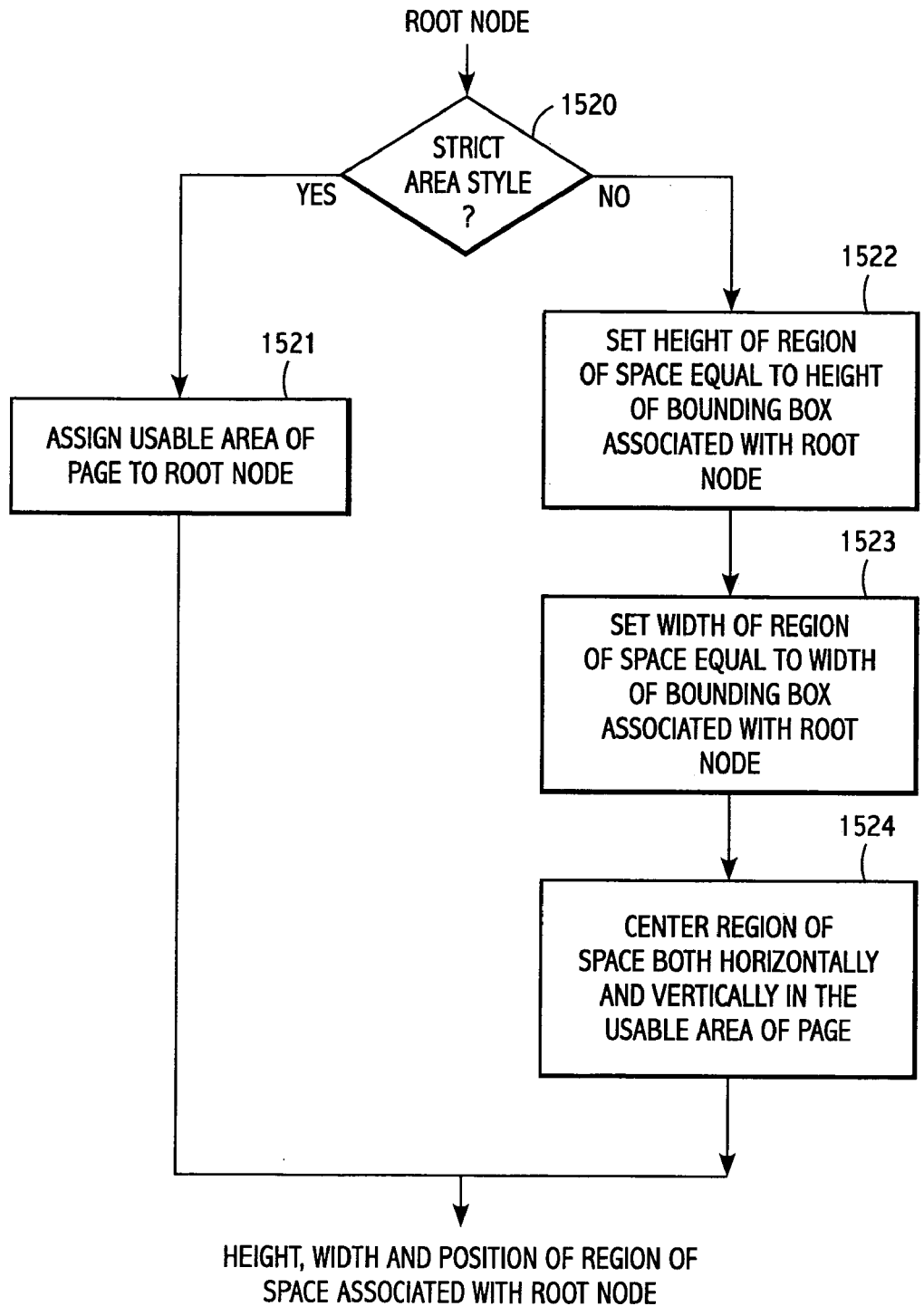
FIG. 49C is a flowchart illustrating one embodiment of a method for assigning a region of space to a root node according to exemplary embodiments.

Referring to FIG. 49C, a physical region of space on the page is allocated to the root node in the CSS. The process of the second step depends upon the layout style. The layout style is determined at element 1520. For strict area style layout, the region assigned to the root node is the entire usable area of the page (element 1521). For brick style layout, the region assigned to the root node has the height of the bounding box for the root obtained above (element 1522), and the width of the bounding box for the root obtained above (element 1523). The region is then centered in the usable area of the page (element 1524).

Figure 49D:
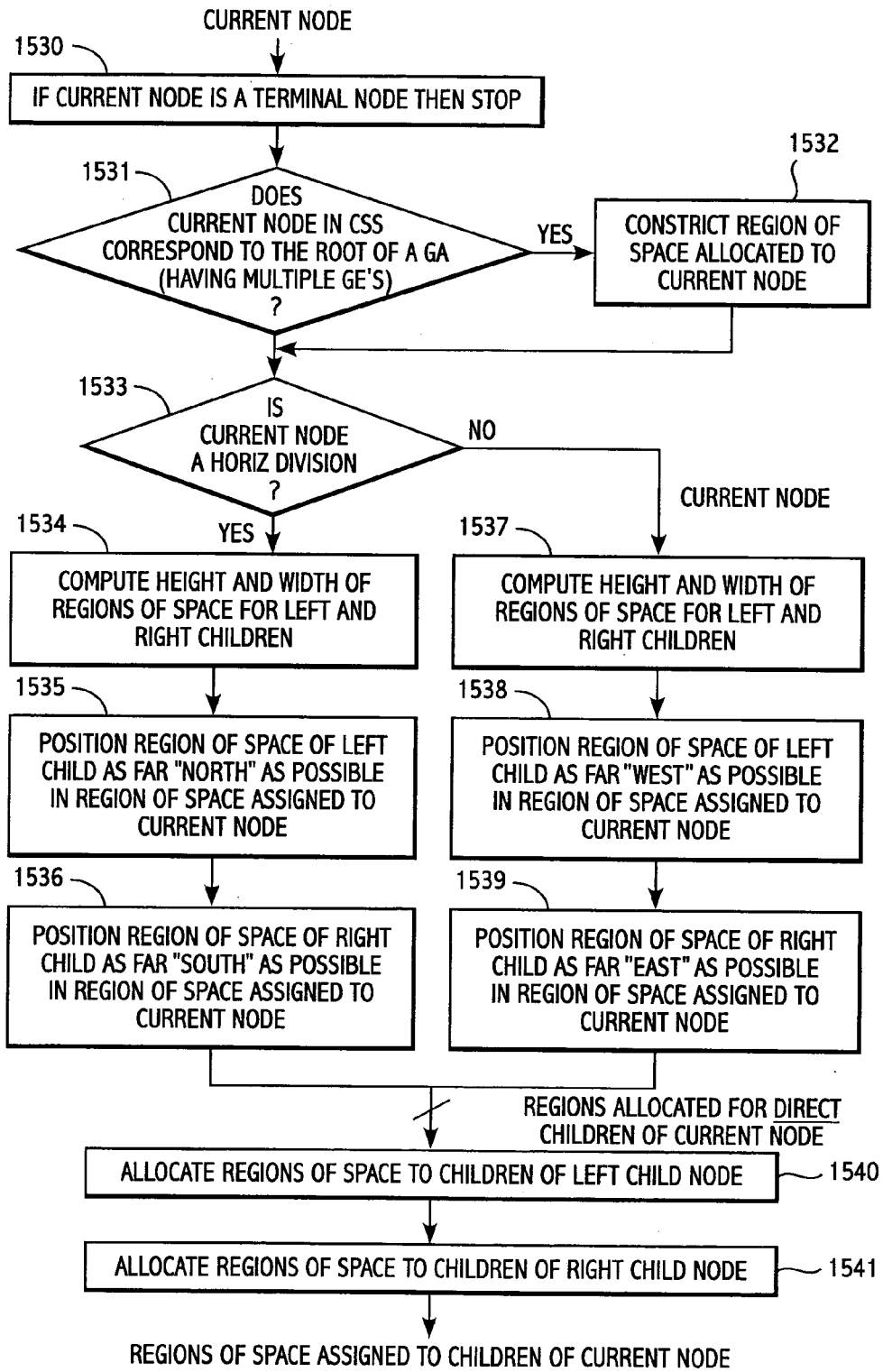
FIG. 49D is a flowchart illustrating one embodiment of a method for allocating regions of space to children of a node according to exemplary embodiments.

Referring to FIG. 49D, the region of space assigned to each interior node is divided between its two direct children. The division is accomplished by setting the root node of the CSS to the current node, and implementing a recursive process. In the recursive process, a decision is made whether the current node is a terminal node (element 1530). If the current node is terminal node, or "leaf", then nothing is done. If the current node is an interior node, a determination is made whether the current node is the root node of a graphic assembly having more than one graphic element (element 1531). If this is the case, then the region assigned to the current node is "constricted" (element 1532) by reassigning the height and width of the region to be the height and width of the bounding box previously computed for the current node, and the position of the region is centered in the region previously assigned to the current node. In brick style layout this has no effect. In strict area style layout, this has the effect of pulling together the images in a graphic assembly having more than one graphic element (such as a series of key frames). The system then progresses to element 1533. If at element 1531 it is determined that the current node is not the root node of a graphic assembly having more than one graphic element, the system progresses directly to element 1533. Element 1533 determines whether the current node represents a horizontal division of the page, or a vertical division of the page. If the current node represents a horizontal division, the height and width of the regions of space for left children and right children are computed (element 1534), using the process of FIG. 49E. The region of space of the left child is positioned as far "north" as possible in the region of space assigned to the current node (i.e., as far toward the top as possible) (element 1535). The region of space of the right child is positioned as far "south" as possible in the region of space assigned to the current node (i.e., as far toward the bottom as possible) (element 1536). If the current node represents a vertical division, the height and width of the regions of space for left children and right children are computed (element 1537), using the process of FIG. 49E. The region of space of the left child is positioned as far "west" as possible in the region of space assigned to the current node (i.e., as far toward the left as possible) (element 1538). The region of space of the right child is positioned as far "east" as possible in the region of space assigned to the current node (i.e., as far toward the right as possible) (element 1539). The regions of space are thus allocated for the direct children of the current node. The process described above is repeated to allocate regions of space to children of the left child node (element 1540), and to allocate regions of space to children of the right child node (element 1541). The process is repeated until regions of space are assigned to all children (direct or otherwise) of the current node.

Figure 49E:
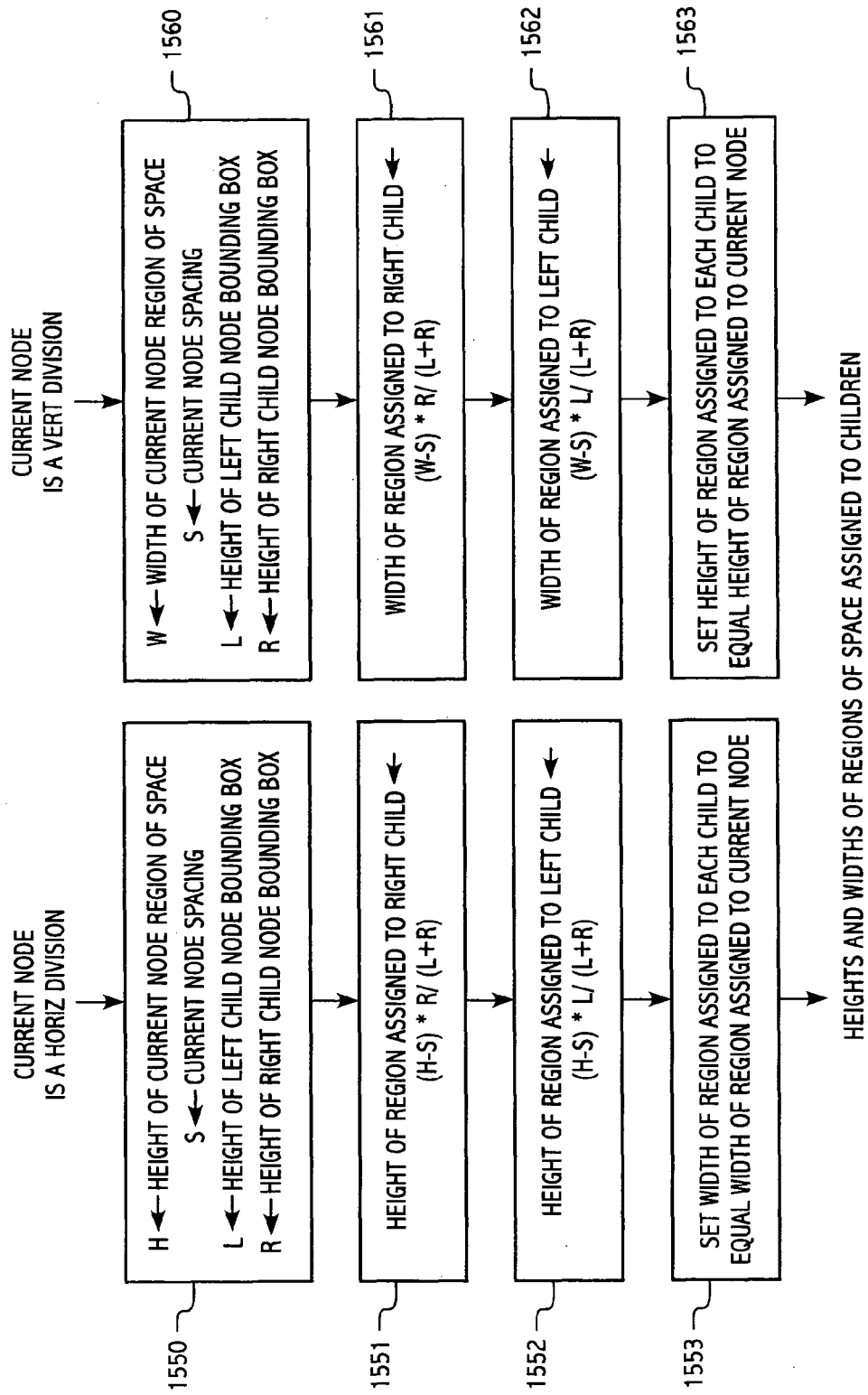
FIG. 49E is a flowchart illustrating one embodiment of a method for computing the height and width of regions of space for left and right hand children according to exemplary embodiments.

Referring to FIG. 49E, a method for computing height and width of the regions of space for left and right hand children is illustrated, for both nodes representing a horizontal page division and nodes representing a vertical page division. For nodes representing a horizontal division, the first system sets certain variables (element 1550), including: the height of the current node region of space, H; the current node spacing, S; the height of the left child node bounding box, L; and the height of the right child node bounding box, R. The height of the region assigned to the right child is set to $(H-S)*R/(L+R)$ (element 1551). The height of the region assigned to the left child is set to $(H-S)*L/(L+R)$ (element 1552). The width of the region assigned to each child is set to equal the width of the region assigned to the current node (element 1553).

For nodes representing a vertical division, the first system sets certain variables (element 1560), including: the width of the current node region of space, W; the current node spacing, S; the height of the left child node bounding box, L; and the height of the right child node bounding box, R. The width of the region assigned to the right child is set to $(W-S)*R/(L+R)$ (element 1561). The width of the region assigned to the left child is set to $(W-S)*L/(L+R)$ (element 1562). The height of the region assigned to each child is set to equal the height of the region assigned to the current node (element 1563). In a final step, for each terminal node, the graphic element is centered inside the assigned region.

Once the system has determined the areas of any variable-area graphic assemblies, the layout is scored (elements 705, 719 and 721 of FIGS. 41A and 41B). The scoring function can have significant effects on the visual quality of the layout. The way the layout is scored depends upon the layout style (strict area layout style or brick layout style). In strict area style, the score is the sum of the areas of the variable-area graphic elements.

In brick style, an initial score can be computed as an initial score, such as:

$$initial\_score=1.5*alpha+consistency$$

Alpha is a numeric value that measures how well the aspect ratio of the page agrees with the aspect ratio of the bounding box around the graphic assemblies on the page. Consistency measures the variation in the areas occupied by graphic assemblies on the page, and can be computed as the area of the smallest graphic assembly on the page, divided by the area of the largest graphic assembly on the page. For alpha and consistency, a value of, for example, 1.0 represents an ideal, and a value of, for example, 0.0 represents the worst available alpha or consistency.

In one embodiment, alpha and consistency have values between 0 and 1, and are computed as follows:

Alpha=min(page_aspect, pbb_aspect)/max(page_aspect, pbb_aspect)

where page_aspect is the aspect ratio of the usable area on the page; and pbb_aspect is the aspect ratio of the "principal bounding box," or the bounding box associated with the root node.

Consistency=min(area of GA's on page)/max(area of GA's on page)

where the area of a graphic assembly (GA) is computed as the sum of the areas of the graphic elements in the graphic assembly.

Other initial scores can be computed. This initial score can be penalized for values of alpha and/or consistency that are below predetermined thresholds, and the system can compare resultant scores for different parameters than specified above. For example, in one embodiment, the alpha and consistency terms can take into account any space between graphic elements within a graphic assembly. However, in other applications, the area between graphic elements within a graphic assembly is small compared to the areas of the graphic elements themselves, and the space can be neglected.

The foregoing description affords the ability to develop a visually pleasing layout while affording the user the ability to provide certain inputs. As described above, the user can control the processing by providing parameters to the composition steps, thereby allowing page composition to proceed automatically with the input of the video frames and images. In the "strict area" style of layout, exemplary embodiments provide a simple mapping between the general arrangement of photos (i.e. a "slicing structure"), and a precise spatial distribution. In one embodiment, the page composition and production system makes certain that any two neighboring graphic elements will be at least a specified distance apart. In the "brick" style of layout, one embodiment ensures that neighboring graphic elements are separated by exactly a specified distance. Both these styles of layout can be accomplished without requiring that graphic elements be cropped.

The composed pages that have been produced from the input video stream can be provided as input to multiple downstream applications for presenting the content of the video stream, whether the downstream applications provide for printed or displayed output or even output to be passed to successive steps for further processing. Web services, special devices, software packages, and the like can all accept the composed pages and generate video booklets, video posters, CD and DVD covers, postcards, posters, collages, calendars, and the like for printing by conventional printers and high quality digital printers and presses and for electronic display, such as through a screen or graphical user interface 1020 of FIG. 44. Since the composed pages are produced by exemplary embodiments, the pages can be delivered electronically by one or more known means, such as on portable media or across a network.

Figure 50:
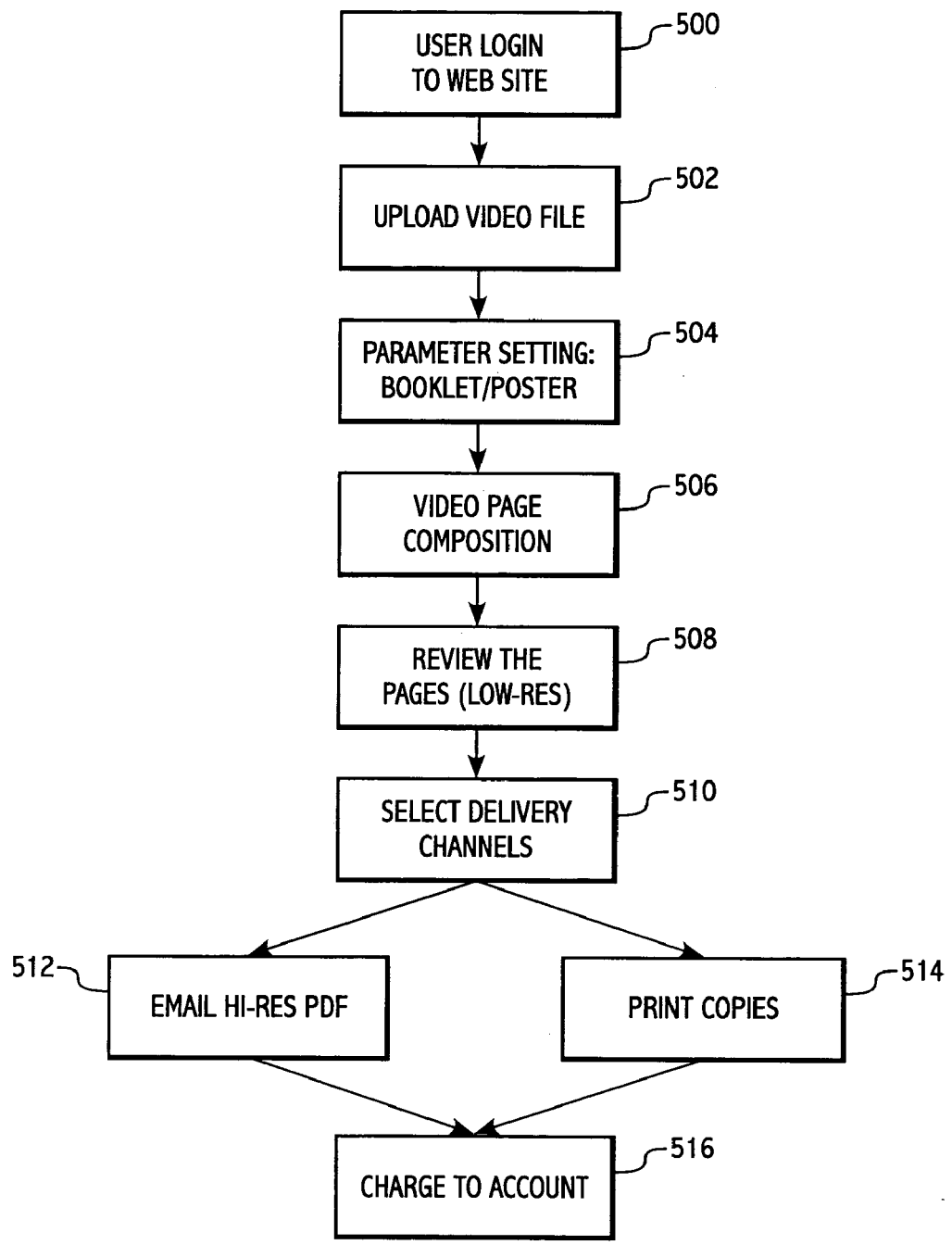
FIG. 50 is a block flow chart of an exemplary web service application for producing and outputting pages from a video stream.

Referring now to FIG. 50, there is shown an exemplary web service application wherein an exemplary embodiment can produce one or more pages from a video stream for delivery across a network, including the Internet. At step 500, a user can log in to a web site and select, at step 502, a video file to be uploaded to the site. The user inputs control parameters at step 504 for directing the operation of the page production system. One or more video pages are composed in step 506 according to exemplary embodiments. The user can optionally view the produced pages at step 508 and can elect to further process the images through a resolution enhancement process as discussed above. An output or delivery channel is selected at step 510, or the delivery channel can be directed through the control parameters provided at step 504. At steps 512 and 514 the produced pages are directed to local devices, or are transmitted to other sites and/or applications, for the printing or display of the pages.

When a single page is produced from a video stream, the page can be used as a DVD cover page to be printed on the DVD or as the insert of the DVD jewel case. In an alternate embodiment, multiple key frames can be produced as pages for use as inserts in the jewel cases and as index pages of a DVD so that the viewer can easily select different segments for viewing. A composed video photo layout of a video stream can be produced for both printed booklets as well as to drive display devices. An example of the former application would be the automatic creation of storybooks based on the video stream. Text description material can be automatically inserted in white space added to each produced page. The latter application could be a trailer representative of the video for displaying on a screen, television, movie screen, and the like.

Although preferred embodiments of the present invention have been shown and described, it will be appreciated by those skilled in the art that changes can be made in these embodiments without departing from the principle and spirit of the invention, the scope of which is defined in the appended claims and their equivalents.

What is claimed is:

1. A computer-implemented method of processing a sequence of video frames, comprising:

extracting key frames from the sequence, wherein the extracting comprises identifying candidate frames from the sequence based on an analysis of content associated with the video frames, segmenting the candidate frames into respective clusters, assigning respective scores to each of the candidate frames, and selecting each of the keyframes from a respective one of the clusters based on the assigned scores;

resolution-enhancing image content of each of the keyframes, based on estimated motion between the keyframe and one or more of the video frames that neighbor the keyframe in the sequence;

generating a sequence of resolution-enhanced cropped images respectively containing the image content, wherein the generating comprises automatically cropping the keyframes; and determining a layout of the sequence of cropped images on one or more pages; and producing a graphical representation of the layout.

2. The method according to claim 1, wherein the identifying comprises determining a respective color histogram for each of the video frames and selecting ones of the video frames as respective ones of the candidate frames based on comparisons between the respective ones of the color histograms.

3. The method according to claim 1, wherein the extracting comprises for each of the keyframes extracting the one or more video frames that neighbor the keyframe from the sequence.

4. The method according to claim 1, wherein the resolution-enhancing comprises:

computing a motion map for each pairing of an extracted frame and a respective extracted neighboring frame in a sequence of base images, wherein each computed motion map comprising a set of motion vectors mapping extracted frame image pixels to respective extracted neighboring frame image pixels;

assigning respective regions of a target image to motion classes based on the computed motion maps, the target image having a target resolution level and the base images having a base resolution level equal to or lower than the target resolution level; and computing pixel values for the target image based on corresponding pixel value contributions from the base images selected in accordance with the motion classes assigned to the target image regions.

5. The method according to claim 1, wherein the cropping comprises identifying a respective region of interest in respective ones of the keyframes and cropping the keyframes such that the respective cropped images contain the respective regions of interest.

6. The method according to claim 5, wherein the cropping comprises:
identifying the regions of interest based on respective saliency images that are derived from the keyframes; and
determining one or more crop boundaries for each of the regions of interest based on application of one or more image composition rules.

7. The method according to claim 1, wherein the cropping comprises removing black top and bottom margins of the keyframes.

8. The method according to claim 1, wherein the cropping comprises cropping each of the keyframes to respective ones of the cropped images that comprise identified regions of interest.

9. The method according to claim 1, wherein the layout comprises images corresponding to cropped and uncropped ones of the keyframes.

10. The method according to claim 1, wherein the determining comprises for each of the pages;
establishing a respective candidate tree representing a recursive partitioning of the page into regions containing respective ones of the cropped images; and
in response to a determination that the candidate tree is a feasible candidate tree arranging the respective cropped images within the page in accordance with the candidate tree.

11. The method according to claim 1, wherein the determining comprises assigning the cropped frame images to respective ones of the pages based on the temporal sequence of the keyframes.

12. The method according to claim 1, wherein the producing comprises creating a poster from the layout.

13. The method according to claim 1, wherein the producing comprises creating a DVD cover page from the layout.

14. The method according to claim 1, wherein the producing comprises creating a video index page from the layout.

15. The method according to claim 1, wherein the producing comprises creating a storybook from the layout.

16. The method according to claim 1, wherein the producing comprises creating a postcard from the layout.

17. The method according to claim 1, wherein the producing comprises creating a calendar from the layout.

18. The method according to claim 1, wherein the producing comprises displaying the layout on a display monitor.

19. The method according to claim 1, wherein the cropping comprises cropping the keyframes in accordance with a user-selected cropping control parameter value.

20. The method of claim 1, wherein the cropping is performed before the resolution-enhancing.

21. The method of claim 1, wherein the resolution-enhancing is performed before the cropping.

22. A computer-implemented method of processing a sequence of video, comprising:
extracting keyframes from the sequence, wherein the extracting comprises identifying candidate frames from the sequence based on an analysis of content associated with the video frames, segmenting the candidate frames into respective clusters, assigning respective scores to each of the candidate frames, and selecting each of the keyframes from a respective one of the clusters based on the assigned scores;
generating a sequence of resolution-enhanced cropped images respectively containing the image content, wherein the generating comprises automatically cropping the keyframes;
determining a layout of the sequence of cropped images on one or more pages; and
producing a graphical representation of the layout.

23. Apparatus for processing a page sequence of video frames, comprising:
a computer-readable medium storing computer-readable instructions; and
a data processing unit coupled to the memory, operable to execute the instructions, and based at least in part on the execution of the instructions operable to perform operations comprising:
extracting keyframes from the sequence, wherein the extracting comprises identifying candidate frames from the sequence based on an analysis of content associated with the video frames, segmenting the candidate frames into respective clusters, assigning respective scores to each of the candidate frames, and selecting each of the keyframes from a respective one of the clusters based on the assigned scores;
resolution-enhancing image content of each of the keyframes based on estimated motion between the keyframe and one or more of the video frames that neighbor the keyframe in the sequence;
generating a sequence of resolution-enhanced cropped images respectively containing the image content, wherein the generating comprises automatically cropping the keyframes; and
determining a layout of the sequence of cropped images on one or more panes; and
producing a graphical representation of the layout.

24. At least one computer readable medium encoded with computer instructions adapted to be executed by a computer to perform a method of processing a sequence of video frames, the method comprising:
extracting keyframes from the sequence, wherein the extracting comprises identifying candidate frames from the sequence based on an analysis of content associated with the video frames, segmenting the candidate frames into respective clusters, assigning respective scores to each of the candidate frames, and selecting each of the keyframes from a respective one of the clusters based on the assigned scores;
resolution-enhancing image content of each of the keyframes based on estimated motion between the keyframe and one or more of the video frames that neighbor the keyframe in the sequence;
generating a sequence of resolution-enhanced cropped images respectively containing the image content, wherein the generating comprises automatically cropping the keyframes and
determining a layout of the sequence of cropped images on one or more pages; and producing a graphical representation of the layout.

* * * * *

UNITED STATES PATENT AND TRADEMARK OFFICE
CERTIFICATE OF CORRECTION

| | | |
|---|---|---|
| PATENT NO. | : 7,760,956 B2 | Page 1 of 1 |
| APPLICATION NO. | : 11/127106 | |
| DATED | : July 20, 2010 | |
| INVENTOR(S) | : Xiaofan Lin et al. | |

It is certified that error appears in the above-identified patent and that said Letters Patent is hereby corrected as shown below:

In column 48, line 27, in Claim 1, delete "key frames" and insert -- keyframes --, therefor.

In column 48, lines 36-37, in Claim 1, delete "keyframes," and insert -- keyframes --, therefor.

In column 49, line 30, in Claim 10, delete "pages;" and insert -- pages: --, therefor.

In column 49, line 35, in Claim 10, delete "tree" and insert -- tree, --, therefor.

In column 50, line 14, in Claim 23, after "a" delete "page".

In column 50 line 39, in Claim 23, delete "panes;" and insert -- pages; --, therefor.

In column 50, line 60, in Claim 24, after "keyframes" insert -- ; --.

Signed and Sealed this
Tenth Day of April, 2012

David J. Kappos
*Director of the United States Patent and Trademark Office*